(12) United States Patent  (10) Patent No.: US 7,987,498 B2
Tanada et al.  (45) Date of Patent: Jul. 26, 2011

(54) PERSONAL DATA MANAGEMENT SYSTEM AND NONVOLATILE MEMORY CARD

(75) Inventors: Yoshifumi Tanada, Kanagawa (JP); Shunpei Yamazaki, Tokyo (JP); Yasuyuki Arai, Kanagawa (JP); Yoshitaka Moriya, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 1068 days.

(21) Appl. No.: 11/812,667

(22) Filed: Jun. 20, 2007

(65) Prior Publication Data

US 2008/0016367 A1    Jan. 17, 2008

(30) Foreign Application Priority Data

Jun. 23, 2006  (JP) ................ 2006-174559

(51) Int. Cl.
*G06F 7/04* (2006.01)
(52) U.S. Cl. .............................. 726/2; 705/64
(58) Field of Classification Search .......... 257/922; 902/4, 5
See application file for complete search history.

(56) References Cited

U.S. PATENT DOCUMENTS

| | | | |
|---|---|---|---|
| 4,582,985 A | 4/1986 | Löfberg | |
| 4,993,068 A | 2/1991 | Piosenka et al. | |
| 5,280,527 A | 1/1994 | Gullman et al. | |
| 5,412,727 A | 5/1995 | Drexler et al. | |
| 5,623,552 A | 4/1997 | Lane | |
| 5,719,950 A | 2/1998 | Osten et al. | |
| 5,764,789 A | 6/1998 | Pare, Jr. et al. | |
| 5,930,804 A | 7/1999 | Yu et al. | |
| 6,026,293 A | 2/2000 | Osborn | |
| 6,104,922 A | 8/2000 | Baumann | |
| 6,219,793 B1 | 4/2001 | Li et al. | |
| 6,760,841 B1* | 7/2004 | Fernandez ............ | 713/172 |
| 6,907,134 B1 | 6/2005 | Yamada et al. | |
| 6,910,131 B1 | 6/2005 | Yamada et al. | |

(Continued)

FOREIGN PATENT DOCUMENTS

EP    1513113 A    3/2005

(Continued)

OTHER PUBLICATIONS

International Search Report (Application No. PCT/JP2007/062554) dated Aug. 28, 2007.

(Continued)

*Primary Examiner* — Matthew B Smithers
(74) *Attorney, Agent, or Firm* — Eric J. Robinson; Robinson Intellectual Property Law Office, P.C.

(57) ABSTRACT

It is an object to provide a personal data management system which overcomes a problem of data leakage and a nonvolatile memory card applied to the personal data management system. A personal data management system includes a personal data storage medium including a communication control unit which transmits and receives data to/from a terminal, an encoding unit which encodes the received data, and a nonvolatile memory which stores the encoded data; a terminal including a communication control unit which transmits and receives data to/from the personal data storage medium and a server, a display portion which displays the received data, and an input unit; and the server including a communication control unit which transmits and receives data to/from the terminal, a decoding unit which decodes the encoded data, an identification data storage portion, and a unit which compares the decoded data with data in the identification data storage portion.

6 Claims, 36 Drawing Sheets

U.S. PATENT DOCUMENTS

| | | |
|---|---|---|
| 6,957,337 B1 | 10/2005 | Chainer et al. |
| 6,963,660 B1 | 11/2005 | Tsukamura et al. |
| 6,980,669 B1 | 12/2005 | Uchida |
| 6,983,061 B2 | 1/2006 | Ikegami et al. |
| 6,990,587 B2 | 1/2006 | Willins et al. |
| 6,996,839 B1 | 2/2006 | Edwards |
| 7,039,812 B2 | 5/2006 | Kawan et al. |
| 7,124,300 B1 | 10/2006 | Lemke |
| 7,162,645 B2 * | 1/2007 | Iguchi et al. ............ 713/193 |
| 7,587,599 B2 | 9/2009 | Ondet et al. |
| 2002/0001400 A1 | 1/2002 | Yamazaki et al. |
| 2003/0182232 A1* | 9/2003 | Zeltzer et al. ............ 705/51 |
| 2005/0071282 A1 | 3/2005 | Lu et al. |
| 2005/0086479 A1 | 4/2005 | Ondet et al. |
| 2007/0078784 A1 | 4/2007 | Donovan et al. |
| 2008/0040284 A1* | 2/2008 | Hazel et al. ............ 705/64 |

FOREIGN PATENT DOCUMENTS

| | | |
|---|---|---|
| JP | 04-313190 | 11/1992 |
| JP | 2002-056171 | 2/2002 |
| JP | 2006-155547 | 6/2006 |
| WO | WO 98/11750 | 3/1998 |
| WO | WO-02/095549 | 11/2002 |

OTHER PUBLICATIONS

Written Opinion (Application No. PCT/JP2007/062554) dated Aug. 28, 2007.

European Search Report (Application No. 07767377.0; PCTEP09770) Dated Aug. 6, 2010.

* cited by examiner

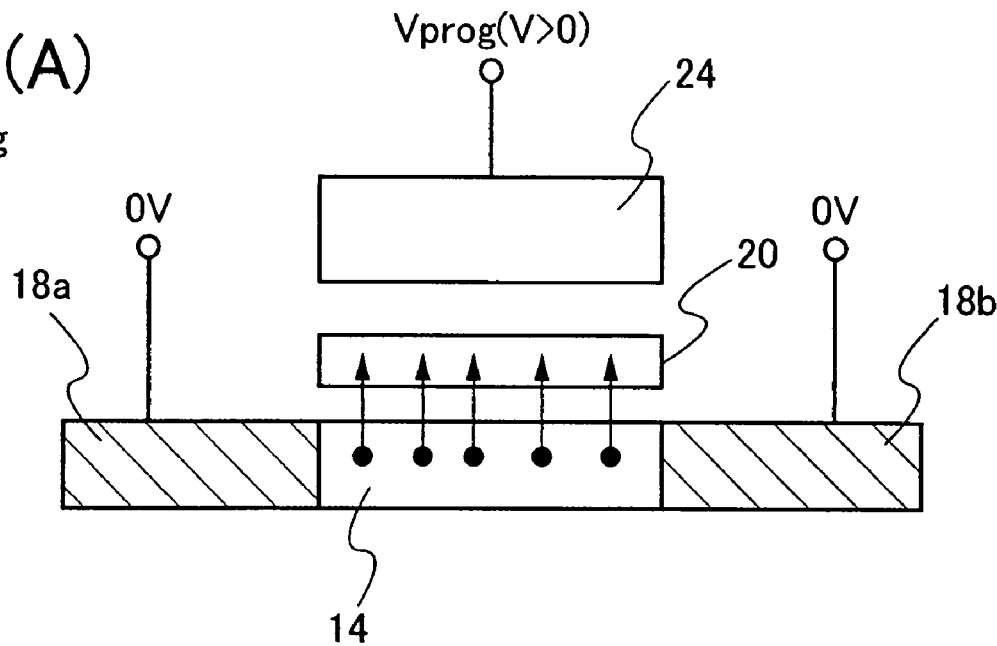
FIG. 6(A) writing
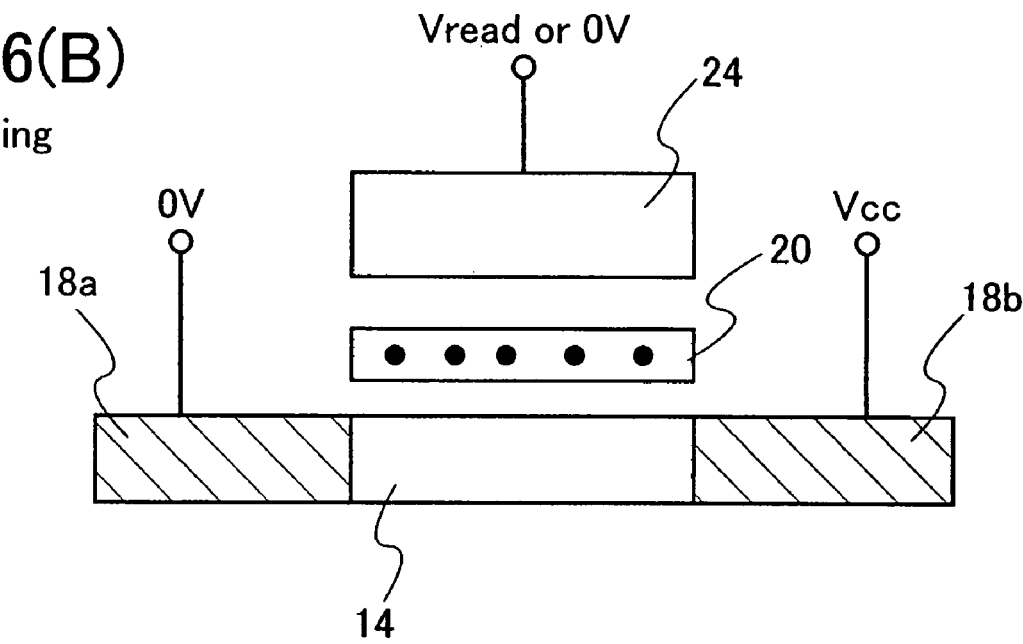
FIG. 6(B) reading

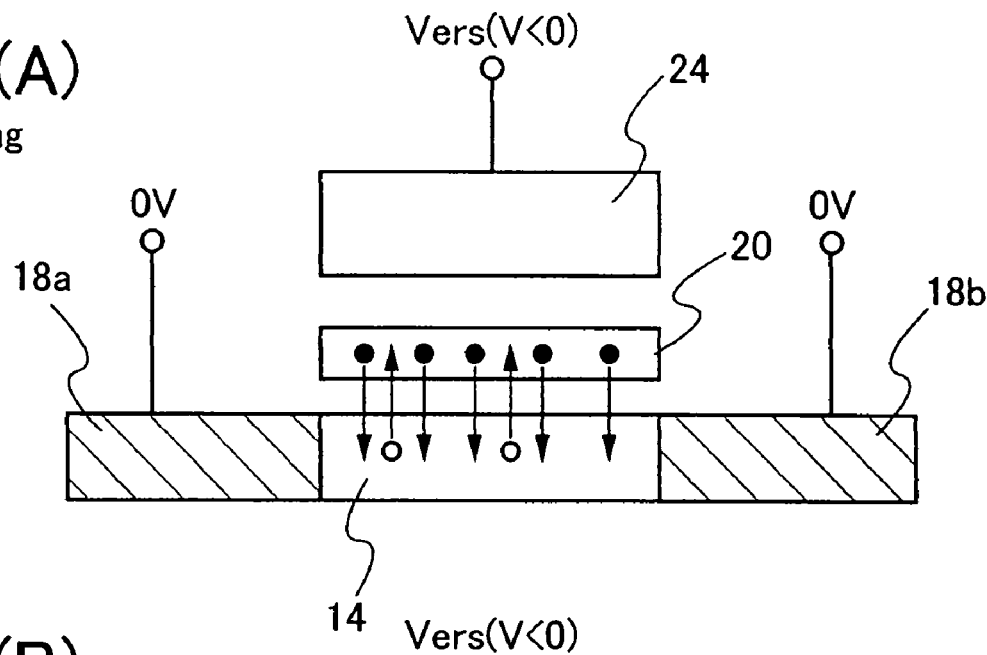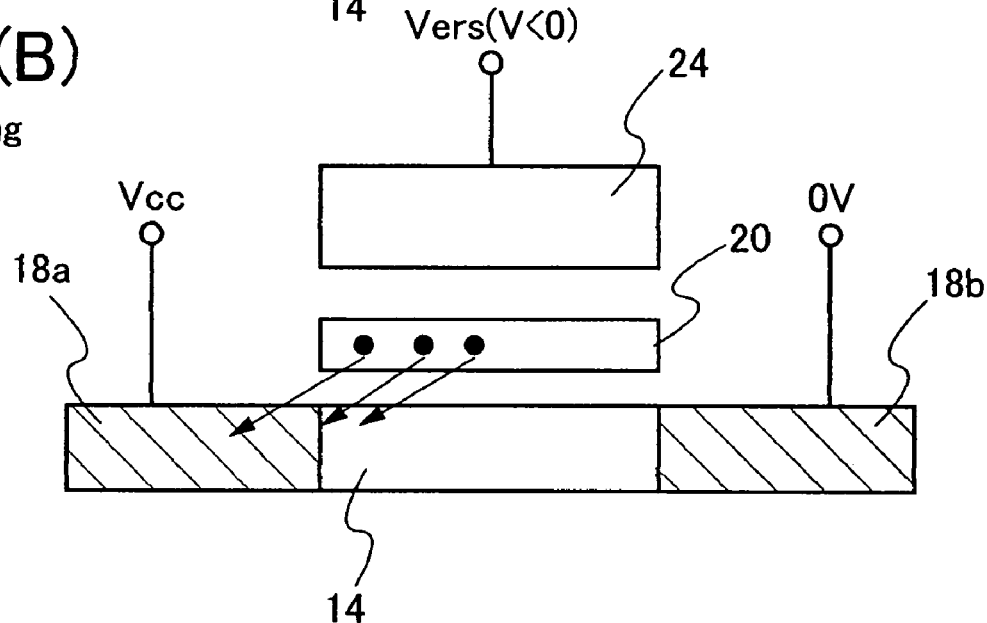

FIG. 11(A) "0" writing
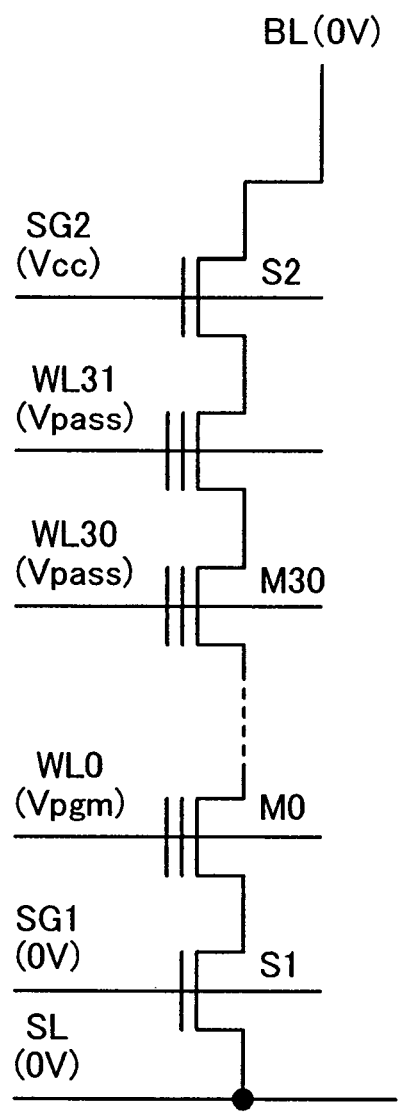
FIG. 11(B) "1" writing
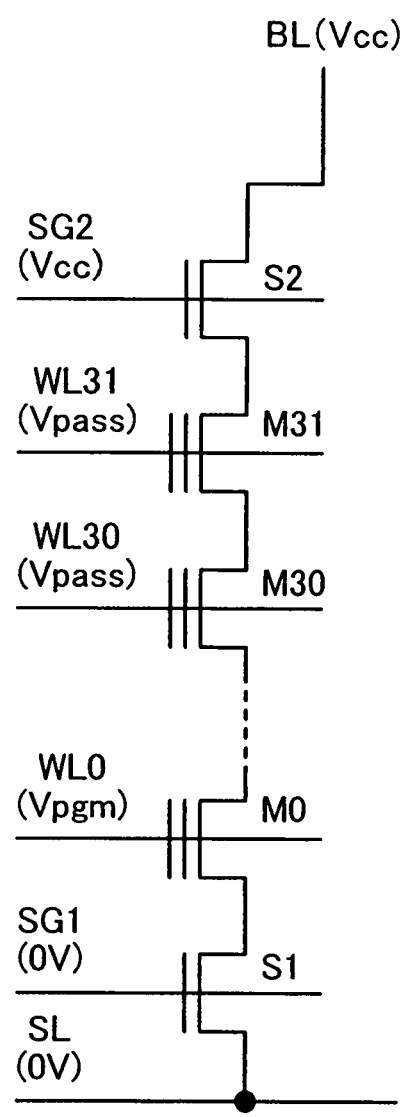

FIG. 12(A) erasing
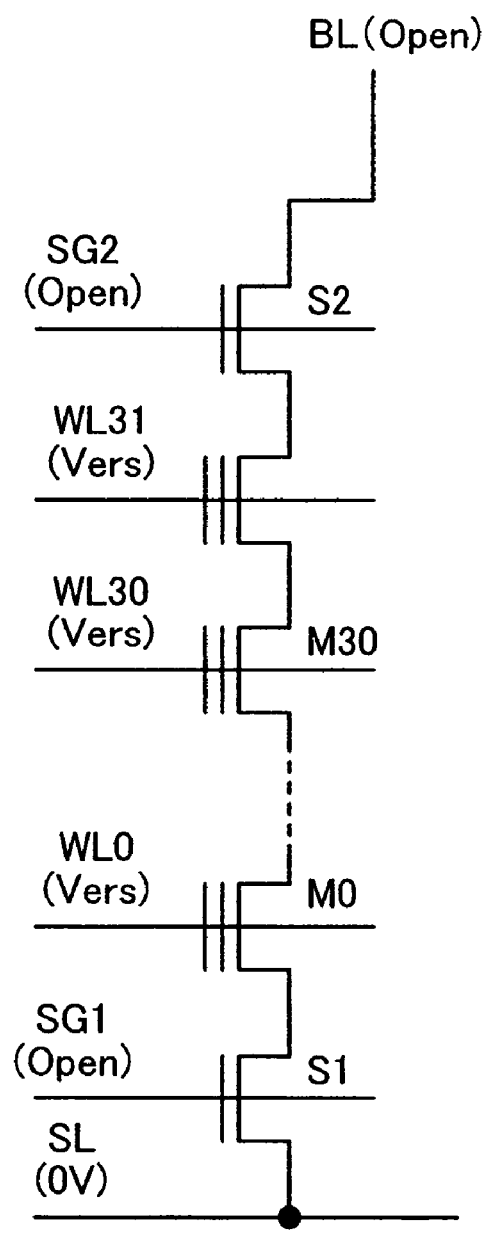
FIG. 12(B) reading
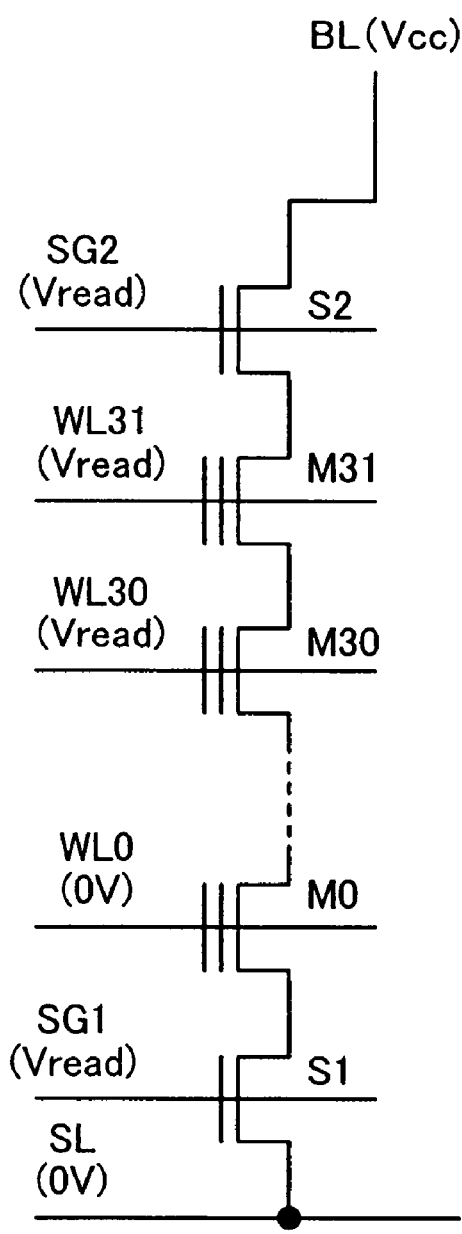

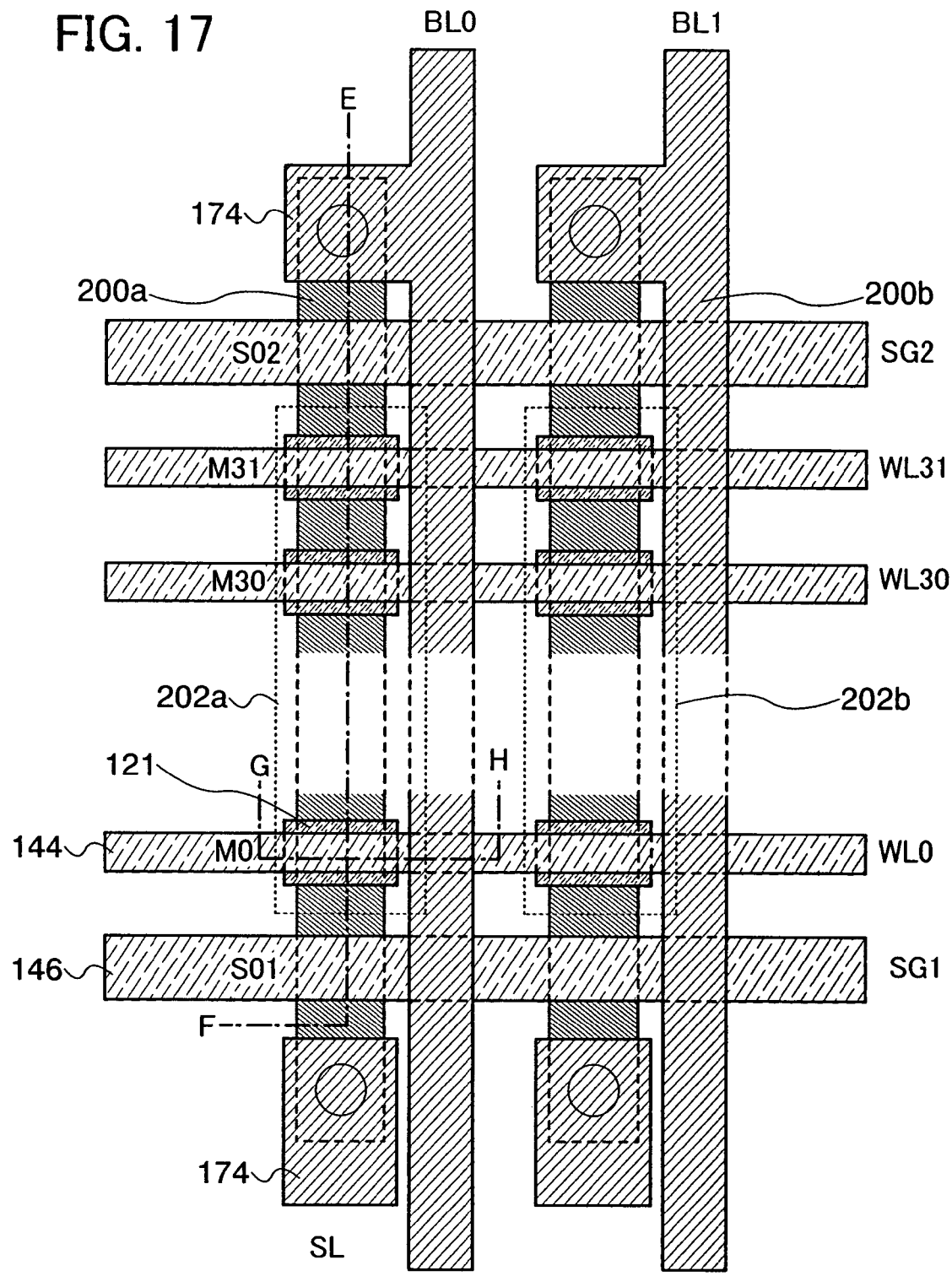

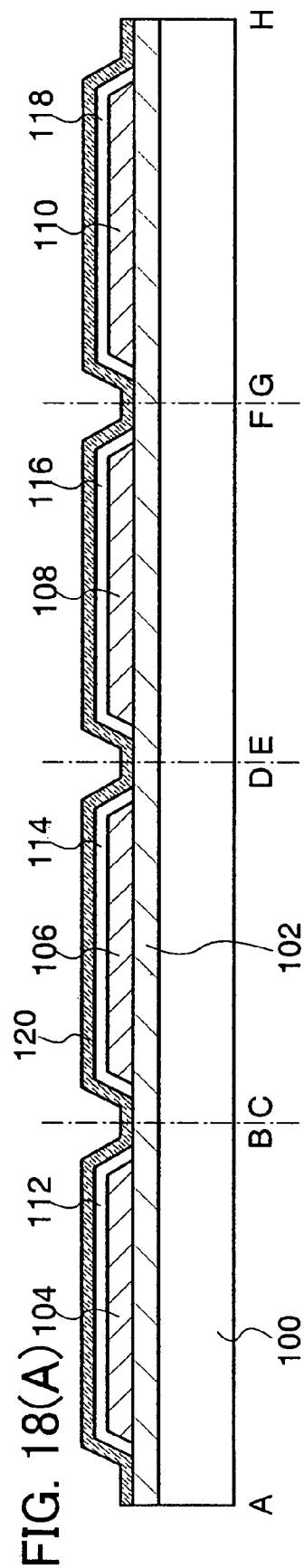
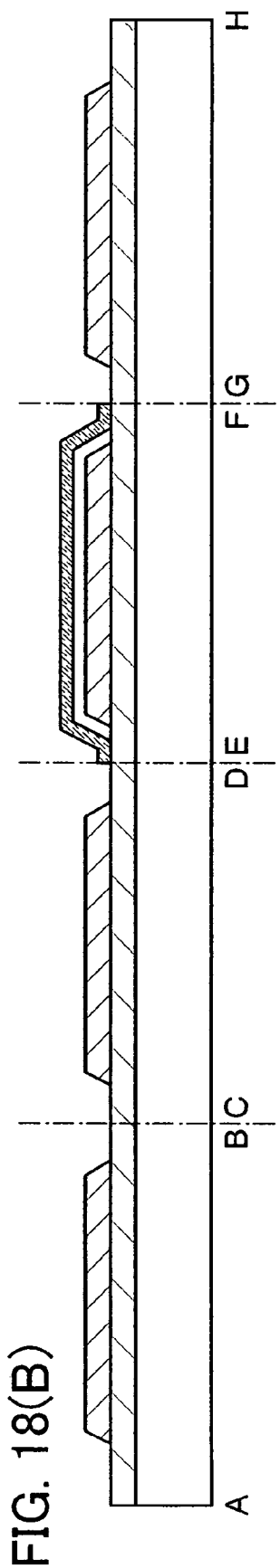
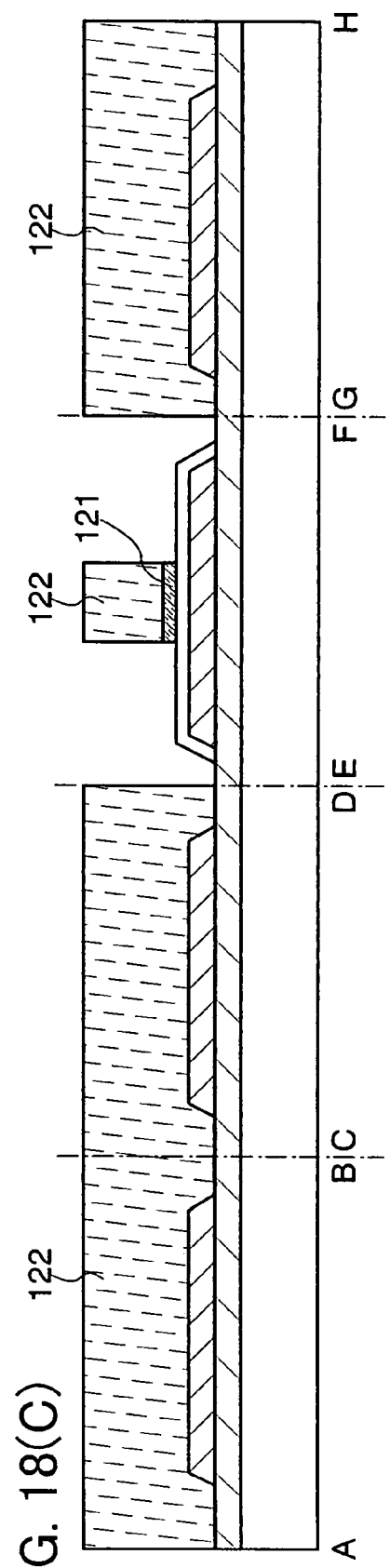

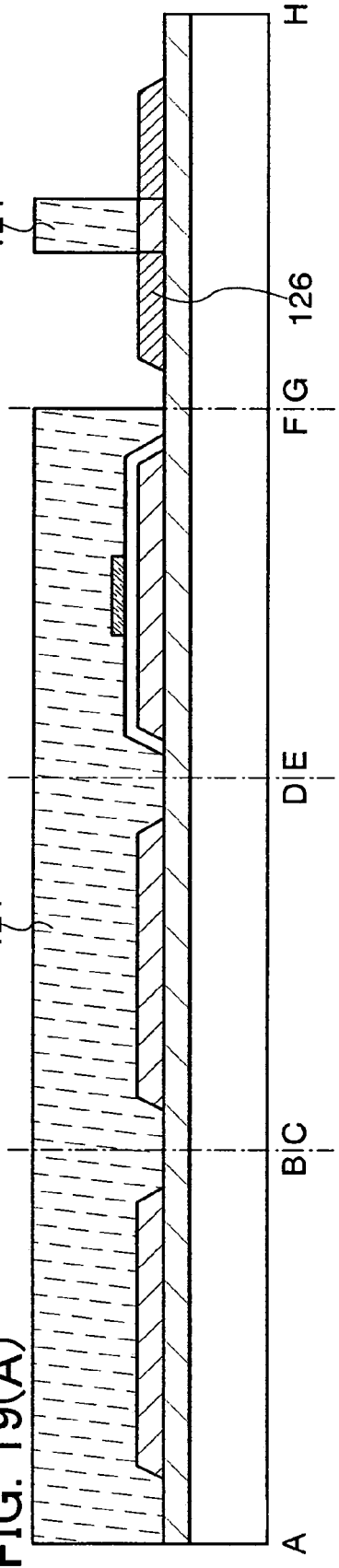
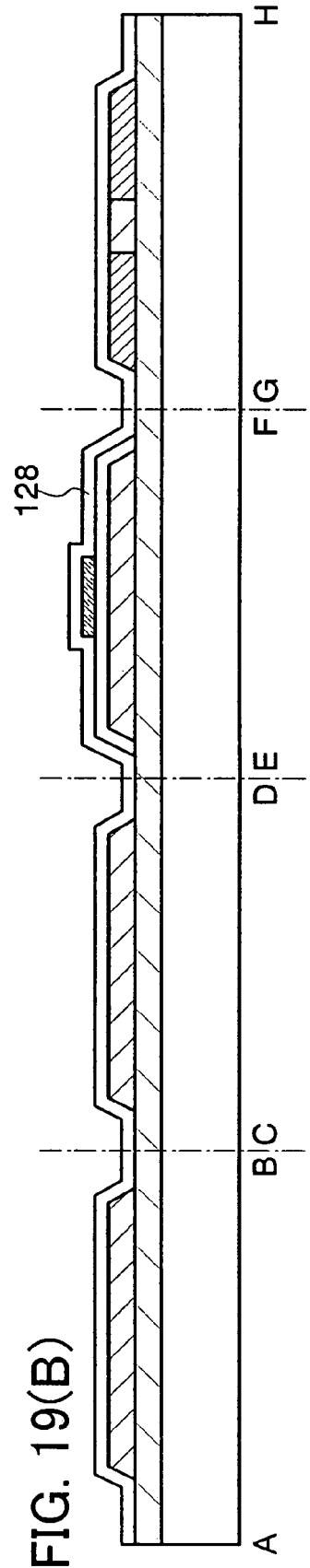
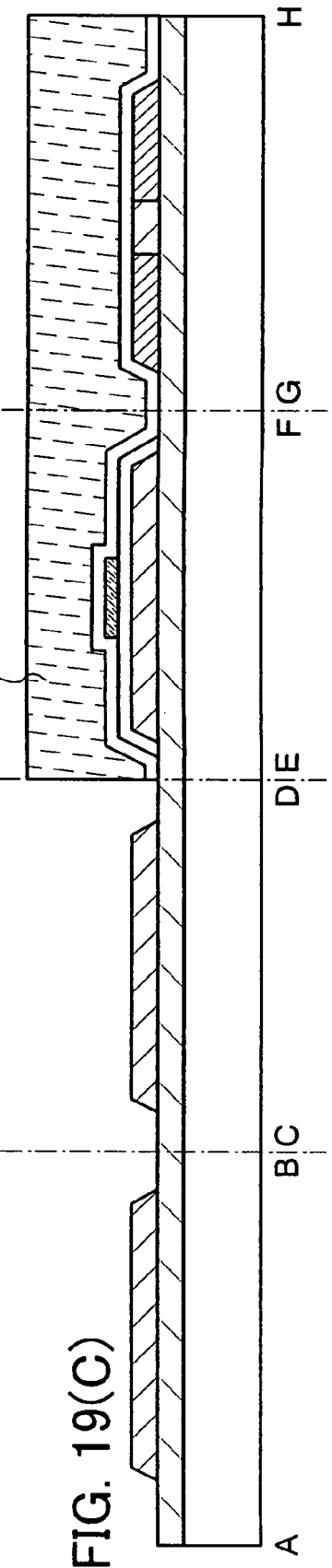

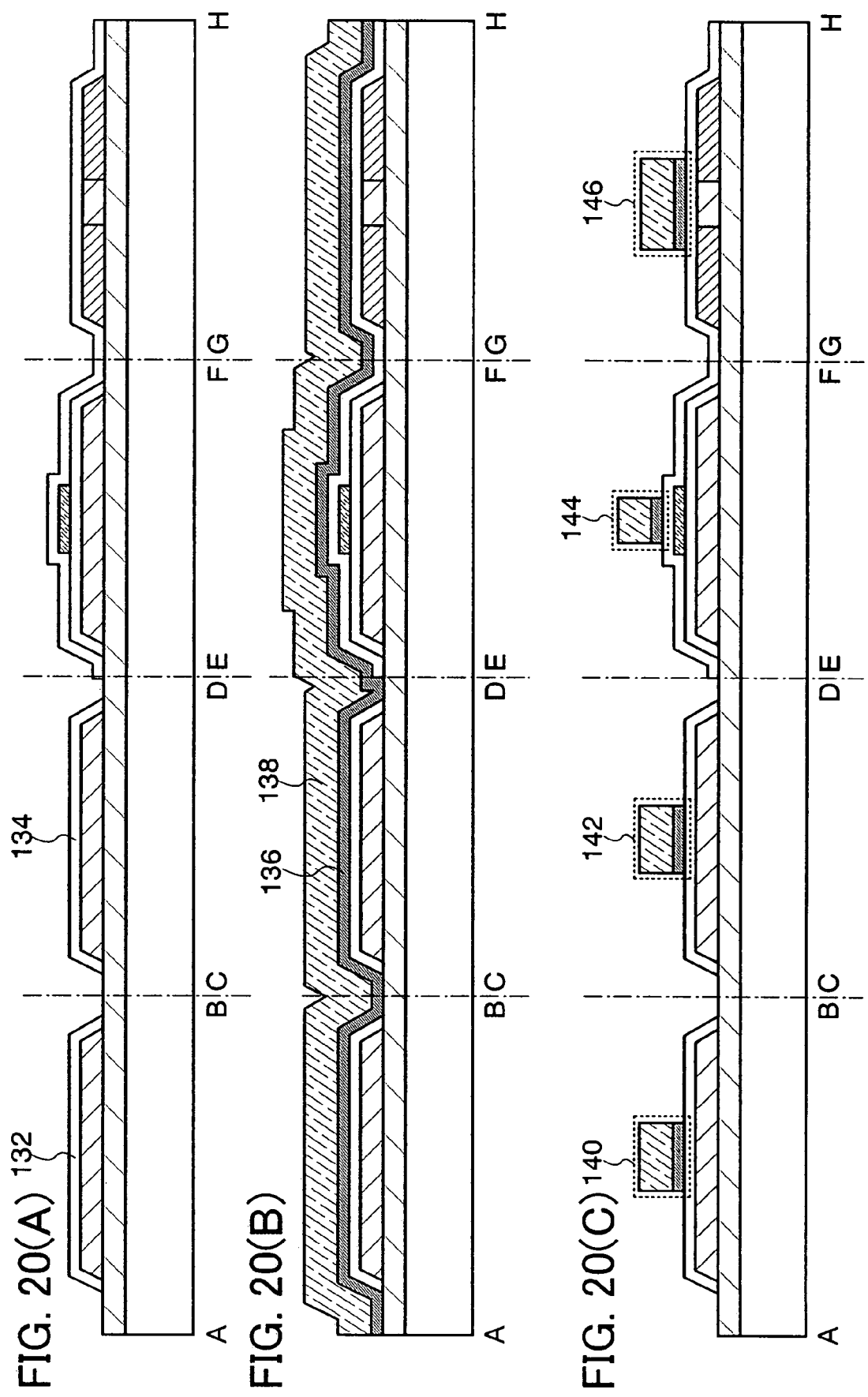

FIG. 22
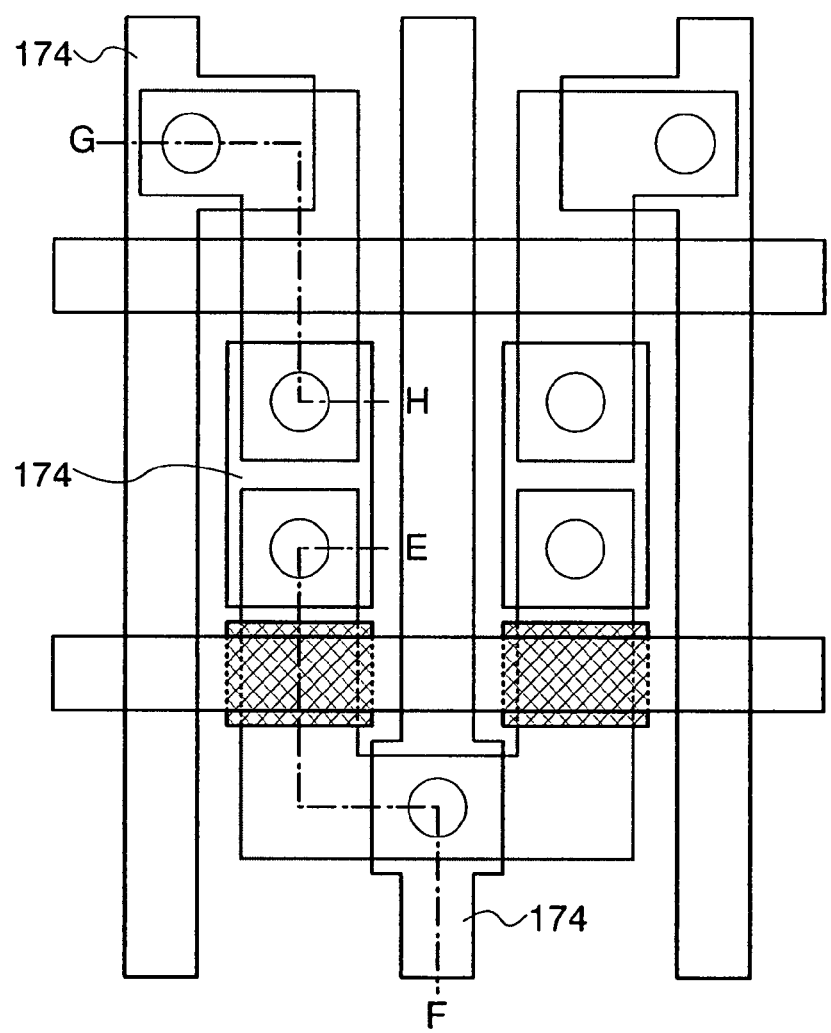
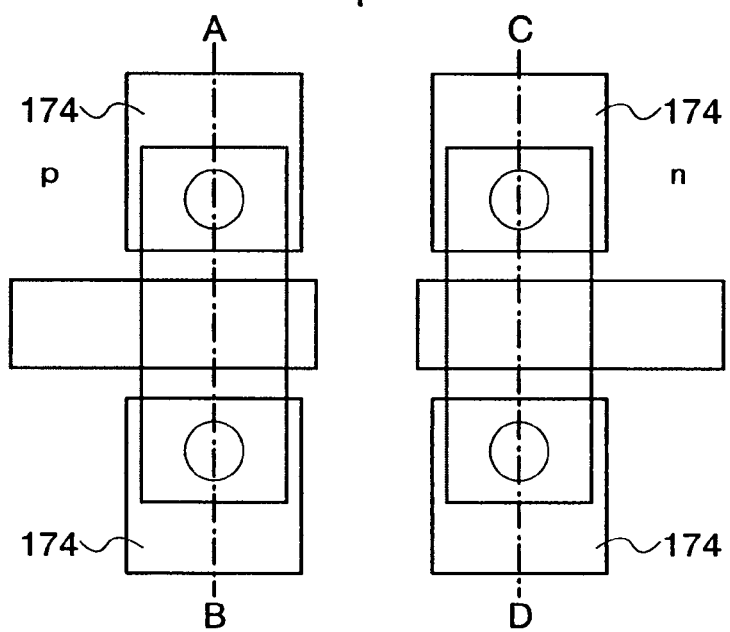

282d 282a  282b  282c

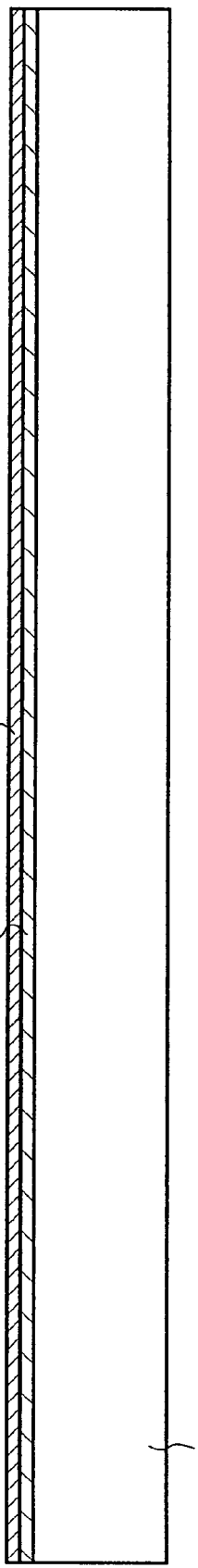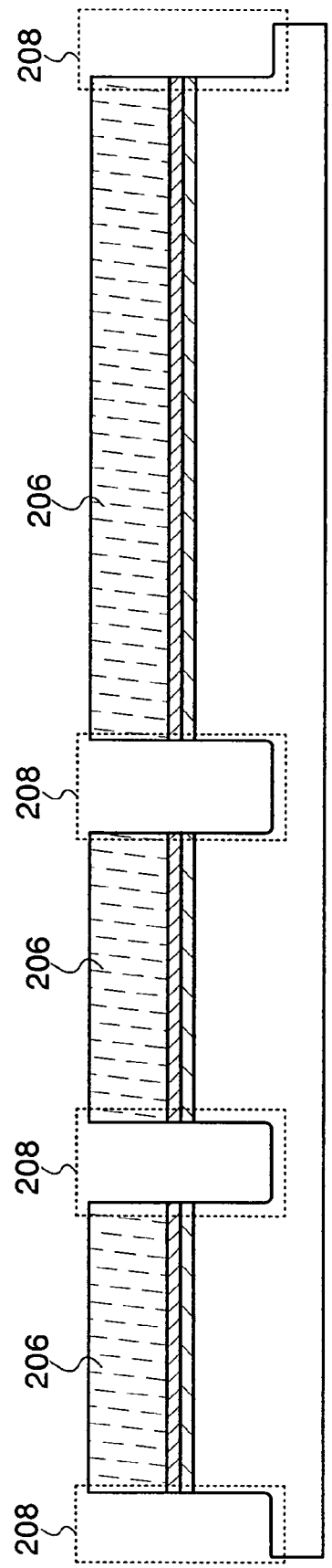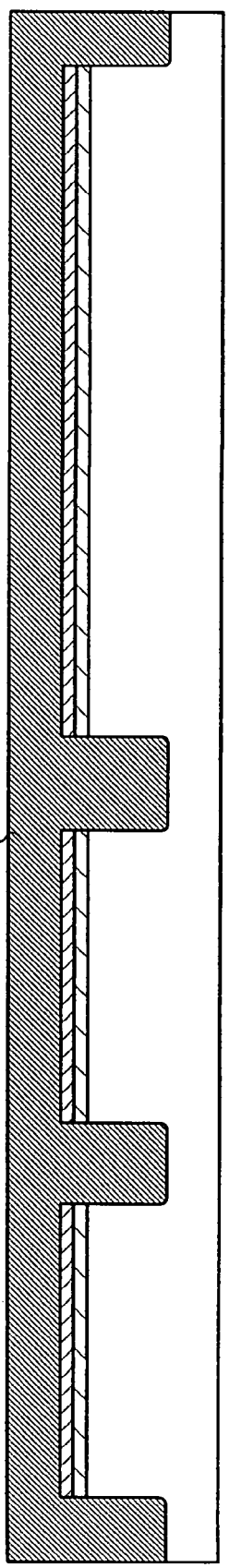

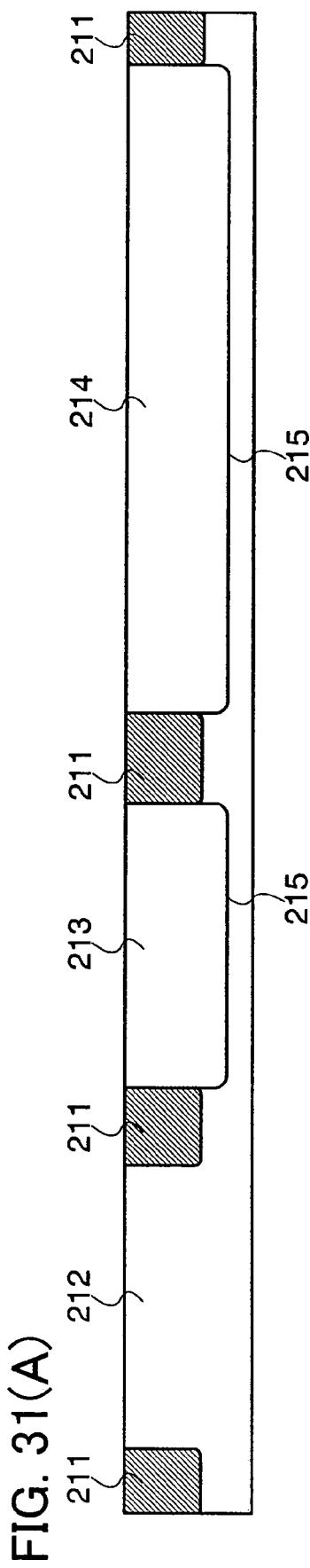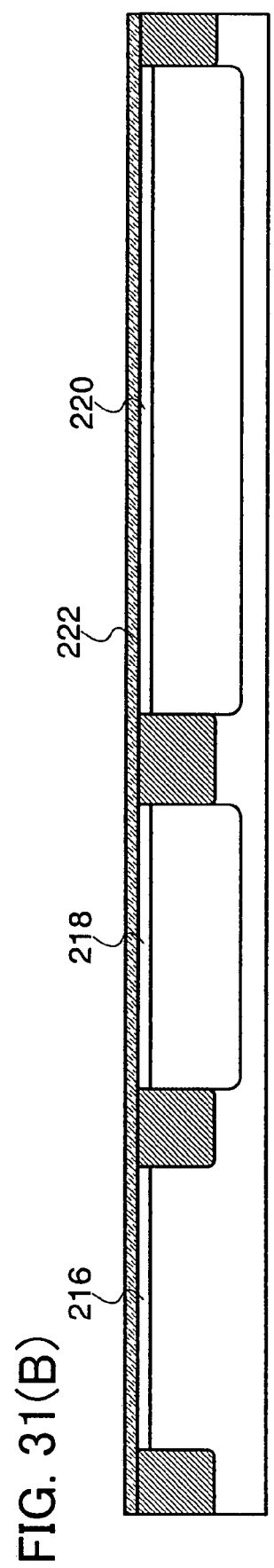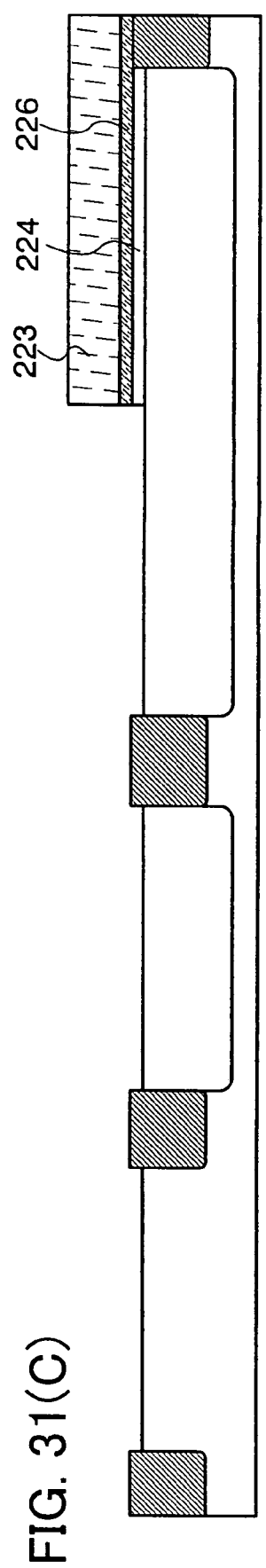

PERSONAL DATA MANAGEMENT SYSTEM AND NONVOLATILE MEMORY CARD

TECHNICAL FIELD

The present invention relates to a personal data management system and a nonvolatile memory card which can be applied to the personal data management system.

BACKGROUND ART

In recent years, standardization, test installation for various usages, and the like of RFID (Radio Frequency IDentification) tags (also referred to as ID tags, IC tags, wireless tags, or wireless chips) have started so that RFID tags can be put into practical use. RFID tags have a feature in communication range, used protocol, and the like in accordance with a used frequency band and have a great advantage that non-contact response is possible in any frequency band. With such convenience, RFID tags are expected to be used in various fields such as personal authentication, fare payment, and games (refer to, for example, Patent Document 1: Japanese Published Patent Application No. 2002-56171).

In the current authentication systems using a cash card, a membership card, and the like, in general, an account number or a membership number stored in the card and a personal identification number are used to correspond to one of a plurality of pieces of personal data stored in the server. In these systems, a cash card and a membership card which a user possesses are a key for calling up personal data stored in the server. Further, as a measure for security, entry of a personal identification number or the like is also employed in many cases.

In other words, for example, even when a third person will pick up a card and try to illegally use the card, authentication is not achieved unless the third person obtains both the card and the personal identification number. Therefore, the above system has been used for a long time and is noted as one of the main personal authentication systems.

DISCLOSURE OF INVENTION

However, in the companies which issue a cash card or a membership card, it is necessary to install a server in which a large amount of personal data is stored and which has to be always connected to some networks. Accordingly, full attention has to be paid in case of data leakage and the like. In particular, when personal data is used in common in a plurality of stores as disclosed in Patent Document 1, risk of data leakage gets higher.

In addition, under conditions where a computer network is developed and connection to the Internet is easily established also in ordinary homes, there is also a case where the server is in a circumstance in which an indefinite number of computers are connected. Therefore, there is a problem in that a large amount of personal data is often leaked due to illegal access. For the users, leakage of personal data without their faults and beyond their control is a factor to lower their trust in the company.

In view of the foregoing problems, it is an object of the present invention to provide a personal data management system which overcomes a problem of data leakage and a nonvolatile memory card which is applied to the personal data management system.

A personal data management system of the present invention includes a personal data storage medium, a terminal, and a server. The personal data storage medium includes a communication control unit which transmits and receives data to/from the terminal, an encoding unit which encodes the received data, and a nonvolatile memory which stores the encoded data. The terminal includes a communication control unit which transmits and receives data to/from the personal data storage medium and the server, a display portion which displays the received data, and an input unit. The server includes a communication control unit which transmits and receives data to/from the terminal, a decoding unit which decodes the encoded data, an identification data storage portion, and a unit which compares the decoded data with data in the identification data storage portion.

In addition, for example, as the personal data storage medium, a card provided with an RFID tag including a nonvolatile memory (nonvolatile memory card) can be used. Various data such as personal data, e.g. a name, an address, and the like is encoded and stored in the nonvolatile memory provided in the RFID tag. In other words, personal data such as a name and an address is stored in the nonvolatile memory card and not stored in the server, and identification data which is a key in personal authentication is stored in the server.

In addition, exchange of data between the personal data storage medium and the terminal and exchange of data between the terminal and the server is carried out through wireless communication or wired communication. Alternatively, one of the above may be carried out through wireless communication and the other may be carried out through wired communication, or both of the above may be carried out through wireless communication.

A nonvolatile memory card of the present invention includes a communication control unit which transmits and receives data to/from a reader/writer, an encoding unit which encodes the received data, a data processing unit which processes the encoded data, and a nonvolatile memory which stores the encoded data. The communication control unit includes an antenna, and data is transmitted and received to/from the reader/writer through wireless communication. In addition, the communication control unit of the nonvolatile memory card transmits the encoded data to the reader/writer, and receives original communication text (plain text) which is not encoded from the reader/writer.

With the use of a personal data management system of the present invention, personal data which has high leakage risk is not usually stored in a server and stored in a personal data storage medium such as a nonvolatile memory card which a user possesses. Therefore, risk of leakage of a large amount of personal data due to illegal access to the server through a network, misreading or illegal reading of data by the company, and the like can be suppressed.

Even if identification data stored in the server is leaked, the identification data itself is meaningless random numbers; therefore, risk of abuse of data is low. Therefore, the present invention can be provided as a safe and new customer management system for a company with a large number of customers.

BRIEF DESCRIPTION OF DRAWINGS

In the accompanying drawings:

FIGS. 6A and 6B are explanatory views of a memory element in a nonvolatile memory card of the present invention;

FIGS. 7A and 7B are explanatory views of a memory element in a nonvolatile memory card of the present invention;

FIGS. 11A and 11B are explanatory diagrams of a memory element in a nonvolatile memory card of the present invention;

FIGS. 12A and 12B are explanatory diagrams of a memory element in a nonvolatile memory card of the present invention;

FIG. 17 is an explanatory view of a memory element in a nonvolatile memory card of the present invention;

FIGS. 18A to 18C are explanatory views of a memory element in a nonvolatile memory card of the present invention;

FIGS. 19A to 19C are explanatory views of a memory element in a nonvolatile memory card of the present invention;

FIGS. 20A to 20C are explanatory views of a memory element in a nonvolatile memory card of the present invention;

FIG. 22 is an explanatory view of a memory element in a nonvolatile memory card of the present invention;

FIGS. 30A to 30C are explanatory views of a memory element in a nonvolatile memory card of the present invention;

FIGS. 31A to 31C are explanatory views of a memory element in a nonvolatile memory card of the present invention;

BEST MODE FOR CARRYING OUT THE INVENTION

Figure 1:
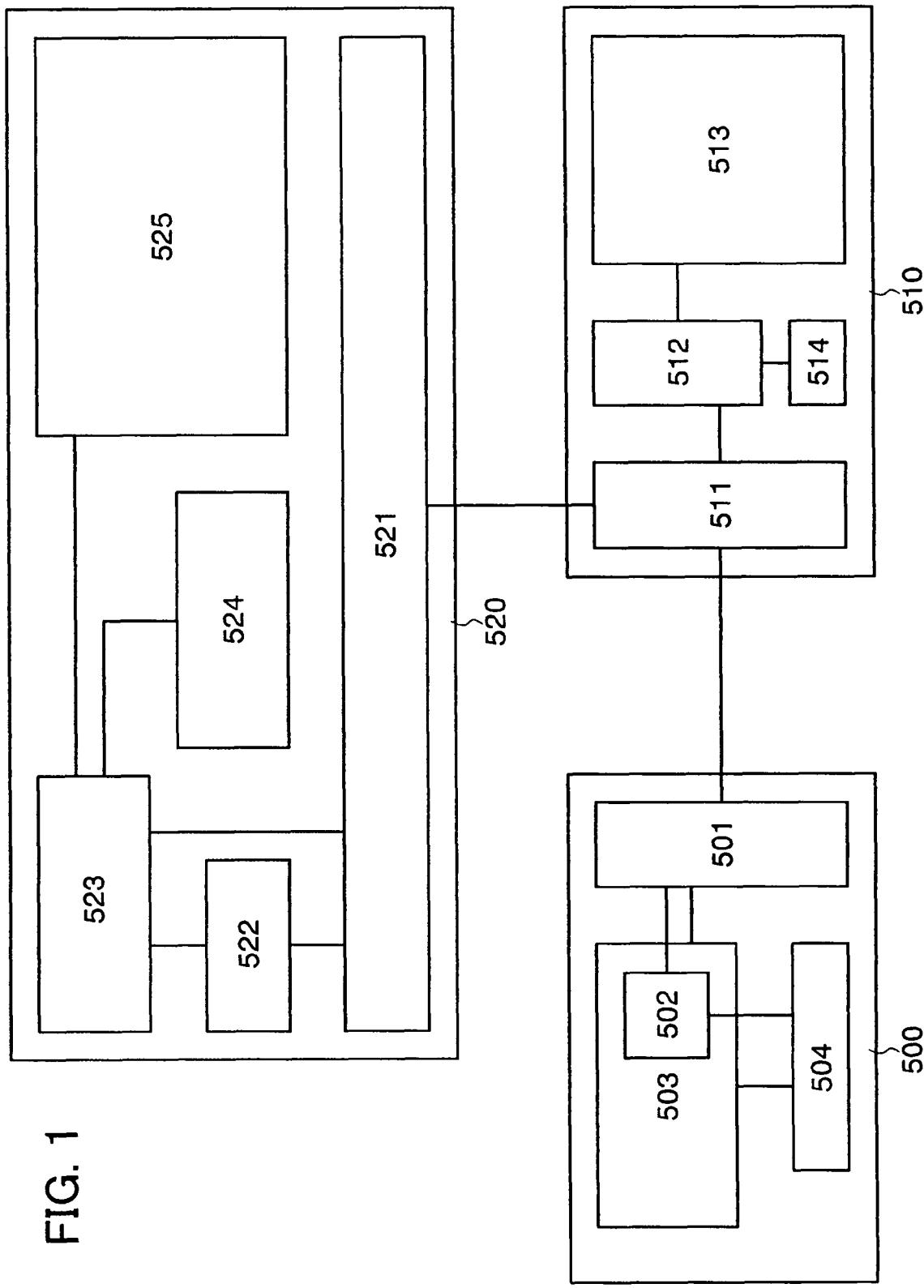
FIG. 1 is a diagram showing an example of a personal data management system of the present invention.

Hereinafter, Embodiment Modes of the present invention will be described with reference to the accompanying drawings. It is to be noted that the present invention is not limited to the following description, and it is easily understood by those skilled in the art that modes and details thereof can be modified in various ways without departing from the spirit and scope of the present invention. Therefore, the present invention should not be interpreted as being limited to the following description of the embodiment modes. In the structures of the present invention which will be described below, the same portions or portions having similar functions are denoted by the same reference numerals in different drawings in some cases.

Figure 2:
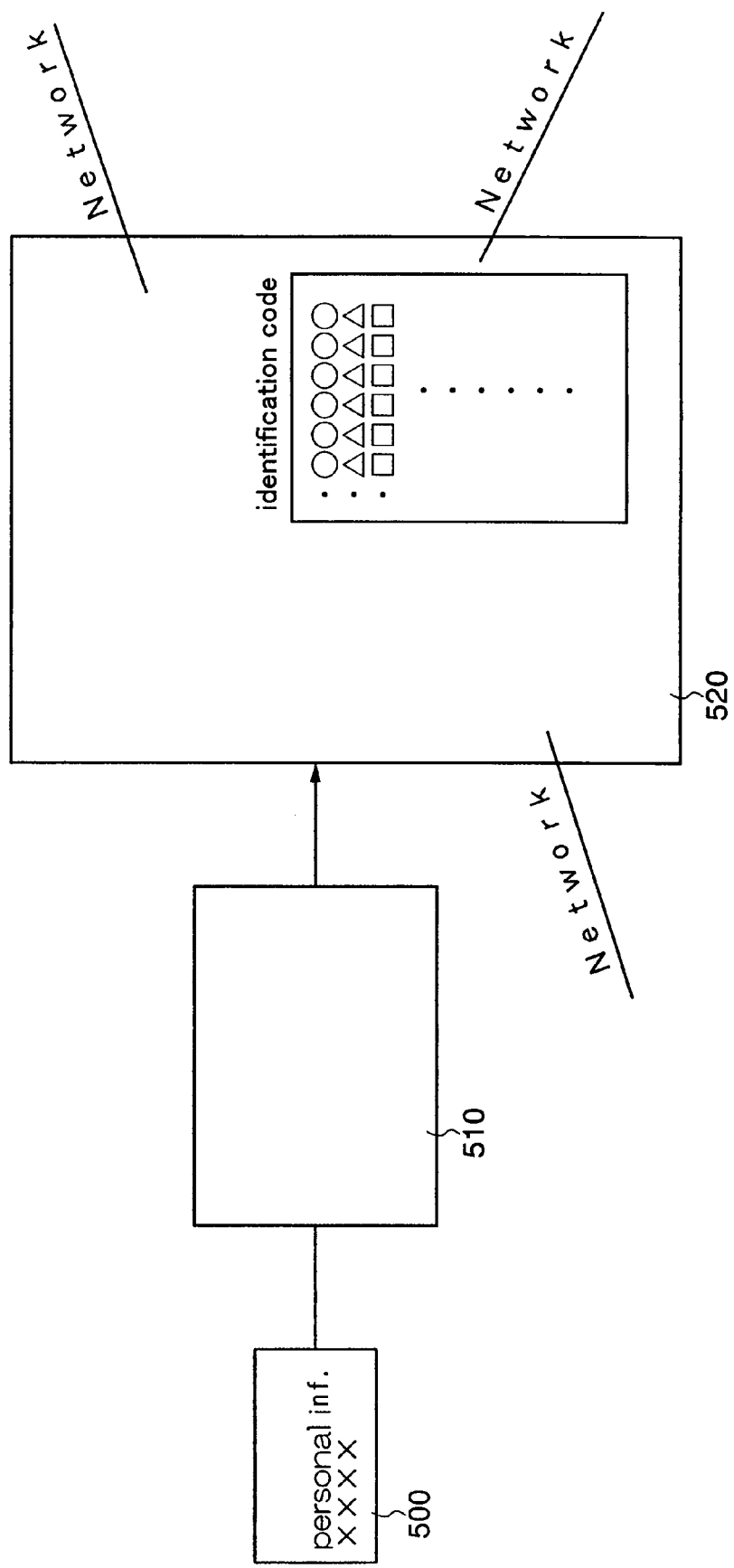
FIG. 2 is a diagram showing an example of a personal data management system of the present invention.

First, an authentication method of a personal data management system of the present invention will be briefly described with reference to FIG. 2.

The present invention has a feature that a CPU having functions of encoding, decoding, and the like and a nonvolatile memory capable of writing and erasing data are provided in a personal data storage medium 500 which a user possesses, and various data such as personal data is stored not in a server 520 but in the nonvolatile memory in the personal data storage medium in an encoded state. In the server 520, not personal data but identification data which is a key in personal authentication is stored.

When a terminal 510 senses the personal data storage medium, the encoded personal data is read from the personal data storage medium and decoded in the server 520. Then, the identification data stored in the server 520 and the data read from the personal data storage medium 500 are compared. When identification data corresponding to the data read from the personal data storage medium 500 exists, authentication is completed.

With the use of such an authentication method, personal data which has high leakage risk is not usually stored in the server 520 and stored in the personal data storage medium 500 which a user possesses. As a result, risk of leakage of a large amount of personal data due to illegal access to the server 520 through a network, misreading of data by the company, and the like can be suppressed. Even if the identification data stored in the server 520 is leaked, the identification data itself is meaningless random numbers; therefore, risk of abuse of data is low.

Hereinafter, a specific structure related to the personal data management system of the present invention will be described.

Embodiment Mode 1

In this embodiment mode, examples of a nonvolatile memory card of the present invention and a personal data management system using the nonvolatile memory card will be described with reference to the drawings.

A personal data management system shown in this embodiment mode includes a personal data storage medium 500, a terminal 510, and a server 520 (FIG. 1).

The personal data storage medium 500 includes a communication control unit 501, an encoding unit 502, a data processing unit 503, and a memory circuit 504 having a nonvolatile memory. Here, an example in which the encoding unit 502 is provided as part of the data processing unit 503 is shown.

The communication control unit 501 may be any device as long as it can transmit and receive data to/from the terminal 510. Here, an antenna is provided in the communication control unit 501 of the personal data storage medium 500, and data is transmitted and received to/from the terminal 510 through wireless communication. In addition, the communication control unit 501 may include a resonance circuit, a demodulating circuit, a modulating circuit, an encoding circuit, a decoding circuit, a data judging circuit, and the like.

The data processing unit 503 includes a circuit which processes data when it transmits and receives data to/from an external portion, such as a CPU (Central Processing Unit) having functions of encoding and decoding. In addition, personal data (such as a name, an address, a telephone number, and the date of birth) is stored in the memory circuit 504. Further, such personal data is encoded by the encoding unit 502 and then stored in the memory circuit 504. A nonvolatile memory capable of rewriting or the like can be used for the memory circuit 504. In addition, as for data which is encoded and stored in the memory circuit 504, in addition to data such as a name of an individual and the like, history of services offered to a user and the like (such as membership information of a certain store and user information for an online game) can also be encoded and stored by exchange of data with the server 520.

The terminal 510 includes a communication control unit 511, a control circuit 512, a display portion 513, and an input unit 514.

The communication control unit 511 of the terminal 510 may be any device as long as it can transmit and receive data to/from the personal data storage medium 500 and the server 520 and can be constituted using either a wired network or a wireless network. Here, data is exchanged between the terminal 510 and the personal data storage medium 500 through wireless communication, whereas data is exchanged between the terminal 510 and the server 520 through wired communication.

The display portion 513 displays data received from the personal data storage medium 500 or the server 520. The display portion 513 can be formed using, for example, a liquid crystal display, a self-emitting element such as an organic EL element or an inorganic EL element, electronic paper, or the like. The input unit 514 is used when each user inputs or selects data by referring to the content displayed on the display portion 513. As the input unit, for example, a keyboard, a touch sensor for directly touching the display portion, and the like can be used. Although the terminal 510 includes a reader/writer which transmits and receives data to/from the personal data storage medium 500 in this embodiment mode, the reader/writer may be separately provided and connected to a terminal of a computer or the like.

The server 520 includes a communication control unit 521, a decoding unit 522, a comparison reference unit 523, a data processing program 524, and an identification data storage portion 525.

The communication control unit 521 of the server 520 may be any device as long as it can transmit and receive data to/from the terminal 510 and can be constituted using either a wired network or a wireless network. Here, data is transmitted and received to/from the terminal 510 through wired communication. The decoding unit 522 converts the encoded data received from the personal data storage medium 500 through the terminal 510 into the original communication text (plain text).

The comparison reference unit 523 compares the decoded data with data stored in the identification data storage portion 525 and judges whether the decoded data meets a predetermined condition (whether the decoded data is authenticated). The data stored in the identification data storage portion 525 is to be identification data which is a key in personal authentication, and data which possibly specifies an individual is not stored there. Further, the data processing program 524 includes a program for driving the comparison reference unit 523. It is to be noted that comparison of the data by the comparison reference unit 523 may also be carried out before the encoded data is decoded by the decoding unit 522.

Next, exchange of data among the personal data storage medium 500, the terminal 510, and the server 520 will be described.

When a user holds the personal data storage medium 500 over the reader/writer provided in the terminal 510, the communication control unit 511 of the terminal senses the medium, and data is exchanged between the personal data storage medium 500 and the terminal 510. Specifically, personal data which is encoded and stored in the memory circuit 504 of the personal data storage medium 500 is transmitted to the terminal 510 in an encoded state. Then, the encoded personal data is transmitted from the communication control unit 511 of the terminal 510 to the communication control unit 521 of the server 520 through a wired network.

Next, the encoded personal data is decoded by the decoding unit 522 of the server 520, and thereafter, with the use of identification data stored in the identification data storage portion 525 of the server 520, the decoded data and identification data are compared, and it is judged whether the decoded data meets a predetermined condition. When identification data corresponding to the data read from the personal data storage medium 500 exists in the identification data storage portion 525 of the server 520, authentication is completed. In other words, data which is a key in personal data authentication is stored in the identification data storage portion 525.

When authentication is completed in the server 520, the decoded data (plain text) is transmitted from the communication control unit 521 to the communication control unit 511 of the terminal 510 through a wired network, and data is displayed on the display portion 513 through the control circuit 512, whereby a user can confirm data stored in the personal data storage medium 500. It is to be noted that a structure, in which entry of a password is required before data is displayed on the display portion 513, may be employed. By requiring the password, utilization of the personal data storage medium 500 by a third person who illegally obtains it can be effectively prevented. In addition, biometric data (fingerprints, voice prints, and veins) of a user can be used as a password so that illegal utilization by a third person can be more effectively prevented. Of course, since biometric data is very important for individuals, it is preferable that the biometric data be not stored in the terminal 510 or the server 520 which an individual cannot control but stored in the memory circuit 504 of the personal data storage medium 500.

When a user newly inputs data or modifies data based on the data displayed on the display portion 513, the latest data is encoded and stored in the memory circuit 504 of the personal data storage medium 500. Specifically, modified data is transmitted from the communication control unit 511 of the terminal 510 to the communication control unit 501 of the personal data storage medium 500 through wireless communication, encoded by the encoding unit 502 included in the data processing unit 503, and stored in the memory circuit 504.

Thereafter, the data displayed on the display portion 513 of the terminal 510 is erased, and personal data does not remain in the server 520, either.

With the use of such an authentication method, personal data which has high leakage risk is not usually stored in the server and stored in the personal data storage medium 500 which a user possesses. As a result, risk of leakage of a large amount of personal data due to illegal access to the server 520 through a network, misreading or illegal reading of data by the company, and the like can be suppressed. Even if the identification data stored in the server 520 is leaked, the identification data itself is meaningless random numbers; therefore, risk of abuse of data is low.

In addition, when a user has lost the personal data storage medium 500, there is a possibility that data stored in the personal data storage medium 500 is illegally read; however, it is not easy to decode data which is encoded and stored in the personal data storage medium 500. Accordingly, high security can also be obtained.

Embodiment Mode 2

In this embodiment mode, an example of a specific structure of the personal data storage medium shown in the above embodiment mode will be described with reference to FIG. 3. Here, a structure in which a card includes an RFID tag (also referred to as an IC tag, an ID tag, a wireless tag, or a wireless chip) having a nonvolatile memory (hereinafter also referred to as a nonvolatile memory card) will be described.

A nonvolatile memory card shown in this embodiment mode includes a resonance circuit 702 having an antenna and a resonant capacitor, a power source circuit 703, a clock generating circuit 704, a demodulating circuit 705, a data processing circuit 706, a memory circuit 707 provided with a memory element such as a nonvolatile memory, a modulating circuit 709, an A/D converter circuit 708, a CPU 713, and an RF circuit 716.

The RF circuit 716 has the resonance circuit 702, and the resonance circuit 702 is connected to the power source circuit 703, the clock generating circuit 704, the demodulating circuit 705, and the modulating circuit 709, and performs exchanges of signals and power. Signals from the power source circuit 703, the clock generating circuit 704, and the demodulating circuit 705 are input to the data processing circuit 706, so that the CPU 713 provided in the data processing circuit 706 can be operated. In addition, the modulating circuit 709 outputs a signal received from the data processing circuit 706 to the resonance circuit 702 (the signal is input to the resonance circuit 702). The data processing circuit 706 and the memory circuit 707 perform two-way exchange of signals. In addition, a signal from the A/D converter circuit 708 is input to the data processing circuit 706, and conversion from an analog signal to a digital signal can be performed.

A nonvolatile memory card 701 shown in this embodiment mode is not limited to the aforementioned configuration, and may have a congestion control circuit and the like. A flash memory capable of rewriting, an EEPROM (Electrically Erasable Programmable Read Only Memory), a ferroelectric memory, or the like can be used as the nonvolatile memory. Alternatively, a mask ROM (Read Only Memory) not capable of rewriting, a write-once memory having an organic substance or an inorganic substance between electrodes in which data can be additionally written, or the like can also be used. The nonvolatile memory not capable of rewriting can prevent falsification of personal data.

In the memory circuit 707 included in the nonvolatile memory card 701, personal data such as a name, an address, a telephone number, and the date of birth is encoded and stored. In addition, a biometric feature (such as fingerprints, voice prints, or DNA) of an individual can also be stored as data. It is to be noted that, since a biometric feature is processed as two-dimensional pattern data and has a larger amount of data compared to a name, an address, and the like, it is preferable to mount a memory element which can have a sufficient capacity.

The RF circuit 716 has a function of transmitting and receiving an electric wave to/from a reader/writer 715, and can generate power supply for the nonvolatile memory card 701.

The CPU 713 accesses the memory circuit 707 based on data transmitted from the RF circuit 716. In addition, the CPU 713 has an encoding function, by which personal data is stored in the memory circuit 707 not in plain text but in an encoded state.

The reader/writer 715 is connected to a terminal 712 having a display portion of a computer or the like. The reader/writer 715 and the terminal 712 may be connected through wireless communication or wired communication. In addition, the terminal 712 is also connected to a server 714 by using a wired or wireless network.

Next, exchange of data between the nonvolatile memory card 701 and the reader/writer 715 will be described. The reader/writer 715 can be a portable type or a fixed type.

Figure 3:
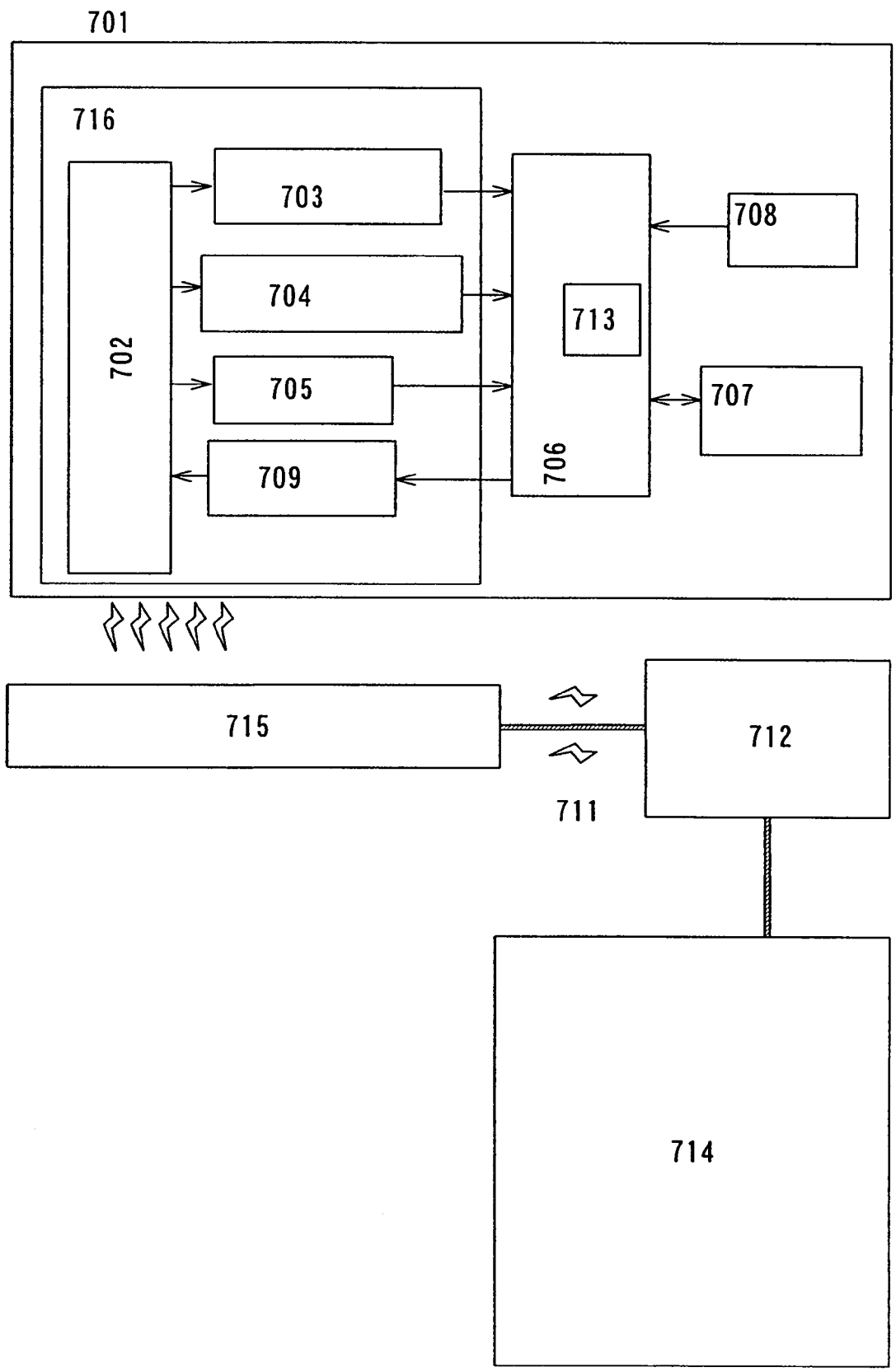
FIG. 3 is a diagram showing an example of a nonvolatile memory card of the present invention.

The reader/writer 715 shown in FIG. 3 has an antenna. The terminal 712 connected to the reader/writer 715 can control the reader/writer 715. In addition, in the nonvolatile memory card 701, a power source potential is generated in the power source circuit 703 when the resonance circuit 702 receives an electric wave emitted from the antenna of the reader/writer 715. In addition, data is demodulated from the received electric wave in the demodulating circuit 705. Transmission of data to the reader/writer 715 is performed by the modulating circuit 709. In this manner, the reader/writer 715 and the nonvolatile memory card 701 can perform transmission/reception of data through wireless communication. It is to be noted that the terminal 712 may have a memory device.

The reader/writer 715 is connected to the terminal 712 through a communication line 711, and data can be transmitted and received to/from the nonvolatile memory card 701 under control of the terminal 712. It is to be noted that a wireless communication line such as an infrared communication line may be used as the communication line 711 between the reader/writer 715 and the terminal 712, and exchange of data may be carried out thereby.

The resonance circuit 702 has a function of receiving an electric wave emitted from the antenna of the reader/writer 715 and generating an alternating current signal on both ends of the antenna. The alternating current signal generated serves as electric power of the nonvolatile memory card 701 and includes data such as a command transmitted from the antenna of the reader/writer 715. The alternating current signal generated in the resonance circuit 702 is rectified by a diode and smoothed by using a capacitor, so that the power source circuit 703 generates a power source potential to be supplied to each circuit. The clock generating circuit 704 has a function of generating clock signals with various frequencies based on the alternating current signal generated in the resonance circuit 702. The demodulating circuit 705 has a function of demodulating data included in the alternating current signal generated in the resonance circuit 702.

The data processing circuit 706 extracts a command from the demodulated signal, and has a function of implementing a series of operations in accordance with the command by controlling the memory circuit 707 and the A/D converter circuit 708. Further, the data processing circuit 706 may have a function of checking whether the demodulated signal has an error or not. In addition, the data processing circuit 706 has a function of transmitting a write command to the memory circuit 707, so that data that has been stored in a register or the like is stored in a memory area of the memory circuit 707. Of course, it can be performed without a register. Similarly, the data processing circuit 706 transmits a read command to the memory circuit 707 so that data can be read. Then, a signal encoded by an encoding circuit in the data processing circuit 706 is generated and output to the modulating circuit 709.

A nonvolatile memory capable of rewiring such as a flash memory, an EEPROM, or a ferroelectric memory can be provided in the memory circuit 707. In addition, a write-once memory may also be provided in the memory circuit 707. The write-once memory is a write-once-read-memory and a nonvolatile memory in which data cannot be rewritten. With the memory circuit 707, data specific to the nonvolatile memory card 701 can be held.

The modulating circuit 709 has a function of modulating a carrier wave based on the encoded signal.

This embodiment mode shows an example in which the nonvolatile memory card 701 receives power supply from the antenna of the reader/writer 715; however, the present invention is not limited to this mode. For example, it is possible that the nonvolatile memory card 701 has an internal battery or the like that can perform power supply, and the nonvolatile memory card 701 performs only data exchange wirelessly with the antenna of the reader/writer 715. In addition, the nonvolatile memory card 701 may be provided with a charging type battery which can be charged by a wireless signal from the reader/writer 715.

This embodiment mode can be freely combined with other embodiment modes in this specification.

Embodiment Mode 3

In this embodiment mode, a specific usage mode of a personal data management system of the present invention will be described with reference to the drawings.

Figure 4:
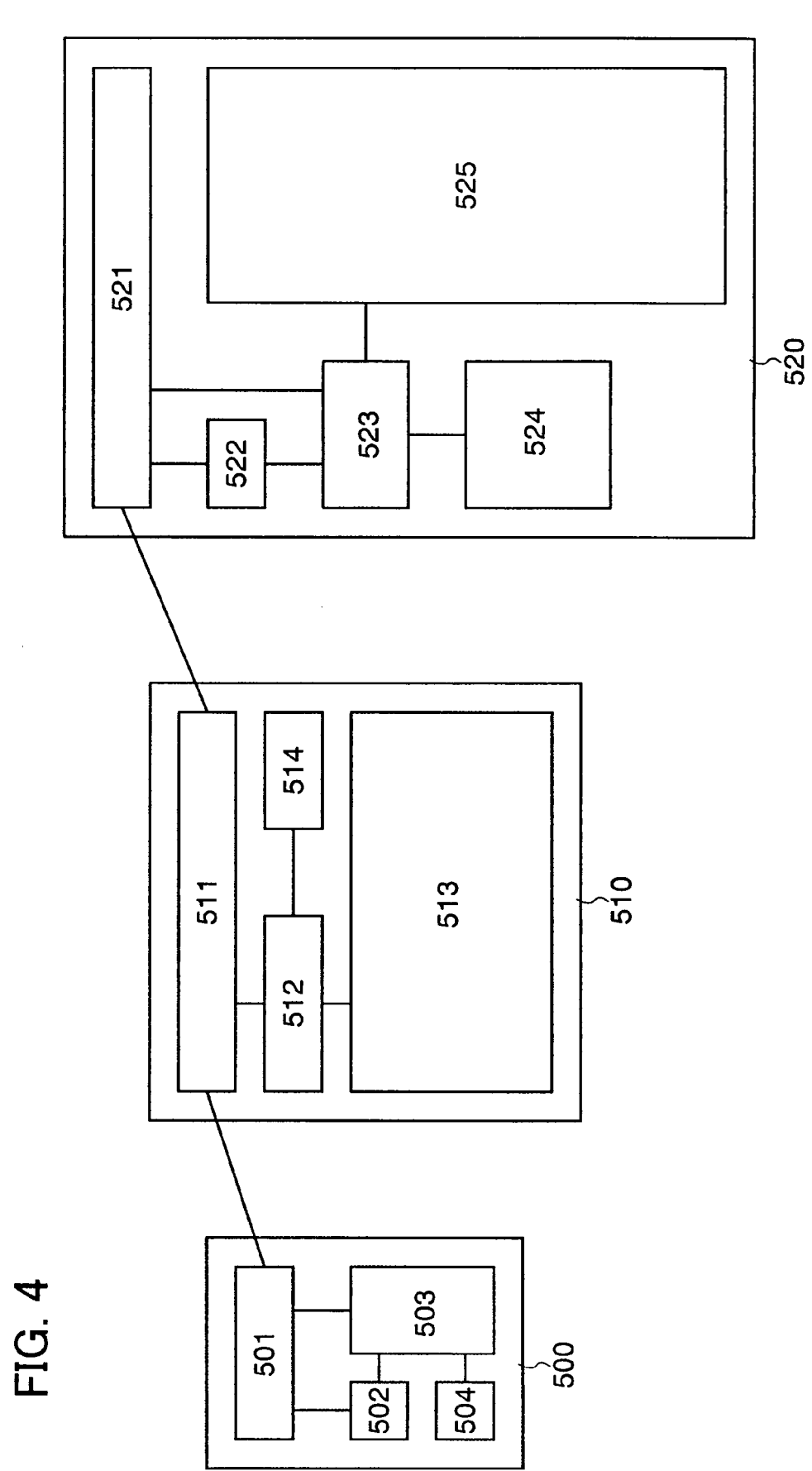
FIG. 4 is a diagram showing an example of a personal data management system of the present invention.

First, the following will describe a case where services and the like are offered in accordance with user's data stored in the nonvolatile memory card shown in the above embodiment mode, with reference to FIG. 4.

In a memory circuit 504 of a nonvolatile memory card 500, encoded user's data (such as a name, an address, sex, age, height, and weight) is stored.

When a user holds the nonvolatile memory card 500 over a terminal 510 provided with a reader/writer, the encoded data is transmitted to a server 520 through the terminal 510. Next, in the server 520, the encoded data is decoded by a decoding unit 522, and thereafter, through judgment by a comparison reference unit 523, authentication is completed when identification data which is a key of the data is stored in an identification data storage portion 525 of the server 520.

After authentication is completed in the server 520, the decoded data is transmitted from the server 520 to the terminal 510, and service data based on user's personal data is displayed on a display portion 513 of the terminal 510. The company and the like can provide service data such as services appropriate to the user in accordance with personal data stored in the nonvolatile memory card through the display portion of the terminal. In addition, when data on services and the like used by the user in the past is stored in the nonvolatile memory card 500 as history, a service more appropriate to every user can be offered.

In particular, when a user plays similar games many times in a game center, a theme park, and the like, data on experiences and the like is stored in the nonvolatile memory card, so that various services optimized for every user can be offered. For example, when a user takes part in the same online game a plurality of times, data obtained by the user in the past is stored in the nonvolatile memory card. In this case, the user can take part in the online game by using the data of the last time.

Further, when biometric data (data such as fingerprints, voice prints, veins, retina, and DNA) of an individual is stored in the nonvolatile memory card in addition to a name, an address, age, and the like, the personal data management system of the present invention can be applied to a medical field. This case will be described with reference to FIG. 4.

When a user holds the nonvolatile memory card 500 over the terminal 510 provided with a reader/writer, data stored in the nonvolatile memory card 500 is transmitted to the server 520 through the terminal 510 in an encoded state. Then, in the server 520, the encoded personal data is decoded, and thereafter, authentication is completed when it is found through the comparison reference unit 523 that identification data corresponding to the decoded data is stored in the identification data storage portion 525 of the server 520.

After authentication is completed, the decoded data is transmitted from the server 520 to the terminal 510, and personal biometric data can be displayed on the display portion 513 of the terminal 510. In addition, a structure, in which entry of a password is required before the biometric data is displayed on the display portion 513, may be employed. By requiring the password, utilization of the nonvolatile memory card by a third person who illegally obtains it can be effectively prevented. Here, biometric data (fingerprints, voice prints, and veins) of a user stored in the nonvolatile memory card is preferably used as a password.

Further, in hospitals and the like, when treatment data, data on prescribed medicines, and the like are desired to be stored, data is renewed by an input unit 514 provided in the terminal 510, whereby renewed data can be encoded and stored in the nonvolatile memory card 500. In other words, a user can possess and control a medical record (electronic medical record).

In recent years, it has been attempted to prevent illegal utilization by a third person by personal authentication with the use of biometric data such as fingerprints and voice prints. However, since an individual can be specified by a personal biometric feature, damage of data leakage is uncalculable. Therefore, there are various problems on a management method and the like when a large amount of biometric data of individuals is collectively controlled. However, when the above management system is used, risk of leakage of a large amount of personal data due to illegal access to the server through a network, illegal reading of data by the company, and the like can be suppressed. Even if identification data stored in the server is leaked, the identification data itself is meaningless random numbers; therefore, risk of abuse of data is low. In addition, when a user has lost the nonvolatile memory card 500, there is a possibility that data stored in the nonvolatile memory card 500 is illegally read; however, it is not easy to decode data which is encoded and stored in the nonvolatile memory card 500. Accordingly, high security can be obtained.

Next, a management system for exchange of data with a financial facility using a nonvolatile memory card will be described with reference to FIG. 5.

Figure 5:
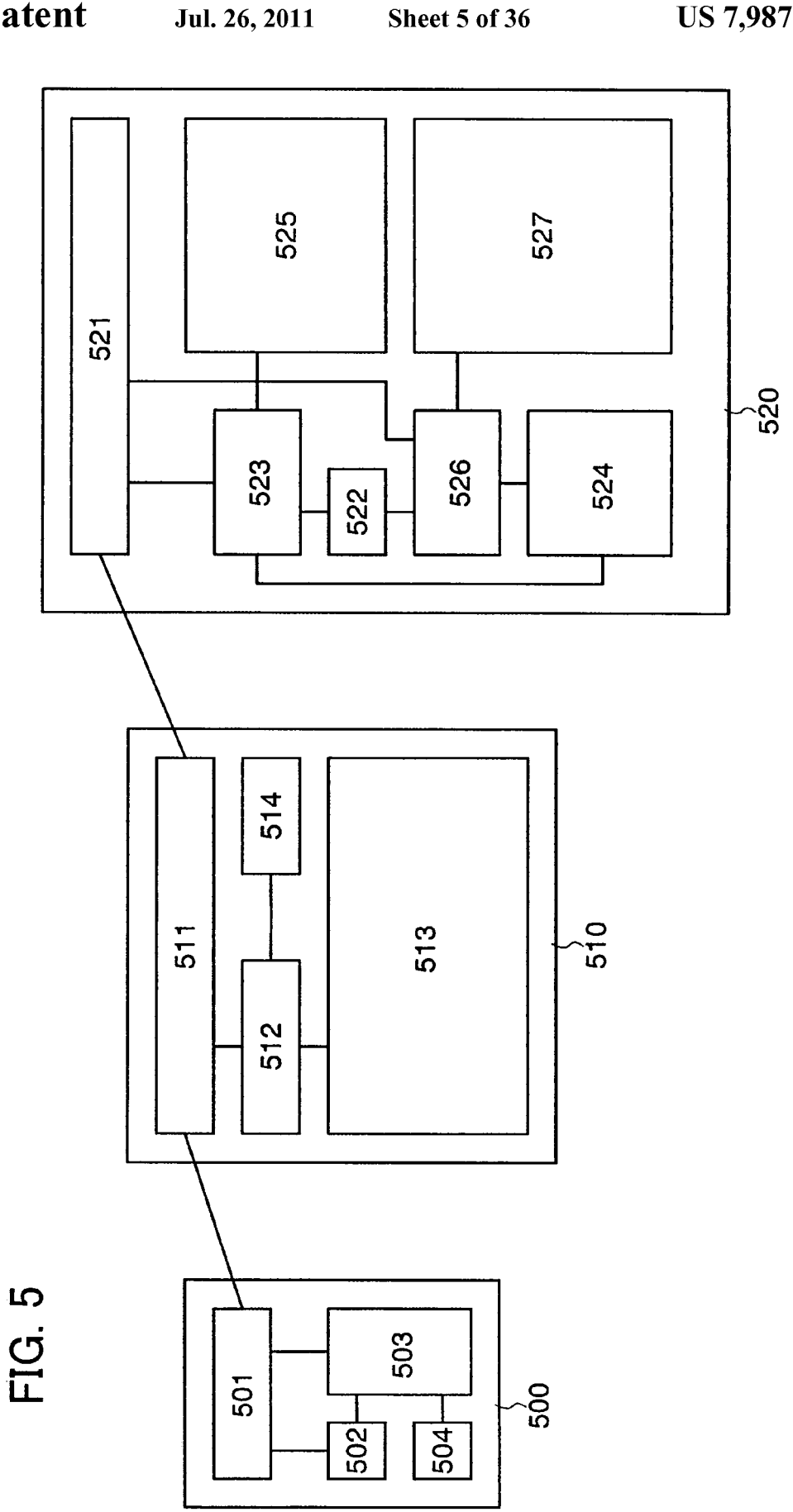
FIG. 5 is a diagram showing an example of a personal data management system of the present invention.

In FIG. 5, in a memory circuit 504 of a nonvolatile memory card 500 which a user possesses, deposit data such as deposit balances, a specific ID number of the nonvolatile memory card 500, and the like are stored in addition to personal data such as a name, an address, age, and a telephone number. Further, in a server 520, identification data is stored in an identification data storage portion 525, and deposit data not including personal data is stored in a deposit data storage portion 527, separately from the identification data storage portion 525. Personal data such as a name and deposit data are encoded and stored.

When a user holds the nonvolatile memory card 500 over a terminal 510 provided with a reader/writer, the terminal 510 senses the specific ID number stored in the nonvolatile memory card 500 and transmits the ID number to the server 520. Then, in the server 520, identification data stored in the identification data storage portion 525 and the received ID number are compared. When the corresponding ID number is stored in the identification data storage portion 525 of the server 520, personal data such as a name and deposit data which are encoded and stored in the memory circuit 504 of the nonvolatile memory card 500 are decoded by a decoding unit 522. Then, a comparison reference unit 526 judges whether the decoded deposit data matches the deposit data stored in the deposit data storage portion 527 of the server 520. Authentication is completed when deposit data corresponding to the deposit data read from the nonvolatile memory card 500 exists in the deposit data storage portion 527.

After authentication is completed, the decoded data is transmitted from the server 520 to the terminal 510, and deposit data and the like are displayed on a display portion 513 of the terminal 510. The user can pay or withdraw money by using an input unit 514 by referring to data displayed on the display portion 513. Then, when data is renewed by treatment such as payment or withdrawal of money, renewed data is transmitted from the terminal 510 to the nonvolatile memory card 500, encoded by an encoding unit 502, and stored in the memory circuit 504 through the data processing unit 503. Meanwhile, data stored in the memory circuit 504 is transmitted to the server 520 through the terminal 510, and deposit data stored in the deposit data storage portion 527 of the server 520 is also renewed. It is to be noted that data renewed by the terminal 510 may be transmitted to the nonvolatile memory card 500 and the server 520 at the same time, so that the deposit data stored in the deposit data storage portion 527 of the server 520 may also be renewed.

The personal data management system shown in FIG. 5 is effective when data such as deposit data is desired to be stored also by the company. This is because, in the case where deposit data and the like are stored only in the personal nonvolatile memory card, there can be damage when illegal rewriting is carried out without company's recognition. It is to be noted that deposit data stored in the deposit data storage portion 527 of the server 520 is data not including personal data. As a result, even if deposit data is leaked, an individual is not specified; therefore, risk of abuse of data is low.

Further, identification code and the deposit data stored in the server are made not to link with each other. In other words, it is preferable that the decoded data be compared with the deposit data stored in the deposit data storage portion 527 when encoded data is decoded by usage of the user. In this case, even if the ID number and the deposit data are leaked by illegal access to the server, concern that an individual is specified is reduced.

This embodiment mode can be freely combined with other embodiment modes in this specification.

Embodiment Mode 4

In this embodiment mode, a structure of a nonvolatile memory element included in a memory circuit of a nonvolatile memory card and an operation method thereof will be described.

Figure 16:
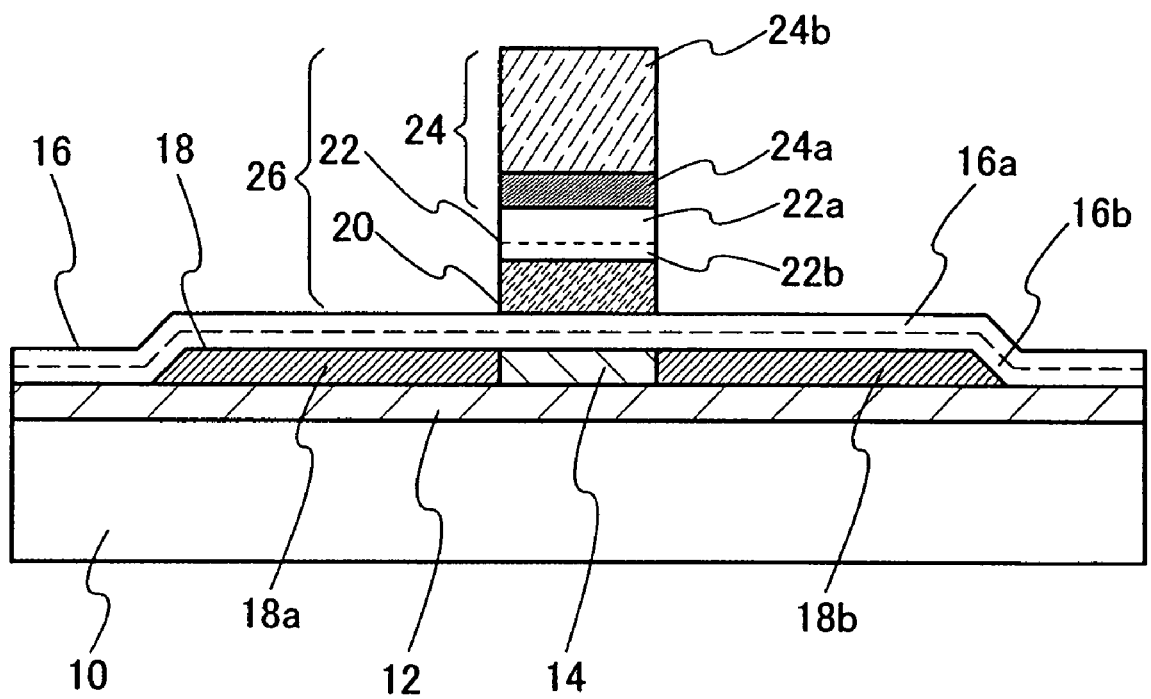
FIG. 16 is an explanatory view of a memory element in a nonvolatile memory card of the present invention.

FIG. 16 is a cross-sectional view for explaining a main structure of a memory circuit included in a nonvolatile memory card according to the present invention. FIG. 16 particularly shows a main part of a nonvolatile memory element included in the memory circuit. The nonvolatile memory element is formed using a substrate 10 having an insulating surface. As the substrate 10 having an insulating surface, a glass substrate, a quartz substrate, a sapphire substrate, a ceramic substrate, a metal substrate provided with an insulating film on the surface, or the like can be used.

A semiconductor layer 14 is formed over the substrate 10 having an insulating surface. A base insulating film 12 may be provided between the substrate 10 and the semiconductor layer 14. The base insulating film 12 prevents an impurity such as alkali metal from diffusing from the substrate 10 and contaminating the semiconductor layer 14. The base insulating film 12 may be provided as a blocking layer as appropriate.

The base insulating film 12 is formed by a CVD method, a sputtering method, or the like using an insulating material such as silicon oxide, silicon nitride, silicon oxynitride ($SiO_xN_y$) (x>y), or silicon nitride oxide ($SiN_xO_y$) (x>y). For example, when the base insulating film 12 is formed with a two-layer structure, a silicon nitride oxide film may be formed as a first insulating layer, and a silicon oxynitride film may be formed as a second insulating layer. Alternatively, a silicon nitride film may be formed as the first insulating layer, and a silicon oxide film may be formed as the second insulating layer.

The semiconductor layer 14 is preferably formed using a single crystal semiconductor or a polycrystalline semiconductor. For example, the semiconductor layer 14 can be formed as follows: a semiconductor layer is formed over the entire surface of the substrate 10 by a sputtering method, a plasma CVD method, or a low-pressure CVD method, and the semiconductor layer is crystallized and selectively etched. In other words, in order to separate elements, it is preferable to form an island-like semiconductor layer over the insulating surface and to form one or a plurality of nonvolatile memory elements using the island-like semiconductor layer. Silicon is preferable as a semiconductor material. Besides, a silicon-germanium semiconductor can also be used. As a crystallization method of the semiconductor layer, a laser crystallization method, a crystallization method by heat treatment using rapid thermal annealing (RTA) or an annealing furnace, a crystallization method using a metal element which promotes crystallization, or a method in which the above methods are combined can be employed. Alternatively, instead of such a thin film formation process, a so-called SOI (Silicon on Insulator) substrate in which a single crystal semiconductor layer is formed on an insulating surface may be used.

In such a manner, by separating the semiconductor layer formed over the insulating surface into the island-like semiconductor layers, elements can be effectively formed to be separated from each other, also in the case where a memory element array and a peripheral circuit are formed over the same substrate. In other words, also in the case where a memory element array in which writing or erasing needs to be performed at a voltage of approximately 10 to 20 V and a peripheral circuit which mainly performs input/output of data or controls a command while operating at a voltage of approximately 3 to 7 V are formed over the same substrate, mutual interference due to a difference of voltage applied to each element can be prevented.

A p-type impurity element may be added to the semiconductor layer 14. As the p-type impurity element, for example, boron may be added at a concentration of approximately $5 \times 10^{15}$ to $1 \times 10^{16}$ atoms/cm$^3$. This impurity element controls a threshold voltage of a transistor and effectively functions by being added to a channel formation region. The channel formation region is formed in a region which almost corresponds to a gate 26 which will be described later and is positioned between a pair of impurity regions 18 of the semiconductor layer 14.

The pair of impurity regions 18 functions as a source region and a drain region in the nonvolatile memory element. The pair of impurity regions 18 is formed by addition of phosphorus or arsenic which is an n-type impurity element at a concentration of appropriately $1 \times 10^{21}$ atoms/cm$^3$ at most.

Over the semiconductor layer 14, a first insulating film 16, a floating gate electrode 20, a second insulating film 22, and a control gate electrode 24 are formed. In this specification, a stacked structure from the floating gate electrode 20 to the control gate electrode 24 may be referred to as the gate 26.

The first insulating film 16 is formed using silicon oxide or a stacked structure of silicon oxide and silicon oxynitride. The first insulating film 16 may be formed by depositing an insulating film by a plasma CVD method or a low-pressure CVD method, but is preferably formed through solid phase oxidation or solid phase nitridation by plasma treatment. This is because an insulating film which is formed through oxidation or nitridation of the semiconductor layer (typically, a silicon layer) by plasma treatment has dense film quality, high withstand voltage, and high reliability. The first insulating film 16 is preferably strong since it is used as a tunnel insulating film for injecting electric charge to the floating gate electrode 20. The first insulating film 16 is preferably formed with a thickness of 1 to 20 nm, much preferably 3 to 6 nm. For example, in the case where the gate length is to be 600 nm, the first insulating film 16 can be formed with a thickness of 3 to 6 nm.

In the solid phase oxidation treatment or solid phase nitridation treatment by the plasma treatment, plasma is preferably used, which is excited by microwaves (typically, 2.45 GHz) and has an electron density of greater than or equal to $1 \times 10^{11}$ cm$^{-3}$ and less than or equal to $1 \times 10^{13}$ cm$^{-3}$ and electron temperatures of greater than or equal to 0.5 eV and less than or equal to 1.5 eV. This is done so that a dense insulating film is formed and a practical reaction speed is obtained in the solid phase oxidation treatment or solid phase nitridation treatment at temperatures of less than or equal to 500° C.

When the surface of the semiconductor layer 14 is oxidized by the plasma treatment, the plasma treatment is performed in an oxygen atmosphere (for example, an atmosphere containing oxygen (O$_2$) or dinitrogen monoxide (N$_2$O) and a rare gas (at least one of He, Ne, Ar, Kr, and Xe), or an atmosphere containing oxygen or dinitrogen monoxide, hydrogen (H$_2$), and a rare gas). Further, when the surface of the semiconductor layer 14 is nitrided by the plasma treatment, the plasma treatment is performed in a nitrogen atmosphere (for example, an atmosphere containing nitrogen (N$_2$) and a rare gas (at least one of He, Ne, Ar, Kr, and Xe), an atmosphere containing nitrogen, hydrogen, and a rare gas, or an atmosphere containing NH$_3$ and a rare gas). As the rare gas, Ar can be used, for example. Alternatively, a gas in which Ar and Kr are mixed may also be used.

Figure 15:
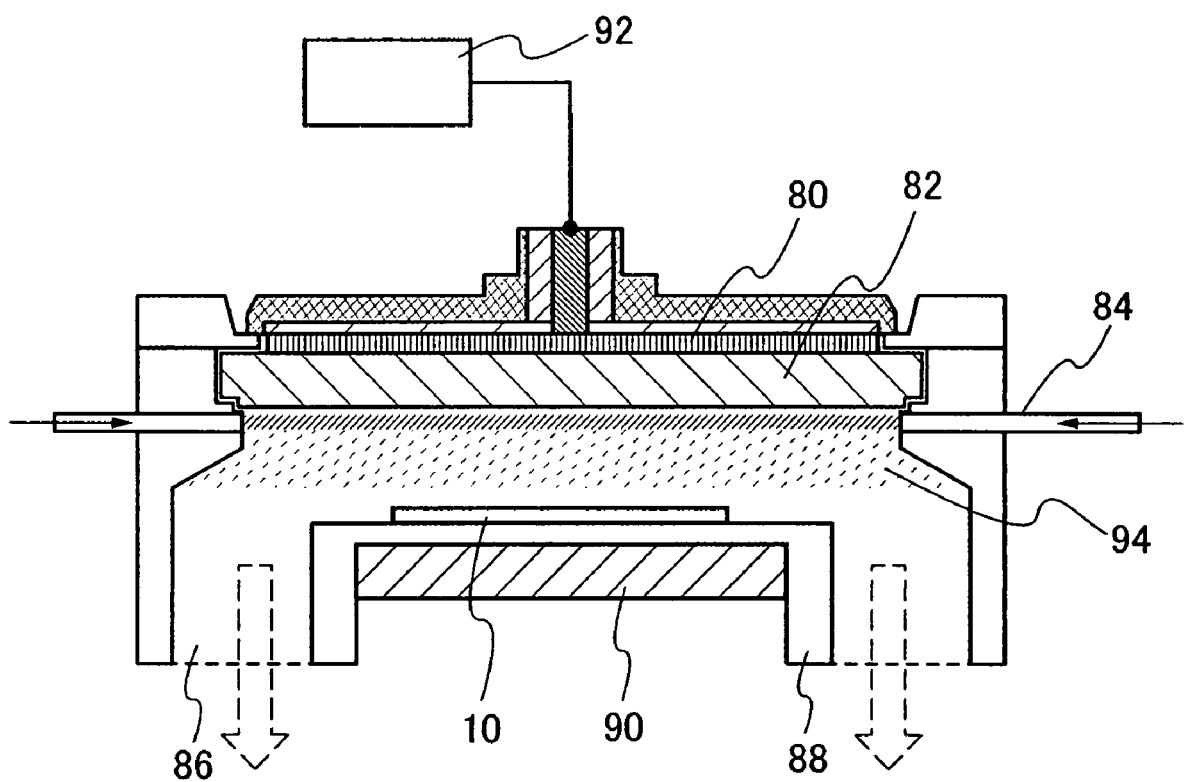
FIG. 15 is a view showing an example of a plasma treatment apparatus.

FIG. 15 shows a structural example of an apparatus for performing plasma treatment. The plasma treatment apparatus includes a support 88 on which the substrate 10 is to be arranged, a gas supplying portion 84 for introducing a gas, an exhaust port 86 connected to a vacuum pump for exhausting a gas, an antenna 80, a dielectric plate 82, and a microwave supplying portion 92 which supplies a microwave for plasma generation. In addition, the temperature of the substrate 10 can be controlled by a temperature controlling portion 90 provided for the support 88.

Hereinafter, plasma treatment will be described. It is to be noted that the plasma treatment includes oxidation treatment, nitridation treatment, oxynitridation treatment, hydrogenation treatment, and surface modification treatment performed to a semiconductor layer, an insulating film, and a conductive layer. For these treatment, a gas supplied from the gas supplying portion 84 may be selected in accordance with an intended purpose.

Oxidation treatment or nitridation treatment may be performed as follows. First, a processing chamber is made in vacuum and a gas containing oxygen or nitrogen for plasma treatment is introduced from the gas supplying portion 84. The substrate 10 is heated at room temperature or at temperatures of 100 to 550° C. by the temperature controlling portion 90. It is to be noted that the distance between the substrate 10 and the dielectric plate 82 is approximately 20 to 80 mm (preferably 20 to 60 mm). Next, microwaves are supplied from the microwave supplying portion 92 to the antenna 80. Then, the microwaves are introduced from the antenna 80 into the processing chamber through the dielectric plate 82; thus, plasma 94 is generated. When the plasma is excited by the introduced microwaves, plasma which has the low electron temperature (less than or equal to 3 eV, preferably less than or equal to 1.5 eV) and the high electron density (greater than or equal to $1 \times 10^{11}$ cm$^{-3}$) can be generated. With oxygen radicals (containing OH radicals in some cases) and/or nitrogen radicals (containing NH radicals in some cases) generated by this high-density plasma, the surface of the semiconductor layer can be oxidized or nitrided. A plasma treatment gas mixed with a rare gas such as argon enables oxygen radicals or nitrogen radicals to be generated efficiently due to excited species of a rare gas. In this method, through the effective use of active radicals excited by plasma, oxidation, nitridation, or oxynitridation by a solid phase reaction can be performed at low temperatures of less than or equal to 500° C.

In FIG. 16, as one preferable example of the first insulating film 16 formed by the plasma treatment, a silicon oxide layer 16a is formed over the semiconductor layer 14 with a thickness of 3 to 6 nm by the plasma treatment in an oxygen atmosphere, and the surface of the silicon oxide layer is nitrided in a nitrogen atmosphere to form a silicon layer containing oxygen and nitrogen (silicon oxynitride layer 16b). The surface of a silicon layer as a typical example of the semiconductor layer 14 is oxidized by plasma treatment, whereby a dense oxide film without distortions at the interface can be formed. Further, when a nitridation-treated layer is formed by nitridation of the oxide film by plasma treatment and replacement of oxygen on the surface with nitrogen, the oxide film can be further denser. Accordingly, an insulating film having high withstand voltage can be formed.

In any case, through the use of solid phase oxidation treatment or solid phase nitridation treatment by the plasma treatment as described above, an insulating film similar to a thermal oxide film, which is formed at 950° C. to 1050° C., can be obtained even with the use of a glass substrate having a temperature limit of less than or equal to 700° C. In other words, a highly reliable tunnel insulating film can be formed as the tunnel insulating film of the nonvolatile memory element.

The floating gate electrode 20 is formed over the first insulating film 16. The floating gate electrode 20 is preferably formed using a semiconductor material such as silicon (Si) or germanium (Ge). In addition, as the floating gate electrode 20, silicon nitride ($SiN_x$), silicon oxynitride ($SiN_xO_y$) (x>y), germanium nitride ($GeN_y$), or the like which can accumulate electric charge may also be used.

It is preferable that a band gap of a semiconductor material forming the floating gate electrode 20 be smaller than that of the semiconductor layer 14. For example, it is preferable that a band gap of a semiconductor material forming the floating gate electrode and a band gap of the semiconductor layer have a difference of 0.1 eV or more, and the former be smaller. This is because an energy level at the conduction band bottom of the floating gate electrode 20 that is lower than that of the semiconductor layer 14 can improve injectability of electric charge (electrons) and a charge storing property.

As the semiconductor material forming the floating gate electrode 20, such a material that makes barrier energy for electrons in the floating gate electrode 20, which is formed by the first insulating film 16, higher than barrier energy for electrons in the semiconductor layer 14, which is formed by the first insulating film 16, is preferable. This is in order to facilitate electric charge (electron) injection from the semiconductor layer 14 to the floating gate electrode 20 and prevent electric charge from going out from the floating gate electrode 20.

The semiconductor material for forming the floating gate electrode 20, which satisfies the above condition may be germanium or a germanium compound, typically. Silicon germanium is given as a typical germanium compound. In this case, preferably, greater than or equal to 10 atomic % of germanium is contained in silicon. With the concentration of germanium of less than 10 atomic %, effect as a constituent element is weakened, and a band gap does not get smaller effectively.

The floating gate is applied to a nonvolatile memory card of the present invention in order to accumulate electric charge. Of course, other semiconductor materials can also be employed to form the floating gate as long as they have similar functions. For example, a ternary semiconductor material containing germanium may be used. In addition, the semiconductor material may be hydrogenated. In addition, as a floating gate having a function as a charge accumulation layer of the nonvolatile memory element, a layer of an oxide or a nitride of germanium or a germanium compound, or a layer of an oxide or a nitride containing germanium or a germanium compound can be used instead.

The second insulating film 22 is formed by a low-pressure CVD method, a plasma CVD method, or the like using one or a plurality of layers of silicon oxide, silicon oxynitride ($SiO_xN_y$) (x>y), silicon nitride ($SiN_x$), silicon nitride oxide ($SiN_xO_y$) (x>y), aluminum oxide ($Al_xO_y$), and the like. The second insulating film 22 is formed with a thickness of 1 to 20 nm, preferably 5 to 10 nm. For example, an insulating film, in which a silicon nitride layer 22a is deposited with a thickness of 3 nm, and a silicon oxide layer 22b is deposited thereover with a thickness of 5 nm, can be used. In addition, the floating gate electrode 20 may be subjected to plasma treatment, and thus, a nitride film which is formed by nitriding the surface of the floating gate electrode 20 (for example, germanium nitride, in the case where germanium is used as the floating gate electrode 20) may be formed. In any case, when one or both of the sides, in which the first insulating film 16 and the second insulating film 22 are in contact with the floating gate electrode 20, is/are a nitride film or a layer subjected to nitridation treatment, the floating gate electrode 20 can be prevented from being oxidized.

The control gate electrode 24 is preferably formed using metal such as tantalum (Ta), tungsten (W), titanium (Ti), molybdenum (Mo), chromium (Cr), or niobium (Nb), or an alloy material or a compound material containing the metal as its main component. In addition, polycrystalline silicon to which an impurity element such as phosphorus is added can be used. Alternatively, the control gate electrode 24 may be formed using a stacked structure including one or a plurality of layers, such as a metal nitride layer 24a and a metal layer 24b formed using the above metal. As the metal nitride, tungsten nitride, molybdenum nitride, or titanium nitride can be used. By provision of the metal nitride layer 24a, adhesion of the metal layer 24b can be improved; therefore, the metal layer 24b can be prevented from peeling. In addition, since a metal nitride such as tantalum nitride has a high work function, the thickness of the first insulating film 16 can be thick by a synergistic effect with the second insulating film 22.

For electron injection to the floating gate electrode 20, there is a method utilizing thermoelectrons and a method utilizing F-N type tunnel current. In the case of a method utilizing thermoelectrons, thermoelectrons are generated by application of positive voltage to the control gate electrode 24 and high voltage to a drain. Accordingly, thermoelectrons can be injected to the floating gate electrode 20. In the case of a method utilizing F-N type tunnel current, positive voltage is applied to the control gate electrode 24, and electrons are injected from the semiconductor layer 14 to the floating gate electrode 20 by F-N type tunnel current.

FIG. 6A shows applied voltage when electrons are injected to the floating gate electrode 20 by F-N type tunnel current. Positive high voltage (10 to 20 V) is applied to the control gate electrode 24 while 0V is applied to the source region 18a and the drain region 18b. A high electric filed enables electrons of the semiconductor layer 14 to be injected to the first insulating layer 16, whereby F-N type tunnel current flows.

This state where data "0" is written can be detected as follows: it is detected by a sensing circuit that a transistor is not turned on when a gate voltage to turn on the nonvolatile memory element is applied in a state where electric charge is not stored in the floating gate electrode 20. Alternatively, the state where data "0" is written can be detected depending on whether the nonvolatile memory element is conducted by application of a bias voltage between the source region 18a and the drain region 18b so that the control gate electrode 24 is set at 0 V as shown in FIG. 6B.

FIG. 7A shows a state where electric charge is discharged from the floating gate electrode 20 and data is erased from the nonvolatile memory element. In this case, a negative bias voltage is applied to the control gate electrode 24, and F-N type tunnel current is flowed between the semiconductor layer 14 and the floating gate electrode 20, whereby data is erased. Alternatively, as shown in FIG. 7B, a negative bias voltage may be applied to the control gate electrode 24, and a positive high voltage may be applied to the source region 18a, so that F-N type tunnel current is generated and electrons may be taken to the source region 18a side.

Figure 8:
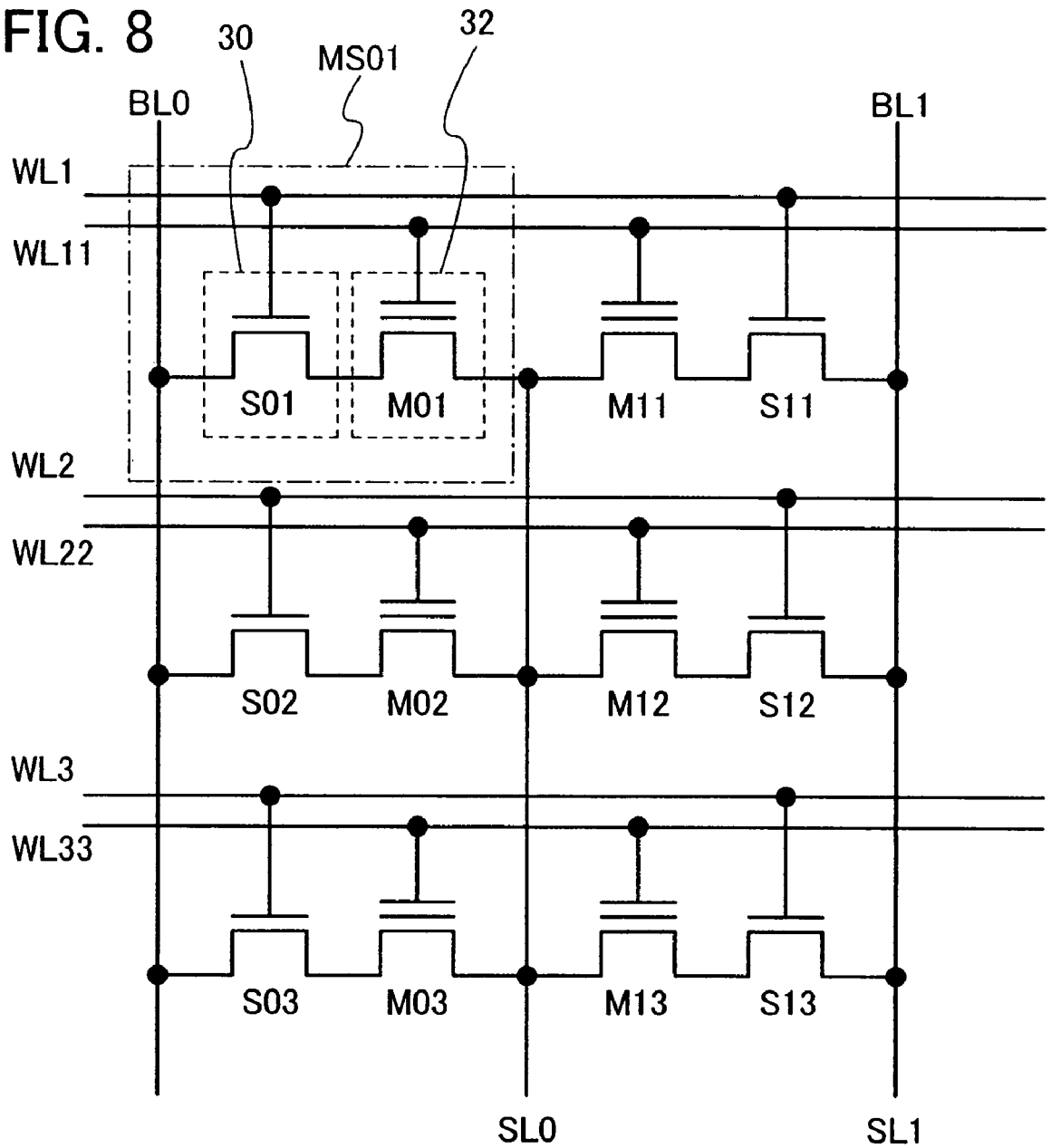
FIG. 8 is an explanatory diagram of a memory element in a nonvolatile memory card of the present invention.

With the use of such a nonvolatile memory element, various modes of memory circuits can be obtained. FIG. 8 shows an example of an equivalent circuit of a nonvolatile memory cell array. A memory cell MS01 which stores 1-bit information includes a selection transistor S01 and a nonvolatile memory element M01. The selection transistor S01 is inserted in series between a bit line BL0 and the nonvolatile memory element M01, and a gate of the selection transistor S01 is connected to a word line WL1. A gate of the nonvolatile memory element M01 is connected to a word line WL11. When data is written in the nonvolatile memory element M01, H level voltage is applied to the word line WL1 and the bit line BL0, L level voltage is applied to a bit line BL1, and high voltage is applied to the word line WL11, whereby electric charge is accumulated in the floating gate electrode as described above. When data is erased, H level voltage may be applied to the word line WL1 and the bit line BL0, and high voltage of negative polarity may be applied to the word line WL11.

In this memory cell MS01, the selection transistor S01 and the nonvolatile memory element M01 are formed using semiconductor layers 30 and 32, which are formed separately into island-shapes over an insulating surface, respectively. Therefore, when an element separation region is not particularly provided, interference with other selection transistors or nonvolatile memory elements can be prevented. In addition, both the selection transistor S01 and the nonvolatile memory element M01 in the memory cell MS01 are n-channel type, so that a wiring connecting these two elements can be omitted by formation of both the elements using one island-like semiconductor layer.

Figure 9:
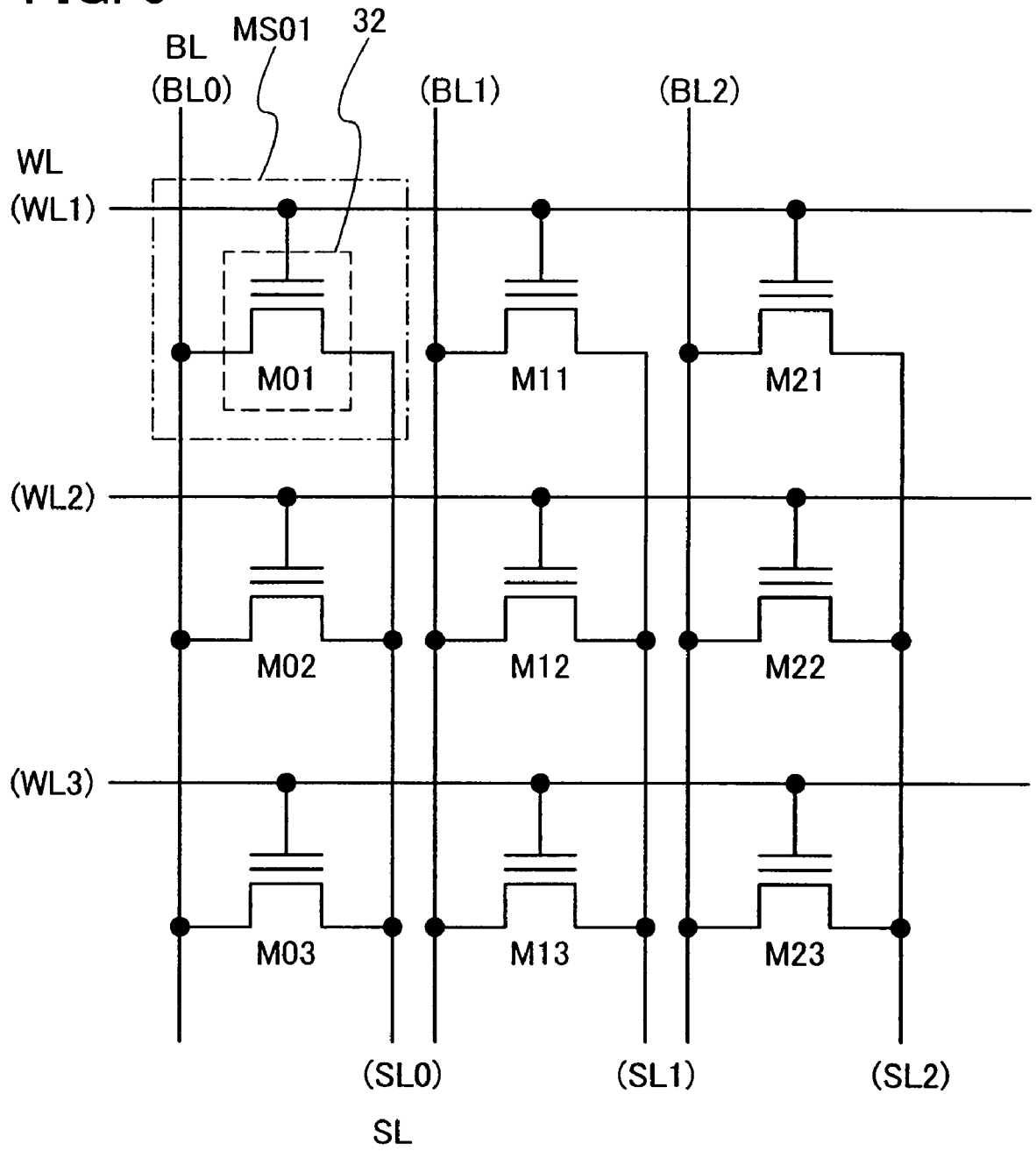
FIG. 9 is an explanatory diagram of a memory element in a nonvolatile memory card of the present invention.

FIG. 9 shows a NOR type equivalent circuit in which a nonvolatile memory element is directly connected to a bit line. In this memory cell array, a word line WL and a bit line BL are intersected, and the nonvolatile memory element is arranged at the intersection. In the NOR type, a drain of each nonvolatile memory element is connected to the bit line BL. A source of the nonvolatile memory element is commonly connected to a source line SL.

Also in this case, in a memory cell MS01, a nonvolatile memory element M01 is formed using a semiconductor layer 32, which is formed separately into a island-shape over an insulating surface. Therefore, when an element separation region is not particularly provided, interference with other nonvolatile memory elements can be prevented. Further, a plurality of nonvolatile memory elements (such as M01 to M23 shown in FIG. 9) are used as one block, and an erasing operation can be performed based on the block by formation of the nonvolatile memory elements using one island-like semiconductor layer.

For example, an operation of the NOR type is as follows. In data writing, 0 V is applied to the source line SL, high voltage is applied to the word line WL which is selected for data-writing, and a potential corresponding to data "0" or "1" is applied to the bit line BL. For example, H level and L level potentials corresponding to "0" and "1" respectively are applied to the bit line BL Hot electrons are generated around the drain in the nonvolatile memory element to which H level potential is applied so that "0" data is written, and the hot electrons are injected to the floating gate electrode. In the case of "1" data, such electron injection is not caused.

In the memory cell to which "0" data is given, hot electrons are generated around the drain by a strong lateral electric field between the drain and the source, and the hot electrons are injected to the floating gate electrode. This state where the electrons are injected to the floating gate electrode and threshold voltage is increased is "0". In the case of "1" data, hot electrons are not generated and electrons are not injected to the floating gate electrode, whereby a state where threshold voltage is low, that is, an erasing state, can be retained.

When data is erased, a positive voltage of approximately 10 V is applied to the source line SL, and the bit line BL is made in a floating state. Then, high voltage of negative polarity is applied to the word line WL (high voltage of negative polarity is applied to the control gate electrode), and electrons are taken from the floating gate electrode. Therefore, an erasing state of data "1" is obtained.

Data is read as follows: 0 V is applied to the source line SL and approximately 0.8 V is applied to the bit line BL, and reading voltage that is set to be an intermediate value of threshold values of data "0" and "1" is applied to the selected word line WL, and then, it is detected by a sense amplifier connected to the bit line BL whether current is led-in in the nonvolatile memory element.

Figure 10:
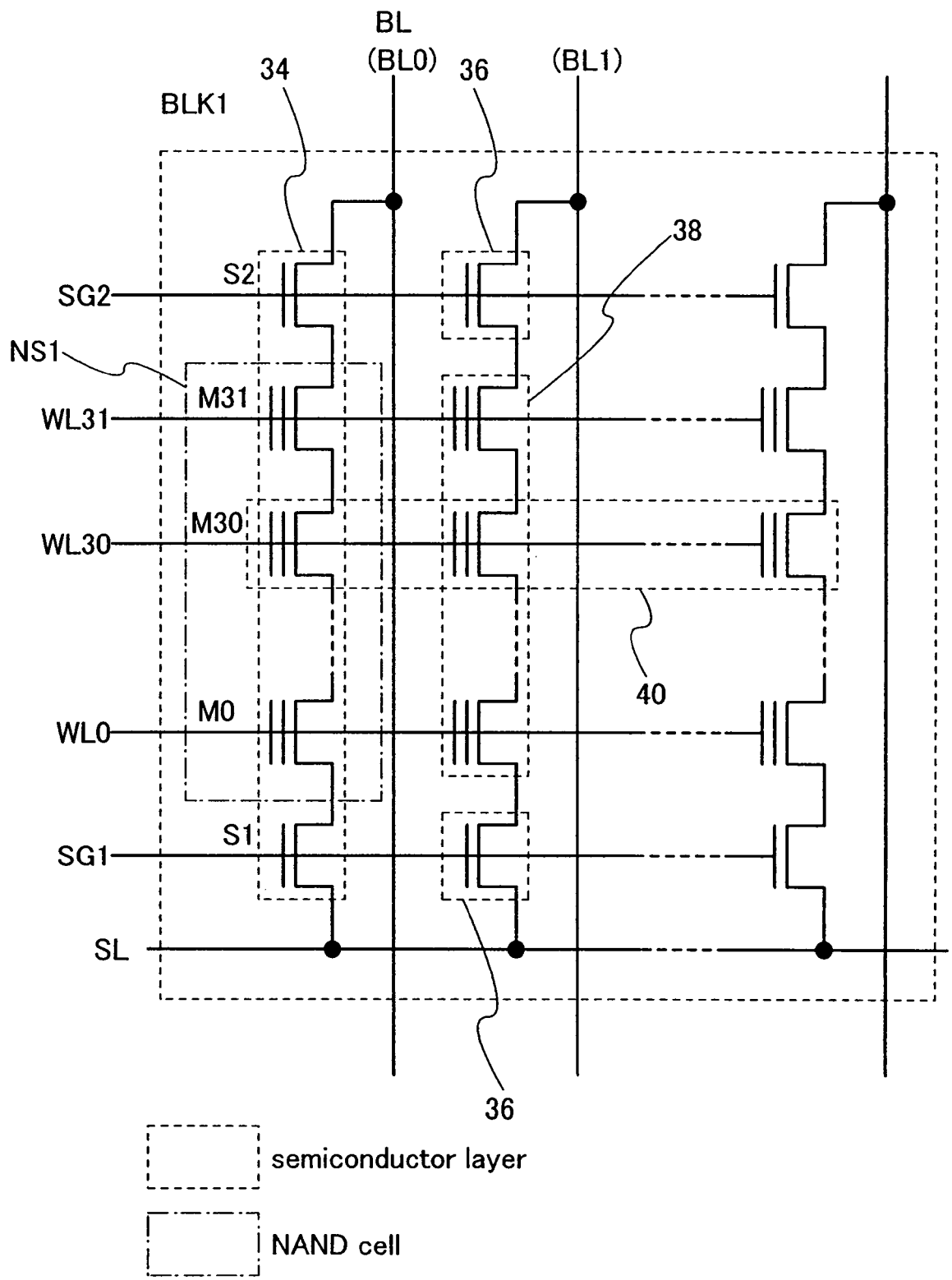
FIG. 10 is an explanatory diagram of a memory element in a nonvolatile memory card of the present invention.

FIG. 10 shows an equivalent circuit of a NAND type memory cell array. A NAND cell NS1 in which a plurality of nonvolatile memory elements are connected in series is connected to a bit line BL. A plurality of NAND cells form a block BLK. A block BLK1 shown in FIG. 10 has 32 word lines (word lines WL0 to WL31). To the nonvolatile memory elements arranged in the same row of the block BLK1, a word line corresponding to this row is commonly connected.

In this case, selection transistors S1 and S2 and the nonvolatile memory elements M0 to M31 are connected in series; thus, they may be formed using one semiconductor layer 34 as one group. Accordingly, a wiring connecting the nonvolatile memory elements can be omitted, whereby integration can be achieved. In addition, the adjacent NAND cells can be easily separated from each other. Further, a semiconductor layer 36 of the selection transistors S1 and S2 and a semiconductor layer 38 of the NAND cell may be separately formed. In an erasing operation in which electric charge is taken from each floating gate of the nonvolatile memory elements M0 to M31, the erasing operation can be performed based on the NAND cell. Further, the nonvolatile memory elements commonly connected to one word line (such as a row of M30) may be formed using one semiconductor layer 40.

A writing operation is carried out after the NAND cell NS1 is made in an erasing state, that is, a threshold value of each nonvolatile memory element of the NAND cell NS1 is made in a negative voltage state. Writing is sequentially performed from the memory element M0 on the source line SL side. Writing to the memory element M0 will be described as an example approximately as follows.

In FIG. 11A, when "0" is written, for example, Vcc (power source voltage) is applied to a selection gate line SG2 to turn on the selection transistor S2 and 0 V (ground voltage) is applied to the bit line BL0. 0 V is applied to a selection gate line SG1 to turn off the selection transistor S1. Then, high voltage Vpgm (approximately 20 V) is applied to a word line WL0 of a nonvolatile memory element M0, and intermediate voltage Vpass (approximately 10 V) is applied to other word lines. Since 0 V is applied to the bit line BL0, potential of a channel formation region of the selected nonvolatile memory element M0 is 0 V. Further, since a potential difference between the word line WL0 and the channel formation region is large, electrons are injected to the floating gate of the nonvolatile memory element M0 by F-N tunnel current as described above. Accordingly, threshold voltage of the nonvolatile memory element M0 is in a positive state (a state where "0" is written).

On the other hand, when "1" is written, for example, as shown in FIG. 11B, Vcc (power source voltage) is applied to the bit line BL. Since Vcc is applied to the selection gate line SG2, the selection transistor S2 is cut off in the case of Vcc-Vth (Vth is threshold voltage of the selection transistor S2). Therefore, a channel formation region of a nonvolatile memory element M0 is in a floating state. Next, when high voltage Vpgm (20 V) is applied to the word line WL0 and intermediate voltage Vpass (10 V) is applied to other word lines, voltage of the channel formation region is increased from Vcc-Vth to, for example, approximately 8 V by capacitive coupling of each word line and channel formation region. Differing from writing of "0", a potential difference between the word line WL0 and the channel formation region is small since voltage of the channel formation region is increased to be high. Therefore, electron injection due to F-N tunnel current is not caused in the floating gate of the nonvolatile memory element M0. Accordingly, the threshold value of a nonvolatile memory element M1 is kept in a negative state (a state where "1" is written).

In the case of the erasing operation, as shown in FIG. 12A, high voltage of negative polarity (Vers) is applied to all the word lines in the selected block. The bit line BL and the source line SL are made in a floating state. Thus, electrons in the floating gate in all the memory cells in the block are discharged to the semiconductor layer by the tunnel current. Consequently, the threshold voltage of these memory cells is shifted to a negative direction.

Figure 13:
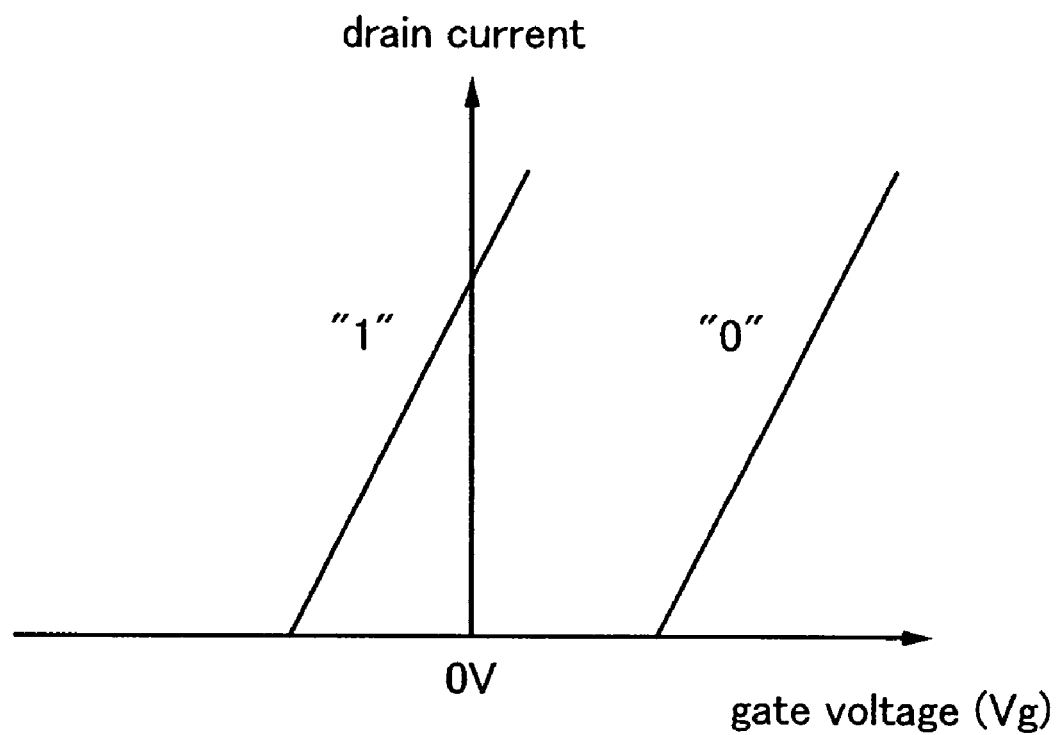
FIG. 13 is an explanatory diagram of a memory element in a nonvolatile memory card of the present invention.

In the reading operation shown in FIG. 12B, voltage Vr (for example, 0 V) is applied to the word line WL0 of the nonvolatile memory element M0 which is selected to be read, whereas intermediate voltage Vread for reading which is slightly higher than power source voltage is applied to the word lines WL1 to WL31 of the memory cells which are not selected and the selection gate lines SG1 and SG2. That is, as shown in FIG. 13, the memory elements other than the selected memory element each function as a transfer transistor. Accordingly, it is detected whether current flows in the nonvolatile memory element M0 which is selected to be read. In other words, when data stored in the nonvolatile memory element M0 is "0", the nonvolatile memory element M0 is off and the bit line BL does not discharge electricity. On the other hand, when data stored in the nonvolatile memory element M0 is "1", the nonvolatile memory element M0 is on and the bit line BL discharges electricity.

Figure 14:
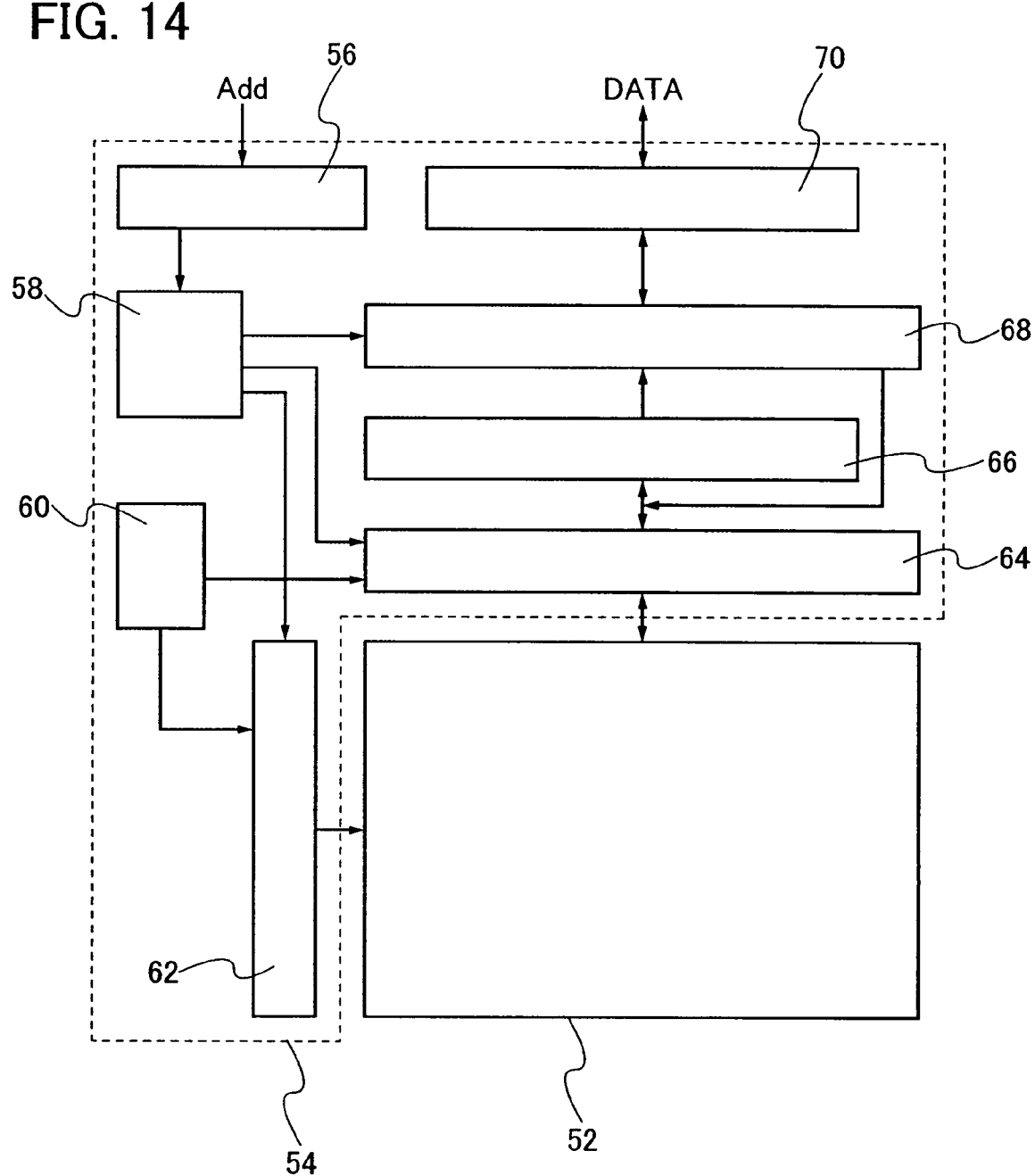
FIG. 14 is an explanatory diagram of a memory element in a nonvolatile memory card of the present invention.

FIG. 14 shows an example of a block diagram of a memory circuit in the nonvolatile memory card. In the memory circuit, a memory cell array 52 and a peripheral circuit 54 are formed over the same substrate. The memory cell array 52 has a configuration as shown in FIG. 8, 9, or 10. The peripheral circuit 54 has the following configuration.

A row decoder 62 for selecting a word line and a column decoder 64 for selecting a bit line are provided in the periphery of the memory cell array 52. An address is transmitted to a control circuit 58 through an address buffer 56, and an internal row address signal and an internal column address signal are transferred to the row decoder 62 and the column decoder 64, respectively.

Power source potential is increased to be used for data writing and data erasing. Therefore, a boosting circuit 60, which is controlled by the control circuit 58 depending on the operation mode, is provided. Output of the boosting circuit 60 is supplied to a word line WL or a bit line BL through the row decoder 62 or the column decoder 64. Data output from the column decoder 64 is input to a sense amplifier 66. The data which is read by the sense amplifier 66 is retained in a data buffer 68, and the data is accessed randomly by the control of the control circuit 58 to be output through a data input/output buffer 70. Data to be written is once retained in the data buffer 68 through the data input/output buffer 70 and transferred to the column decoder 64 by the control of the control circuit 58.

In such a manner, it is necessary to use potential that is different from the power source potential in the memory cell array 52. Therefore, it is desirable that at least the memory cell array 52 and the peripheral circuit 54 be electrically insulated and isolated. In this case, as in embodiment modes which will be described later, the nonvolatile memory element and a transistor in the peripheral circuit are each formed using a semiconductor layer formed over an insulating surface, whereby the memory element and the peripheral circuit are easily insulated and isolated. Accordingly, malfunction is eliminated and a nonvolatile memory card with low power consumption can be obtained.

Hereinafter, a nonvolatile memory card according to the present invention will be described in detail in the following embodiment modes. In a structure of the present invention, which will be described below, reference numerals denoting the same portions are used in common in different drawings, and repeated explanation in such a case may be omitted.

This embodiment mode can be freely combined with other embodiment modes in this specification.

Embodiment Mode 5

In this embodiment mode, an example of a nonvolatile memory card will be described with reference to the drawings. Here, in the nonvolatile memory card, a nonvolatile memory element included in a memory portion and an element such as a transistor included a logic portion, which is provided over the same substrate as the memory portion and controls the memory portion or the like, are formed at the same time.

First, FIG. 8 shows a schematic diagram of the memory portion in the nonvolatile memory card.

The memory portion shown in this embodiment includes a plurality of memory cells each having a control transistor S and a nonvolatile memory element M. In FIG. 8, a control transistor S01 and a nonvolatile memory element M01 form one memory cell. Similarly, pairs of a control transistor S02 and a nonvolatile memory element M02, a control transistor S03 and a nonvolatile memory element M03, a control transistor S11 and a nonvolatile memory element M11, a control transistor S12 and a nonvolatile memory element M12, and a control transistor S13 and a nonvolatile memory element M13 each form a memory cell.

A gate electrode of the control transistor S01 is connected to a word line WL1, one of a source and a drain is connected to a bit line BL0, and the other is connected to a source or a drain of the nonvolatile memory element M01. Further, a gate electrode of the nonvolatile memory element M01 is connected to a word line WL11, one of a source and a drain is connected to a source or a drain of the control transistor S01, and the other is connected to a source line SL.

The control transistor provided in the memory portion has high drive voltage compared to the transistor provided in the logic portion. Therefore, a gate insulating film and the like of the transistor provided in the memory portion and the transistor provided in the logic portion are preferably formed with different thicknesses. For example, when drive voltage is low and variation in threshold voltage is desired to be reduced, a thin film transistor in which a gate insulating film is thin is preferably provided, whereas, when drive voltage is high and high withstand voltage of a gate insulating film is required, a thin film transistor in which a gate insulating film is thick is preferably provided.

Figure 23:
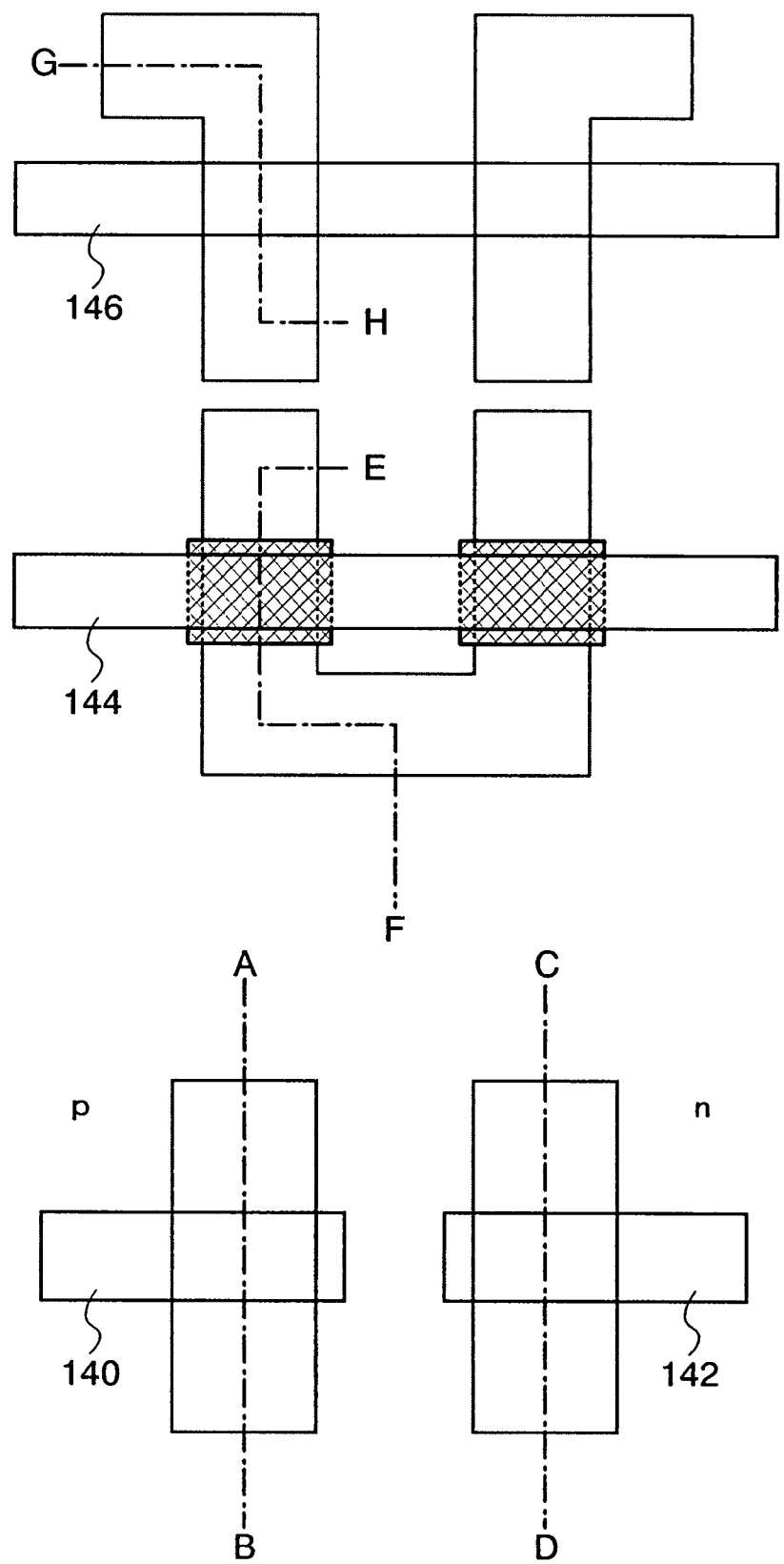
FIG. 23 is an explanatory view of a memory element in a nonvolatile memory card of the present invention.
Figure 24:
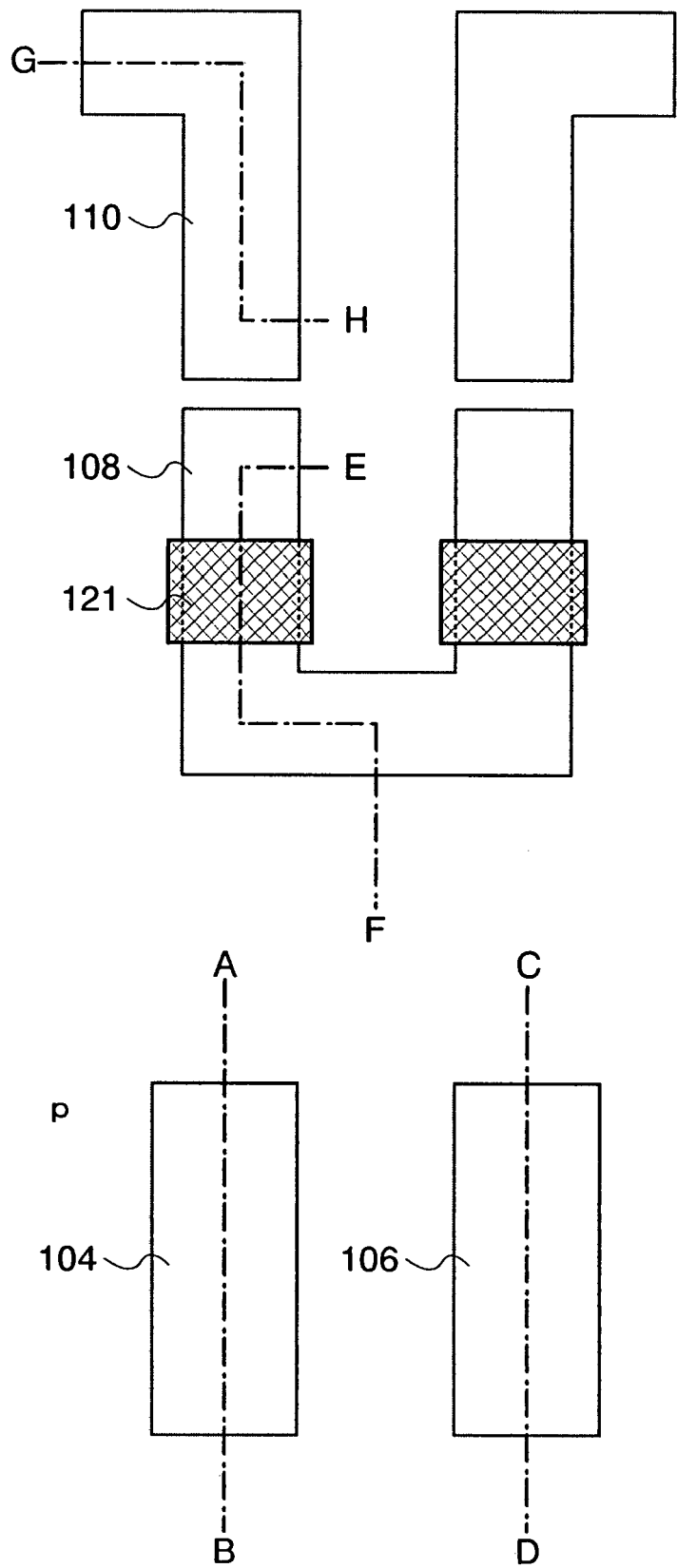
FIG. 24 is an explanatory view of a memory element in a nonvolatile memory card of the present invention.

Therefore, this embodiment mode will hereinafter describe, with reference to the drawings, a case where a thin insulating film is formed in the transistor in the logic portion in which drive voltage is low and variation in threshold voltage is desirably reduced, and a thick insulating film is formed in the transistor in the memory portion in which drive voltage is high and high withstand voltage of a gate insulating film is required. FIGS. 22 to 24 show top views, and FIGS. 18A to 18C, 19A to 19C, 20A to 20C, and 21A to 21C show cross-sectional views taken along lines A-B, C-D, E-F, and G-H of FIGS. 22 to 24. The portion between A and B and the portion between C and D each show a thin film transistor provided in the logic portion, the portion between E and F shows a non-volatile memory element provided in the memory portion, and the portion between G and H shows a thin film transistor provided in the memory portion. In addition, this embodiment mode will describe a case where the thin film transistor provided in the portion between A and B is a p-channel type, the thin film transistors provided in the portion between C and D and the portion between G and H are an n-channel type, and electrons are used for carrier movement in the nonvolatile memory element provided in the portion between E and F. However, the nonvolatile memory card of the present invention is not limited thereto.

First, island-like semiconductor layers 104, 106, 108, and 110 are formed over a substrate 100 with an insulating film 102 interposed therebetween. First insulating films 112, 114, 116, and 118 are formed so as to cover the island-like semiconductor layers 104, 106, 108, and 110, respectively. Then, a charge accumulation layer 120 (here, a film containing germanium (Ge) as its main component) which functions as a floating gate of a nonvolatile memory element is formed so as to cover the first insulating films 112, 114, 116, and 118 (refer to FIG. 18A). The island-like semiconductor layers 104, 106, 108, and 110 can be provided as follows: an amorphous semiconductor layer is formed using a material containing silicon (Si) as its main component (such as $Si_xGe_{1-x}$) by a sputtering method, an LPCVD method, a plasma CVD method, or the like over the insulating film 102 which is formed over the substrate 100 in advance, and the amorphous semiconductor layer is crystallized and selectively etched. The amorphous semiconductor layer can be crystallized by a laser crystallization method, a thermal crystallization method using RTA or an annealing furnace, a thermal crystallization method using a metal element which promotes crystallization, a method in which the above methods are combined, or the like.

When crystallization or recrystallization of the semiconductor layer is performed by laser beam irradiation, an LD-pumped continuous wave (CW) laser ($YVO_4$, the second harmonic (wavelength: 532 nm)) can be used as a laser beam source. The wavelength is not necessarily limited to the second harmonic; however, the second harmonic is superior to other higher harmonics in terms of energy efficiency. When the semiconductor layer is irradiated with a CW laser beam, the semiconductor layer continuously receives energy; therefore, once the semiconductor layer is melted, the melted state can be continuous. Moreover, it is possible to move a solid-liquid interface of the semiconductor layer by scanning of a CW laser beam and to form a crystal grain which is elongated in one direction along this scanning direction. A solid-state laser is used because its output is so stable that a stable process can be expected as compared to a gas laser or the like. Not only a CW laser but also a pulsed laser with a repetition rate of 10 MHz or more can be used. In the case of a pulsed laser with a high repetition rate, when the pulse interval of the laser beam is shorter than the period after the semiconductor layer is melted and before the melted semiconductor layer is solidified, the semiconductor layer can be maintained in a melted state at all times. Also, by movement of the solid-liquid interface, a semiconductor layer including a crystal grain which is elongated in one direction can be formed. Other CW lasers or pulsed lasers with a repetition rate of 10 MHz or more can also be used. For example, as the gas laser, an Ar laser, a Kr laser, a $CO_2$ laser, or the like is given. As the solid-state laser, a YAG laser, a YLF laser, a $YAlO_3$ laser, a $GdVO_4$ laser, a KGW laser, a KYW laser, an alexandrite laser, a Ti:sapphire laser, a $Y_2O_3$ laser, a $YVO_4$ laser, or the like is given. A YAG laser, a $Y_2O_3$ laser, a $GdVO_4$ laser, a $YVO_4$ laser, or the like is also called a ceramic laser. As a metal vapor laser, a helium-cadmium laser or the like is given. Moreover, oscillation of a laser beam with $TEM_{00}$ (single transverse mode) in a laser oscillator is preferable because the energy homogeneity of a linear beam spot on an irradiation surface can be improved. In addition, a pulsed excimer laser may also be used.

As the substrate 100, a glass substrate, a quartz substrate, a metal substrate (such as a ceramic substrate or a stainless steel substrate), or a semiconductor substrate such as a Si substrate can be used. In addition, as a plastic substrate, a substrate formed using polyethylene terephthalate (PET), polyethylene naphthalate (PEN), polyether sulfone (PES), acrylic, or the like can be used.

The insulating film 102 is formed by a CVD method, a sputtering method, or the like using an insulating material such as silicon oxide, silicon nitride, silicon oxynitride ($SiO_xN_y$) (x>y), or silicon nitride oxide ($SiN_xO_y$) (x>y). For example, in the case of the insulating film 102 with a two-layer structure, a silicon nitride oxide film may be formed as a first insulating layer, and a silicon oxynitride film may be formed as a second insulating layer. Alternatively, a silicon nitride film may be formed as the first insulating layer, and a silicon oxide film may be formed as the second insulating layer. Through formation of the insulating film 102 functioning as a blocking layer, an element formed thereover can be prevented from being adversely affected due to alkali metal such as Na or alkaline earth metal from the substrate 100. When the substrate 100 is formed using quartz, the insulating film 102 may be omitted.

The first insulating films 112, 114, 116, and 118 can be formed through heat treatment, plasma treatment, or the like performed to the semiconductor layers 104, 106, 108, and 110. For example, oxidation treatment, nitridation treatment, or oxynitridation treatment is performed to the semiconductor layers 104, 106, 108, and 110 by high-density plasma treatment, whereby the first insulating films 112, 114, 116, and 118 formed using an oxide film, a nitride film, or an oxynitride film are formed over the semiconductor layers 104, 106, 108, and 110, respectively. It is to be noted that the first insulating films 112, 114, 116, and 118 may also be formed by a plasma CVD method or a sputtering method.

For example, in the case where oxidation treatment or nitridation treatment is performed using a semiconductor layer containing Si as its main component as each of the semiconductor layers 104, 106, 108, and 110 by high-density plasma treatment, a silicon oxide ($SiO_x$) film or a silicon nitride ($SiN_x$) film is formed as each of the first insulating films 112, 114, 116, and 118. Moreover, after oxidation treatment is performed to the semiconductor layers 104, 106, 108, and 110 by high-density plasma treatment, nitridation treatment may be performed by performing high-density plasma treatment again. In this case, a silicon oxide film is formed to be in contact with each of the semiconductor layers 104, 106, 108, and 110 and a film containing oxygen and nitrogen (hereinafter referred to as a silicon oxynitride film) is formed over the silicon oxide film, whereby a stack of the silicon oxide film and the silicon oxynitride film is formed as each of the first insulating films 112, 114, 116, and 118.

Here, the first insulating films 112, 114, 116, and 118 are each formed with a thickness of 1 to 10 nm, preferably 1 to 5 nm. For example, oxidation treatment is performed to the semiconductor layers 104, 106, 108, and 110 by high-density plasma treatment, whereby a silicon oxide film with a thickness of approximately 5 nm is formed over each surface of the semiconductor layers 104, 106, 108, and 110. Thereafter, nitridation treatment is performed by high-density plasma treatment, whereby a silicon oxynitride film with a thickness of approximately 2 nm is formed over the surface of the silicon oxide film. In this case, the silicon oxide film formed over each surface of the semiconductor layers 104, 106, 108, and 110 has a thickness of approximately 3 nm. This is because the thickness of the silicon oxide film is reduced by the thickness of the formed silicon oxynitride film. Moreover, at this time, the oxidation treatment and the nitridation treatment by high-density plasma treatment are preferably performed continuously without exposure to the air. By performing the high-density plasma treatment continuously, prevention of an impurity mixture and improvement in production efficiency can be achieved.

In the case where the semiconductor layers are oxidized by high-density plasma treatment, the plasma treatment is performed in an oxygen atmosphere (for example, an atmosphere containing oxygen ($O_2$) or dinitrogen monoxide ($N_2O$) and a rare gas (at least one of He, Ne, Ar, Kr, and Xe), or an atmosphere containing oxygen or dinitrogen monoxide, hydrogen ($H_2$), and a rare gas). On the other hand, in the case where the semiconductor layers are nitrided by high-density plasma treatment, the plasma treatment is performed in a nitrogen atmosphere (for example, an atmosphere containing nitrogen ($N_2$) and a rare gas (at least one of He, Ne, Ar, Kr, and Xe), an atmosphere containing nitrogen, hydrogen, and a rare gas, or an atmosphere containing $NH_3$ and a rare gas).

As the rare gas, Ar can be used, for example. Alternatively, a gas in which Ar and Kr are mixed may also be used. In the case where high-density plasma treatment is performed in a rare gas atmosphere, the first insulating films 112, 114, 116, and 118 may contain the rare gas (at least one of He, Ne, Ar, Kr, and Xe) used in the plasma treatment. When Ar is used, the first insulating films 112, 114, 116, and 118 may contain Ar.

Moreover, the high-density plasma treatment is performed in an atmosphere containing the aforementioned gas with an electron density of greater than or equal to $1\times10^{11}$ cm$^{-3}$ and plasma electron temperatures of less than or equal to 1.5 eV. More specifically, the electron density is greater than or equal to $1\times10^{11}$ cm$^{-3}$ and less than or equal to $1\times10^{13}$ cm$^{-3}$, and the plasma electron temperature is greater than or equal to 0.5 eV and less than or equal to 1.5 eV. Since the plasma electron density is high and the electron temperature around an object to be processed formed over the substrate 100 (here, the semiconductor layers 104, 106, 108, and 110) is low, plasma damage to the object to be processed can be prevented. Moreover, since the plasma electron density is as high as greater than or equal to $1\times10^{11}$ cm$^{-3}$, an oxide film or a nitride film formed by oxidizing or nitriding the object to be processed by using the plasma treatment can be dense and superior in uniformity of its thickness and the like compared to a film formed by a CVD method, a sputtering method, or the like.

Furthermore, since the plasma electron temperature is as low as less than or equal to 1.5 eV, oxidation treatment or nitridation treatment can be performed at lower temperature than that in the conventional plasma treatment or thermal oxidation method. For example, even plasma treatment at temperatures lower than the distortion point of a glass substrate by 100° C. or more can sufficiently perform oxidation treatment or nitridation treatment. As the frequency for forming plasma, a high frequency such as a microwave (for example, 2.45 GHz) can be used.

In this embodiment mode, when oxidation treatment is performed to the object to be processed by high-density plasma treatment, a mixed gas of oxygen ($O_2$), hydrogen ($H_2$), and argon (Ar) is introduced. Here, as a mixed gas, 0.1 to 100 sccm of oxygen, 0.1 to 100 sccm of hydrogen, and 100 to 5000 sccm of argon may be introduced. The mixed gas is preferably introduced at a ratio of 1:1:100 (oxygen:hydrogen:argon). For example, 5 sccm of oxygen, 5 sccm of hydrogen, and 500 sccm of argon may be introduced.

In addition, when nitridation treatment is performed by high-density plasma treatment, a mixed gas of nitrogen ($N_2$) and argon (Ar) is introduced. As a mixed gas used here, 20 to 2000 sccm of nitrogen and 100 to 10000 sccm of argon may be introduced. For example, 200 sccm of nitrogen and 1000 sccm of argon may be introduced.

In this embodiment mode, the first insulating film 116 formed over the semiconductor layer 108 in the memory portion functions as a tunnel oxide film in a nonvolatile memory element which will be completed later. Therefore, the thinner the first insulating film 116 is, the more easily the tunnel current flows, which allows a higher-speed operation as a memory. Further, as the first insulating film 116 is thinner, electric charge can be accumulated at lower voltage in a floating gate which will be formed later; therefore, power consumption of the nonvolatile memory card can be reduced. Accordingly, the first insulating films 112, 114, 116, and 118 are preferably formed thinly.

In general, a thermal oxidation method is given as a method for forming a thin insulating film over a semiconductor layer. However, when a substrate of which the melting point is not sufficiently high, such as a glass substrate, is used as the substrate 100, it is very difficult to form the first insulating films 112, 114, 116, and 118 by a thermal oxidation method. Moreover, an insulating film formed by a CVD method or a sputtering method has problems in that: film quality is insufficient because of defects inside the film, and a defect such as a pinhole is produced when the insulating film is formed thinly. In addition, an insulating film formed by a CVD method or a sputtering method does not cover the edge of the semiconductor layer adequately, and a conductive film and the like, which will be formed later over the first insulating film 116, and the semiconductor layer may be in contact with each other to cause leak current. Thus, when the first insulating films 112, 114, 116, and 118 are formed by the high-density plasma treatment as shown in this embodiment mode, the first insulating films 112, 114, 116, and 118 can be denser than an insulating film formed by a CVD method, a sputtering method, or the like. Moreover, the first insulating films 112, 114, 116, and 118 can adequately cover the edges of the semiconductor layers 104, 106, 108, and 110, respectively. As a result, a high-speed operation and a charge-retention property as a memory can be improved. It is to be noted that when the first insulating films 112, 114, 116, and 118 are formed by a CVD method or a sputtering method, preferably, high-density plasma treatment is performed after the insulating film is formed, whereby the surface of the insulating film is subjected to oxidation treatment, nitridation treatment, or oxynitridation treatment.

The charge accumulation layer 120 can be formed of a film containing germanium, such as germanium (Ge) or a silicon germanium alloy. Here, the charge accumulation layer 120 is formed using a film containing germanium as its main component with a thickness of 1 to 20 nm, preferably 5 to 10 nm, by a plasma CVD method in an atmosphere containing a germanium element (for example, $GeH_4$). Thus, when the semiconductor layer is formed using a material containing Si as its main component and the film containing germanium, which has a smaller energy gap than that of Si, is provided as the charge accumulation layer over the semiconductor layer with the first insulating film functioning as a tunnel oxide film interposed therebetween, a second barrier for electric charge in the charge accumulation layer, which is formed by the insulating film, gets higher in terms of energy than a first barrier for electric charge in the semiconductor layer, which is formed by the insulating film. As a result, electric charge can be easily injected from the semiconductor layer to the charge accumulation layer, and the electric charge can be prevented from being going out from the charge accumulation layer. That is, in the case of an operation as a memory, highly-efficient writing is possible at low voltage, and moreover, a charge-retention property can be improved. Further, the charge accumulation layer 120 formed over the semiconductor layer 108 in the memory portion functions as a floating gate in a nonvolatile memory element which will be completed later.

Next, the first insulating films 112, 114, and 118, and the charge accumulation layer 120 formed over the semiconductor layers 104, 106, and 110 are selectively removed, whereas the first insulating film 116 and the charge accumulation layer 120 formed over the semiconductor layer 108 are left. Here, the semiconductor layer 108, the first insulating film 116, and the charge accumulation layer 120 provided in the memory portion are selectively covered with a resist, and the first insulating films 112, 114, and 118, and the charge accumulation layer 120 formed over the semiconductor layers 104, 106, and 110 are selectively removed by etching (refer to FIG. 18B).

Next, the semiconductor layers 104, 106, and 110 and part of the charge accumulation layer 120 formed over the semiconductor layer 108 are selectively covered with a resist 122, the charge accumulation layer 120 not covered with the resist 122 is selectively removed by etching, and part of the charge accumulation layer 120 is left, whereby a charge accumulation layer 121 is formed (refer to FIGS. 18C and 24).

Then, an impurity region is formed in a specific region of the semiconductor layer 110. Here, after the resist 122 is removed, a resist 124 is formed so as to selectively cover the semiconductor layers 104, 106, and 108 and part of the semiconductor layer 110. Then, an impurity element is introduced to the semiconductor layer 110 not covered with the resist 124, whereby an impurity region 126 is formed (refer to FIG. 19A). As the impurity element, an impurity element imparting n-type conductivity or an impurity element imparting p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. Here, as the impurity element, phosphorus (P) is introduced to the semiconductor layer 110.

Next, a second insulating film 128 is formed so as to cover the semiconductor layers 104, 106, and 110, the first insulating film 116 and the charge accumulation layer 121 formed over the semiconductor layer 108 (refer to FIG. 19B).

The second insulating film 128 is formed by a CVD method, a sputtering method, or the like using an insulating material such as silicon oxide, silicon nitride, silicon oxynitride ($SiO_xN_y$) (x>y), or silicon nitride oxide ($SiN_xO_y$) (x>y) with a single layer structure or a stacked structure. For example, in the case of the second insulating film 128 with a single layer structure, a silicon oxynitride film or a silicon nitride oxide film is formed by a CVD method with a thickness of 5 to 50 nm. In addition, in the case of the second insulating film 128 with a three-layer structure, a silicon oxynitride film may be formed as a first insulating layer, a silicon nitride film may be formed as a second insulating layer, and a silicon oxynitride film may be formed as a third insulating layer. Alternatively, an oxide or a nitride of germanium may be used as the second insulating film 128.

It is to be noted that the second insulating film 128 formed over the semiconductor layer 108 functions as a control insulating film in a nonvolatile memory element which will be completed later, and the second insulating film 128 formed over the semiconductor layer 110 functions as a gate insulating film in a transistor which will be completed later.

Next, a resist 130 is selectively formed so as to cover the second insulating film 128 formed over the semiconductor layers 108 and 110, and the second insulating film 128 formed over the semiconductor layers 104 and 106 is selectively removed (refer to FIG. 19C).

Then, third insulating films 132 and 134 are formed so as to cover the semiconductor layers 104 and 106, respectively (refer to FIG. 20A).

The third insulating films 132 and 134 are formed by any of the methods for forming the first insulating films 112, 114, 116, and 118. For example, oxidation treatment, nitridation treatment, or oxynitridation treatment is performed to the semiconductor layers 104, 106, 108, and 110 by high-density plasma treatment, whereby the third insulating films 132 and 134 are formed using an oxide film, a nitride film, or an oxynitride film of silicon over the semiconductor layers 104 and 106, respectively.

Here, the third insulating films 132 and 134 are each formed with a thickness of 1 to 20 nm, preferably 1 to 10 nm. For example, after a silicon oxide film is formed over each surface of the semiconductor layers 104 and 106 by oxidation treatment performed to the semiconductor layers 104 and 106 by high-density plasma treatment, a silicon oxynitride film is formed over the surface of the silicon oxide film by nitridation treatment performed by high-density plasma treatment. Further, in this case, oxidation treatment or nitridation treatment is performed to the surface of the second insulating film 128 formed over the semiconductor layers 108 and 110, whereby an oxide film or an oxynitride film is formed. The third insulating films 132 and 134 formed over the semiconductor layers 104 and 106 each function as a gate insulating film in a transistor which will be completed later.

Next, a conductive film is formed so as to cover the third insulating films 132 and 134 formed over the semiconductor layers 104 and 106, and the second insulating film 128 formed over the semiconductor layers 108 and 110 (refer to FIG. 20B). Here, an example is shown, in which conductive films 136 and 138 are sequentially stacked as the conductive film. Of course, the conductive film may have a single-layer structure or a stacked structure including three or more layers.

The conductive films 136 and 138 can be formed using an element such as tantalum (Ta), tungsten (W), titanium (Ti), molybdenum (Mo), aluminum (Al), copper (Cu), chromium (Cr), or niobium (Nb), or an alloy material or a compound material containing the above element as its main component. In addition, a metal nitride film obtained by nitriding these elements can be used. Besides, a semiconductor material typified by polycrystalline silicon doped with an impurity element such as phosphorus can also be used.

Here, a stacked structure is provided, in which the conductive film 136 is formed using tantalum nitride and the conductive film 138 is formed using tungsten thereover. Besides, a single layer or stacked layer film using tungsten nitride, molybdenum nitride, or titanium nitride can be used as the conductive film 136, and a single layer or stacked layer film using tantalum, molybdenum, or titanium can be used as the conductive film 138.

Next, the stacked conductive films 136 and 138 are selectively removed by etching, and the conductive films 136 and 138 are partially left over the semiconductor layers 104, 106, 108, and 110, whereby conductive films 140, 142, 144, and 146 each functioning as a gate electrode are formed (refer to FIGS. 20C and 23). It is to be noted that the conductive film 144 formed over the semiconductor layer 108 provided in the memory portion functions as a control gate in a nonvolatile memory element which will be completed later. In addition, the conductive films 140, 142, and 146 each function as a gate electrode in a transistor which will be completed later.

Then, a resist 148 is selectively formed so as to cover the semiconductor layer 104. An impurity element is introduced to the semiconductor layers 106, 108, and 110 using the resist 148, and the conductive films 142, 144, and 146 as masks, whereby an impurity region is formed (refer to FIG. 21A). As the impurity element, an impurity element imparting n-type conductivity or an impurity element imparting p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. Here, as the impurity element, phosphorus (P) is used.

Figure 21A:
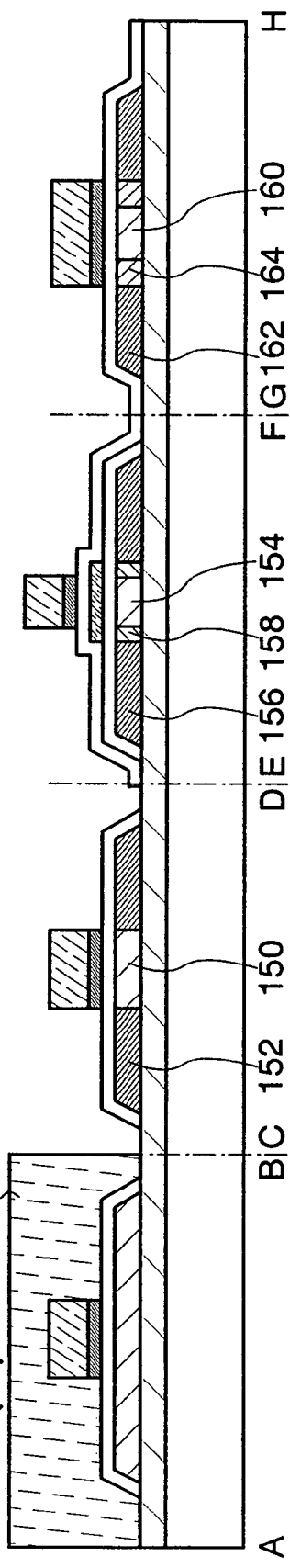
FIGS. 21A to 21C are explanatory views of a memory element in a nonvolatile memory card of the present invention.
Figure 21B:
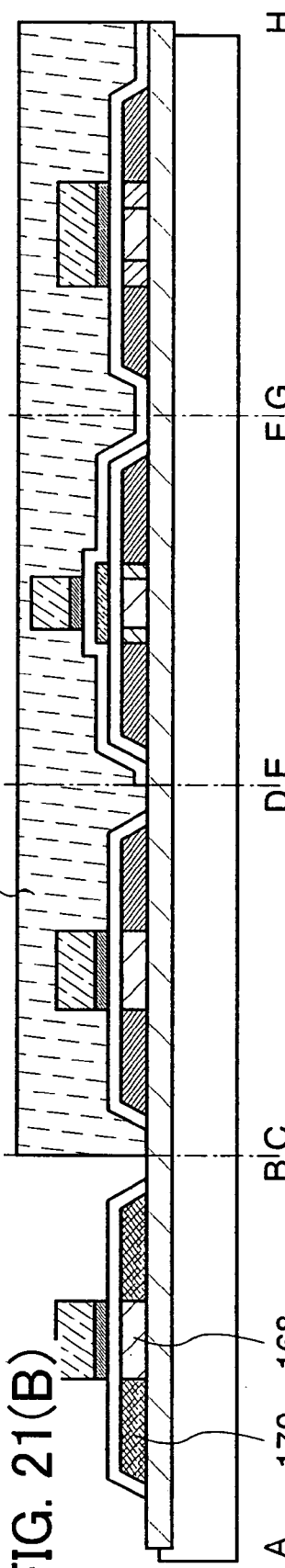
Figure 21C:
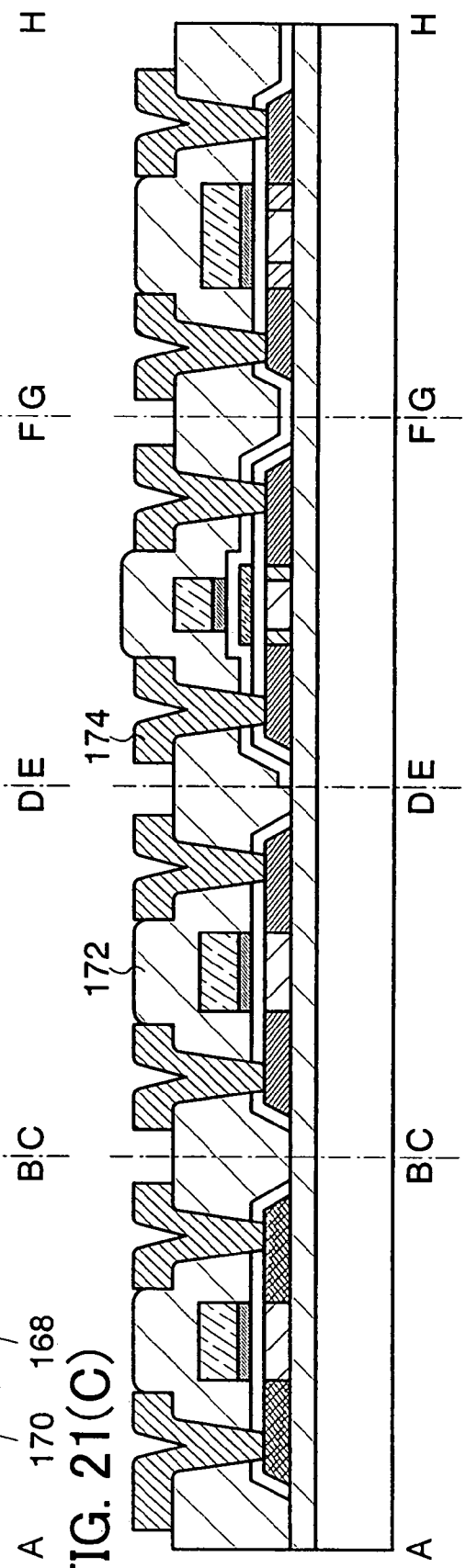

In FIG. 21A, by introducing the impurity element, an impurity region 152 which forms a source or drain region and a channel formation region 150 are formed in the semiconductor layer 106. In addition, in the semiconductor layer 108, an impurity region 156 which forms a source or drain region, a low-concentration impurity region 158 which forms an LDD region, and a channel formation region 154 are formed. Moreover, in the semiconductor layer 110, an impurity region 162 which forms a source or drain region, a low-concentration impurity region 164 which forms an LDD region, and a channel formation region 160 are formed.

In FIG. 21A, the introduced impurity element passes through the charge accumulation layer 121 functioning as a floating gate, whereby the low-concentration impurity region 158 is formed in the semiconductor layer 108. Therefore, in the semiconductor layer 108, the channel formation region 154 is formed in a region which overlaps with both the conductive film 144 and the charge accumulation layer 121, the low-concentration impurity region 158 is formed in a region which overlaps with the charge accumulation layer 121 and which does not overlap with the conductive film 144, and the high-concentration impurity region 156 is formed in a region which overlaps with neither the charge accumulation layer 121 nor the conductive film 144.

Next, a resist 166 is selectively formed so as to cover the semiconductor layers 106, 108, and 110. An impurity element is introduced to the semiconductor layer 104 using the resist 166 and the conductive film 140 as masks, whereby an impurity region is formed (refer to FIG. 21B). As the impurity element, an impurity element imparting n-type conductivity or an impurity element imparting p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. Here, an impurity element having a different conductivity type from that of the impurity element introduced to the semiconductor layers 106, 108, and 110 in FIG. 21A (such as boron (B)) is used. As a result, in the semiconductor layer 104, an impurity region 170 which forms a source or drain region and a channel formation region 168 are formed.

Next, an insulating film 172 is formed so as to cover the second insulating film 128, the third insulating films 132 and 134, and the conductive films 140, 142, 144, and 146. Over the insulating layer 172, a conductive film 174 is formed so as to be electrically connected to the impurity regions 170, 152, 156, and 162 which are formed in the semiconductor layers 104, 106, 108, and 110, respectively (refer to FIGS. 21C and 22).

The insulating film 172 is formed by a CVD method, a sputtering method, or the like using an insulating film containing oxygen or nitrogen such as silicon oxide ($SiO_x$), silicon nitride ($SiN_x$), silicon oxynitride ($SiO_xN_y$) (x>y), or silicon nitride oxide ($SiN_xO_y$) (x>y), a film containing carbon such as DLC (diamond like carbon), an organic material such as epoxy, polyimide, polyamide, polyvinyl phenol, benzocyclobutene, or acrylic, or a siloxane material such as a siloxane resin with a single layer structure or a stacked structure. The siloxane material is a material including a Si—O—Si bond. Siloxane has a skeleton structure formed of a bond of silicon (Si) and oxygen (O). As a substituent, an organic group containing at least hydrogen (for example, an alkyl group or aromatic hydrocarbon) is used. Alternatively, a fluoro group may be used as a substituent. In addition, as a substituent, both a fluoro group and an organic group containing at least hydrogen may also be used.

The conductive film 174 is formed by a CVD method, a sputtering method, or the like using an element such as aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or a compound material containing the above element as its main component with a single layer structure or a stacked structure. An alloy material containing aluminum as its main component corresponds to, for example, an alloy material containing nickel, whose main component is aluminum, or an alloy material containing nickel and one or both of carbon and silicon, whose main component is aluminum. The conductive film 174 preferably employs, for example, a stacked structure of a barrier film, an aluminum-silicon (Al—Si) film, and a barrier film, or a stacked structure of a barrier film, an aluminum-silicon (Al—Si) film, a titanium nitride (TiN) film, and a barrier film. It is to be noted that the barrier film corresponds to a thin film formed using titanium, a nitride of titanium, molybdenum, or a nitride of molybdenum. Aluminum and aluminum silicon which have the low resistance and are inexpensive are optimal materials for forming the conductive film 174. In addition, by provision of barrier layers as an upper layer and a lower layer, generation of a hillock of aluminum or aluminum silicon can be prevented. Further, when the barrier film is formed using titanium that is a highly-reducible element, even if a thin natural oxide film is formed on the crystalline semiconductor layer, the natural oxide film is reduced, so that preferable contact with the crystalline semiconductor layer can be obtained.

Figure 36:
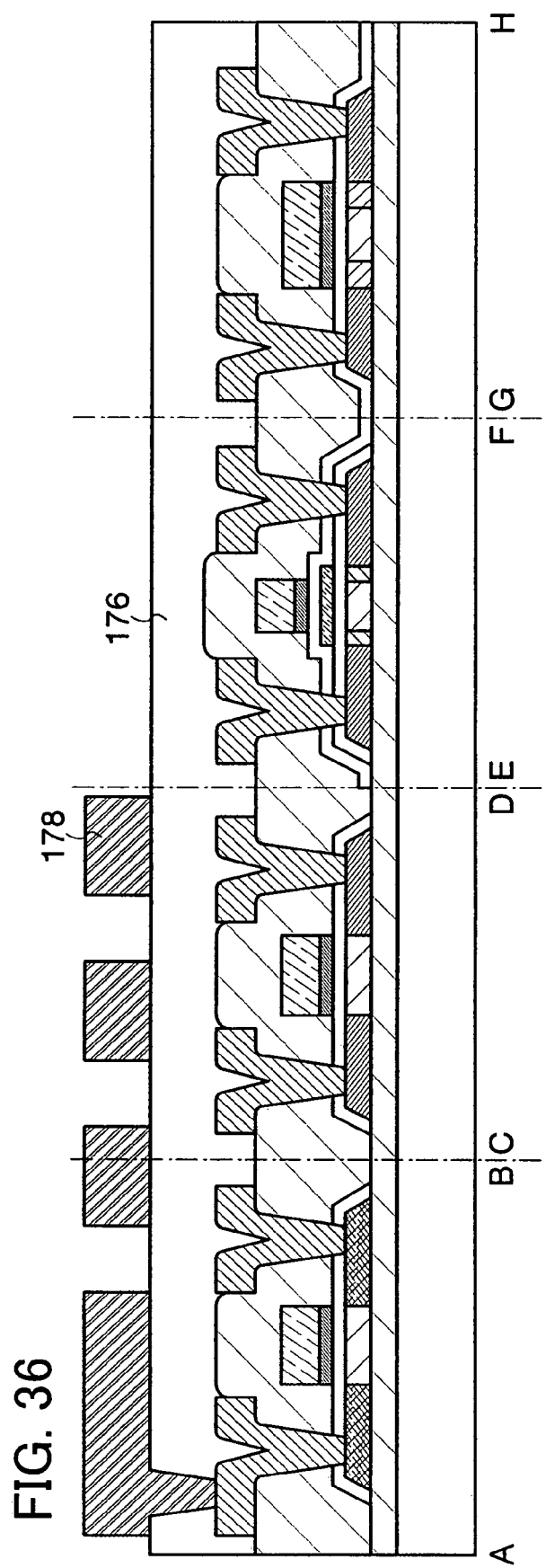
FIG. 36 is an explanatory view of a memory element in a nonvolatile memory card of the present invention.

Then, an insulating film 176 is formed to cover the conductive film 174, and a conductive film 178 functioning as an antenna is formed over the insulating film 176 (refer to FIG. 36).

The conductive film 178 functioning as an antenna is formed using a conductive material by a CVD method, a sputtering method, a printing method such as screen printing or gravure printing, a droplet-discharging method, a dispenser method, a plating method, or the like. The conductive material may be formed using an element such as aluminum (Al), titanium (Ti), silver (Ag), copper (Cu), gold (Au), platinum (Pt), nickel (Ni), palladium (Pd), tantalum (Ta), or molybdenum (Mo), or an alloy material or a compound material containing the above element as its main component with a single layer structure or a stacked structure.

The insulating film 176 can be formed using any of the above materials shown in the explanation of the insulating film 172.

A signal transmission method of the nonvolatile memory card of the present invention can be any of an electromagnetic coupling method, an electromagnetic induction method, and a microwave method. The transmission method may be selected appropriately in consideration of usage by a practitioner, and an optimum antenna may be provided in accordance With the transmission method.

In the above structure, a plurality of nonvolatile memory elements may be provided using one island-like semiconductor layer. This case will be described with reference to FIGS. 17 and 25A and 25B. FIG. 17 shows a top view, and FIGS. 25A and 25B show cross-sectional views taken along lines E-F and G-H of FIG. 17, respectively.

Figure 25A:
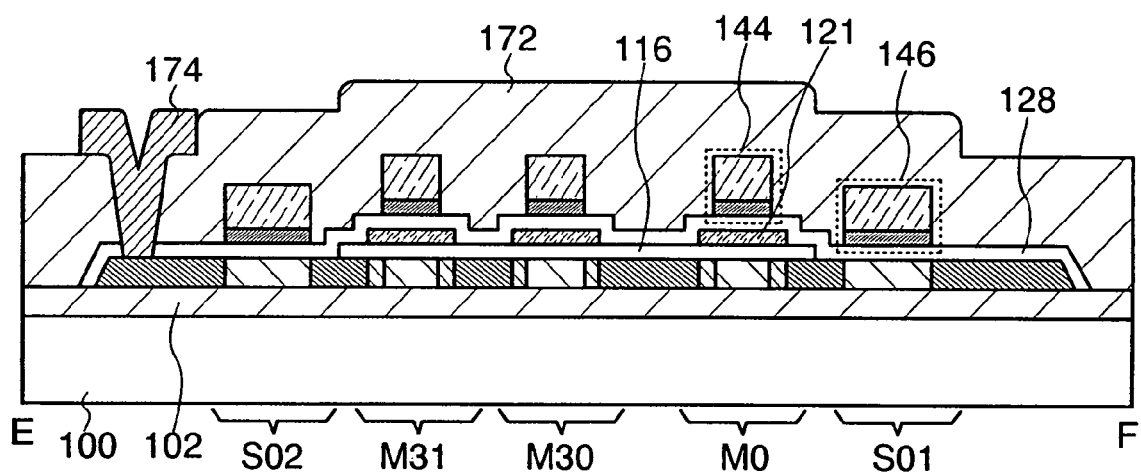
FIGS. 25A and 25B are explanatory views of a memory element in a nonvolatile memory card of the present invention.
Figure 25B:
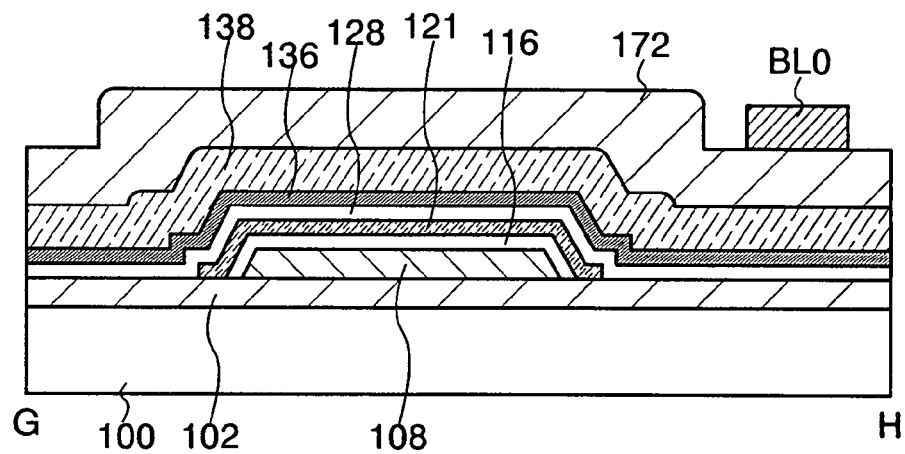
Figure 26A:
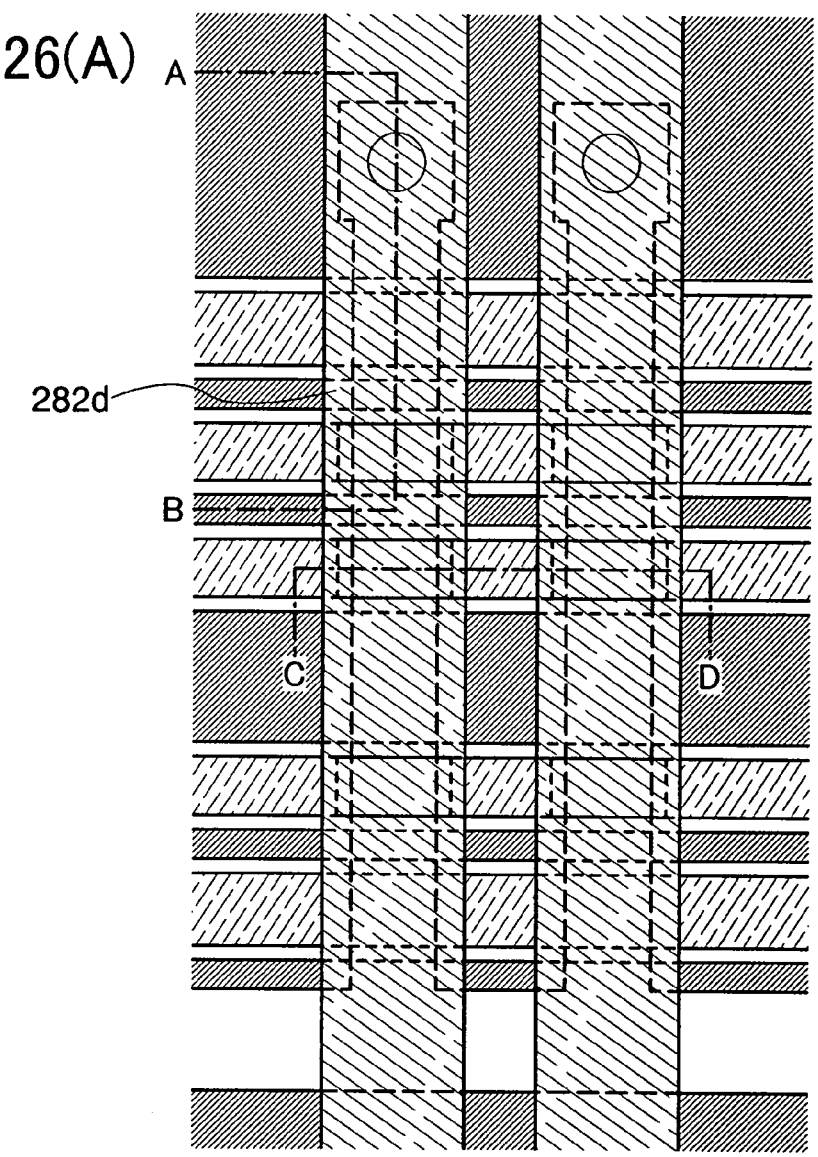
FIGS. 26A and 26B are explanatory views of a memory element in a nonvolatile memory card of the present invention.
Figure 26B:
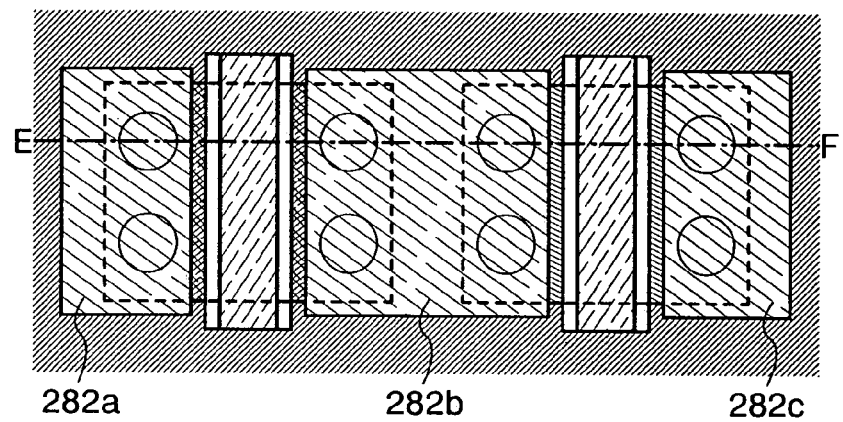

A memory circuit of the nonvolatile memory card shown in FIGS. 17 and 25A and 25B includes island-like semiconductor layers 200a and 200b electrically connected to bit lines BL0 and BL1, respectively. A plurality of nonvolatile memory elements are provided using the island-like semiconductor layers 200a and 200b (refer to FIGS. 17 and 25A and 25B). Specifically, in the semiconductor layer 200a, a NAND cell 202a including a plurality of nonvolatile memory elements M0 to M31 is provided between selection transistors S01 and S02. Further, in the semiconductor layer 200b, a NAND cell 202b including a plurality of nonvolatile memory elements is provided between selection transistors. In addition, by the semiconductor layers 200a and 200b which are separately provided, the adjacent NAND cells 202a and 202b can be insulated and isolated.

When a plurality of nonvolatile memory elements are provided using one island-like semiconductor layer, further integration of the nonvolatile memory elements becomes possible, whereby a large-capacity nonvolatile memory card can be formed.

This embodiment mode can be freely combined with other embodiment modes in this specification.

Embodiment Mode 6

This embodiment will describe a method for manufacturing a nonvolatile memory card, which is different from that of the above embodiment mode, with reference to the drawings. It is to be noted that FIGS. 26A and 26B, 27A and 27B, and 28A and 28B are top views, FIGS. 30A to 30C, 31A to 31C, 32A to 32C, 33A to 33C, 34A and 34B, and 35 are cross-sectional views taken along lines A-B and E-F in FIGS. 26A and 26B, 27A and 27B, and 28A and 28B, and FIGS. 29A to 29C are cross-sectional views taken along a line C-D in FIGS. 26A and 26B, 27A and 27B, and 28A and 28B. The portion between A and B shows a transistor and a nonvolatile memory element provided in a memory portion, the portion between C and D shows a nonvolatile memory element provided in the memory portion, and the portion between E and F shows a transistor provided in a logic portion. In addition, this embodiment mode will describe a case where the transistor provided in a region 212 of a substrate 200 in the portion between E and F is a p-channel type and the transistor provided in a region 213 is an n-channel type, the transistor provided in a region 214 of the substrate 200 in the portion between A and B is an n-channel type, and electrons are used for carrier movement in the nonvolatile memory element. However, the nonvolatile memory card of the present invention is not limited thereto.

First, an insulating film is formed over a substrate 200. Here, single crystal Si having n-type conductivity is used as the substrate 200, and an insulating film 202 and an insulating film 204 are formed over the substrate 200 (refer to FIG. 30A). For example, silicon oxide ($SiO_x$) is formed as the insulating film 202 by heat treatment performed to the substrate 200, and a film of silicon nitride ($SiN_x$) is formed over the insulating film 202 by a CVD method.

Any semiconductor substrate can be used as the substrate 200 without particular limitations. For example, a single crystal Si substrate having n-type or p-type conductivity, a compound semiconductor substrate (such as a GaAs substrate, an InP substrate, a GaN substrate, a SiC substrate, a sapphire substrate, or a ZnSe substrate), an SOI (Silicon On Insulator) substrate manufactured by a bonding method or a SIMOX (Separation by IMplanted OXygen) method, or the like can be used.

Further, the insulating film 204 may also be provided by nitriding the insulating film 202 by high-density plasma treatment after the insulating film 202 is formed. It is to be noted that such an insulating film over the substrate 200 may also be formed with a single layer structure or a staked structure including three or more layers.

Next, a pattern of a resist mask 206 is selectively formed over the insulating film 204, and etching is selectively performed using the resist mask 206 as a mask, whereby concave portions 208 are selectively formed in the substrate 200 (refer to FIG. 30B). The etching of the substrate 200 and the insulating films 202 and 204 can be performed by dry etching utilizing plasma.

Next, after the pattern of the resist mask 206 is removed, an insulating film 210 is formed so as to fill the concave portions 208 formed in the substrate 200 (refer to FIG. 30C).

The insulating film 210 is formed by a CVD method, a sputtering method, or the like using an insulating material such as silicon oxide, silicon nitride, silicon oxynitride ($SiO_xN_y$) (x>y), or silicon nitride oxide ($SiN_xO_y$) (x>y). Here, a silicon oxide film is formed as the insulating film 210 with the use of a TEOS (Tetra-Ethyl-Ortho Silicate) gas by a normal pressure CVD method or a low pressure CVD method.

Next, the surface of the substrate 200 is exposed by performing grinding treatment, polishing treatment, or CMP (Chemical Mechanical Polishing) treatment. Here, by exposing the surface of the substrate 200, regions 212, 213 and 214 are each provided between insulating films 211 formed in the concave portions 208 in the substrate 200. It is to be noted that the insulating films 211 are formed by removing the insulating film 210 formed on the surface of the substrate 200, by grinding treatment, polishing treatment, or CMP treatment. Then, an impurity element having p-type conductivity is selectively introduced, whereby p-wells 215 are formed in the regions 213 and 214 in the substrate 200 (refer to FIGS. 31A, 28A and 28B, and 29A).

As the impurity element having p-type conductivity, boron (B), aluminum (Al), gallium (Ga), or the like can be used. Here, as the impurity element, boron (B) is introduced to the regions 213 and 214.

Although the impurity element is not introduced to the region 212 since the semiconductor substrate having n-type conductivity is used as the semiconductor substrate 200 in this embodiment mode, an n-well may also be formed in the region 212 by introducing an impurity element having n-type conductivity. As the impurity element having n-type conductivity, phosphorus (P), arsenic (As), or the like can be used.

In the case where a semiconductor substrate having p-type conductivity is used, a structure may be employed, in which an n-well is formed in the region 212 by introducing an impurity element having n-type conductivity, and an impurity element is not introduced to the regions 213 and 214.

Next, first insulating films 216, 218, and 220 are formed over the regions 212, 213, and 214 respectively formed in the substrate 200. Then, a floating gate electrode 222 (a film containing germanium (Ge) as its main component) is formed so as to cover the first insulating films 216, 218, and 220 (refer to FIG. 31B).

Each of the first insulating films 216, 218, and 220 can be formed of a silicon oxide film by oxidizing each surface of the regions 212, 213, and 214 in the substrate 200 by heat treatment. Alternatively, each of the first insulating films 216, 218, and 220 can be formed with a stacked structure of a silicon oxide film and a film containing oxygen and nitrogen (silicon oxynitride film) by forming the silicon oxide film using a thermal oxidation method and then nitriding the surface of the silicon oxide film using nitridation treatment.

In addition, as described above, the first insulating films 216, 218, and 220 may be formed by plasma treatment. For example, by performing oxidation treatment or nitridation treatment using high-density plasma treatment to the surfaces of the regions 212, 213, and 214 in the substrate 200, silicon oxide ($SiO_x$) films or silicon nitride ($SiN_x$) films are formed as the first insulating films 216, 218, and 220. Further, after oxidation treatment is performed to the surfaces of the regions 212, 213, and 214 by high-density plasma treatment, nitridation treatment may be performed by performing high-density plasma treatment again. In this case, silicon oxide films are formed on the surfaces of the regions 212, 213, and 214, and silicon oxynitride films are formed on the silicon oxide films, so that each of the first insulating films 216, 218, and 220 is formed with a stacked structure of the silicon oxide film and the silicon oxynitride film. Further, after silicon oxide films are formed on the surfaces of the regions 212, 213, and 214 by a thermal oxidation method, oxidation treatment or nitridation treatment may be performed by high-density plasma treatment.

In this embodiment mode, the first insulating film 220 which is formed over the region 214 provided in the memory portion in the substrate 200 functions as a tunnel oxide film in a nonvolatile memory element which will be completed later. Therefore, the thinner the first insulating film 220 is, the more easily the tunnel current flows, which allows a higher-speed operation as a memory. In addition, as the first insulating film 220 is thinner, electric charge can be accumulated in the floating gate electrode 222 at lower voltage; therefore, power consumption of a nonvolatile memory card can be reduced. Therefore, the first insulating film 220 is preferably formed thinly.

The floating gate electrode 222 can be formed of a film containing germanium (Ge) such as germanium or a silicon-germanium alloy. Here, as the floating gate electrode 222, a film containing germanium as its main component is formed by a plasma CVD method in an atmosphere containing a germanium element (for example, $GeH_4$). In the case where a single crystal Si substrate is used as the substrate 200 and the film containing germanium which has a smaller energy gap than that of Si is provided as the floating gate electrode over a certain region of the Si substrate with the first insulating film functioning as the tunnel oxide film interposed therebetween, a second barrier for electric charge in the floating gate electrode, which is formed by the insulating film, becomes higher in terms of energy than a first barrier for electric charge in the certain region of the Si substrate, which is formed by the insulating film. Consequently, electric charge can be easily injected from the certain region of the Si substrate into the floating gate electrode and the electric charge can be prevented from going out from the floating gate electrode. That is, in the case of an operation as a memory, highly efficient writing at low voltage can be performed and a charge-retention property can be improved. Further, the floating gate electrode 222 formed over the region 214 provided in the memory portion in the substrate 200 functions as a floating gate in a nonvolatile memory element which will be completed later.

Next, a resist mask 223 is formed over the floating gate electrode 222, and the floating gate electrode 222 and the first insulating films 216, 218, and 220 are selectively removed by using the resist mask 223 as a mask. Here, the resist mask 223 is formed so as to cover part of the region 214 in the substrate 200, and the other parts of the floating gate electrode 222 and the first insulating films 216, 218, and 220 which are not covered with the resist mask 223 are removed, so that the first insulating film 220 and the floating gate electrode 222 provided over the region 214 are partially left to form a first insulating film 224 and a floating gate electrode 226 (refer to FIG. 31C). Specifically, the first insulating film 220 and the floating gate electrode 222 provided in a region where a nonvolatile memory element will be formed later in the region 214 are left. In addition, surfaces of the regions 212 and 213 and part of the region 214 in the substrate 200 are exposed.

Figure 32A:
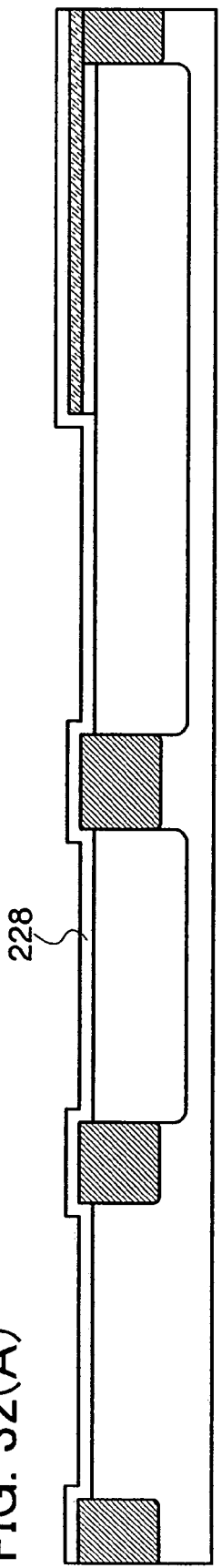
FIGS. 32A to 32C are explanatory views of a memory element in a nonvolatile memory card of the present invention.

Next, a second insulating film 228 is formed so as to cover the regions 212, 213, and 214 in the substrate 200 and the floating gate electrode 222 (refer to FIG. 32A).

The second insulating film 228 is formed by a CVD method, a sputtering method, or the like using an insulating material such as silicon oxide, silicon nitride, silicon oxynitride ($SiO_xN_y$) (x>y), or silicon nitride oxide ($SiN_xO_y$) (x>y) with a single layer structure or a stacked structure. For example, when the second insulating film 228 is formed with a single layer structure, a silicon oxynitride film or a silicon nitride oxide film is formed with a thickness of 5 to 50 nm by a CVD method. Further, when the second insulating film 228 is formed with a three-layer structure, a silicon oxynitride film is formed as a first insulating layer, a silicon nitride film is formed as a second insulating layer, and a silicon oxynitride film is formed as a third insulating layer.

It is to be noted that the second insulating film 228 formed over the floating gate electrode 222 over the region 214 in the substrate 200 functions as a control insulating film in a nonvolatile memory element which will be completed later, and the second insulating film 228 formed over the exposed region 214 functions as a gate insulating film in a transistor which will be completed later.

Figure 32B:
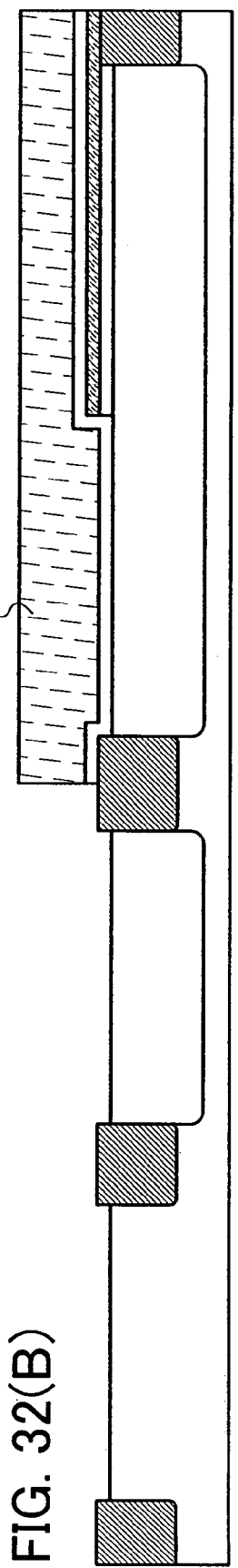

Next, a resist mask 230 is selectively formed so as to cover the second insulating film 228 formed over the region 214 in the substrate 200, and the second insulating film 228 formed over the regions 212 and 213 in the substrate 200 is selectively removed (refer to FIG. 32B).

Figure 32C:
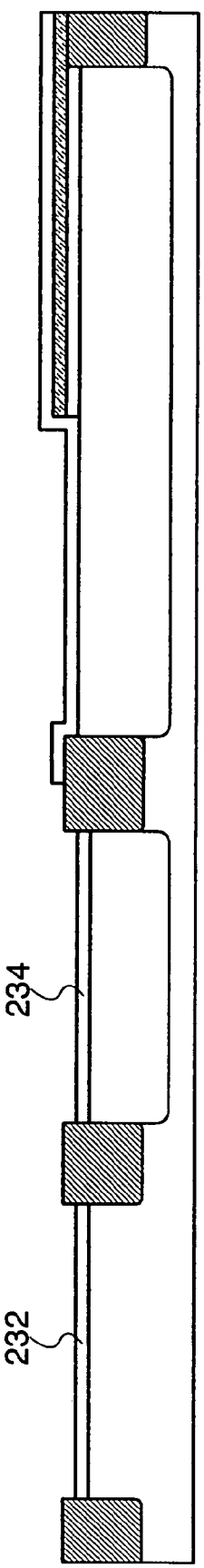

Next, third insulating films 232 and 234 are formed on the surfaces of the regions 212 and 213 in the substrate 200, respectively (refer to FIG. 32C).

The third insulating films 232 and 234 are formed by any of the methods described above for forming the first insulating films 216, 218, and 220. For example, each of the third insulating films 232 and 234 can be formed of a silicon oxide film by oxidizing each surface of the regions 212 and 213 in the substrate 200 by heat treatment. Alternatively, each of the third insulating films 232 and 234 can be formed with a stacked structure of a silicon oxide film and a film containing oxygen and nitrogen (silicon oxynitride film) by forming the silicon oxide film using a thermal oxidation method and then nitriding the surface of the silicon oxide film using nitridation treatment.

Further, as described above, the third insulating films 232 and 234 may be formed using plasma treatment. For example, by performing oxidation treatment or nitridation treatment using high-density plasma treatment to the surfaces of the regions 212 and 213 in the substrate 200, silicon oxide ($SiO_x$) films or silicon nitride ($SiN_x$) films can be formed as the third insulating films 232 and 234. Further, after oxidation treatment is performed to the surfaces of the regions 212 and 213 by high-density plasma treatment, nitridation treatment may be performed by performing high-density plasma treatment again. In this case, silicon oxide films are formed on the surfaces of the regions 212 and 213, and silicon oxynitride films are formed on the silicon oxide films, so that each of the third insulating films 232 and 234 is formed with a stacked structure of the silicon oxide film and the silicon oxynitride film. In addition, after silicon oxide films are formed on the surfaces of the regions 212 and 213 by a thermal oxidation method, oxidation treatment or nitridation treatment may be performed by high-density plasma treatment.

It is to be noted that in formation of the third insulating films 232 and 234 by a thermal oxidation method or high-density plasma treatment, the oxide film or the oxynitride film may also be formed on the surface of the second insulating film 228 formed over the region 214 in the substrate 200. The third insulating films 232 and 234 formed over the regions 212 and 213 in the substrate 200 function as gate insulating films in transistors which will completed later.

Figure 33A:
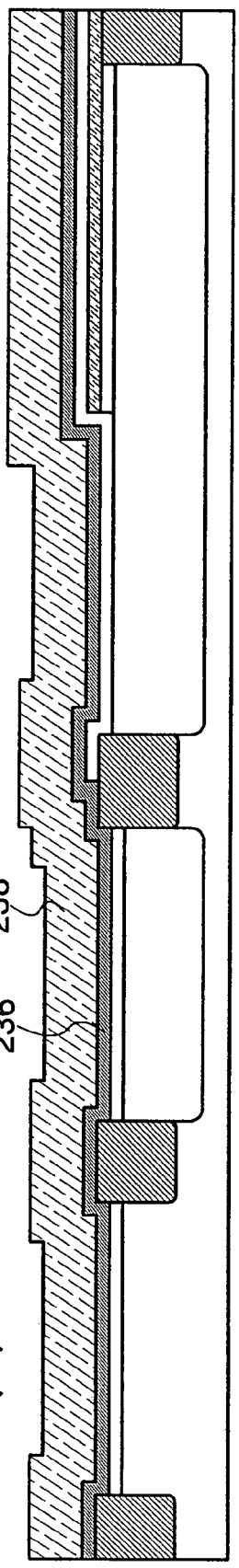
FIGS. 33A to 33C are explanatory views of a memory element in a nonvolatile memory card of the present invention.

Next, a conductive film is formed so as to cover the third insulating films 232 and 234 formed over the regions 212 and 213 in the substrate 200 and the second insulating film 228 formed over the region 214 (refer to FIG. 33A). Here, an example is shown, in which a conductive film 236 and a conductive film 238 are stacked sequentially as the conductive film. Of course, the conductive film may also be formed with a single layer structure or a staked structure including three or more layers.

The conductive films 236 and 238 can be formed of an element such as tantalum (Ta), tungsten (W), titanium (Ti), molybdenum (Mo), aluminum (Al), copper (Cu), chromium (Cr), or niobium (Nb), or an alloy material or a compound material containing the element as its main component. Further, a metal nitride film obtained by nitriding the element can also be used. Further alternatively, a semiconductor material typified by polycrystalline silicon doped with an impurity element such as phosphorus can be used.

Here, a stacked structure is formed by formation of the conductive film 236 using tantalum nitride and the conductive film 238 using tungsten. Alternatively, a single layer or stacked layer film of tantalum nitride, tungsten nitride, molybdenum nitride, or titanium nitride can be used as the conductive film 236, and a single layer or stacked layer film of tungsten, tantalum, molybdenum, or titanium can be used as the conductive film 238.

Figure 29A:
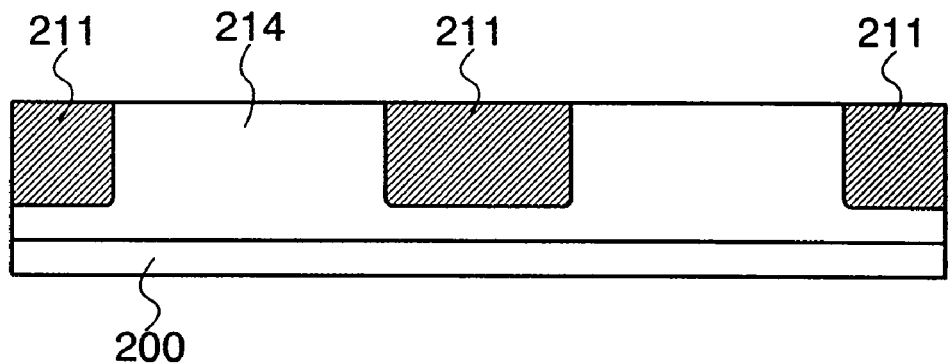
FIGS. 29A to 29C are explanatory views of a memory element in a nonvolatile memory card of the present invention.
Figure 29B:
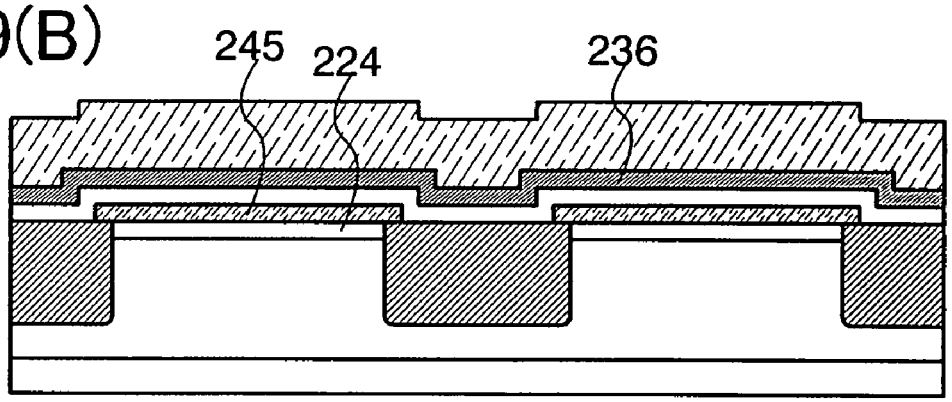
Figure 29C:
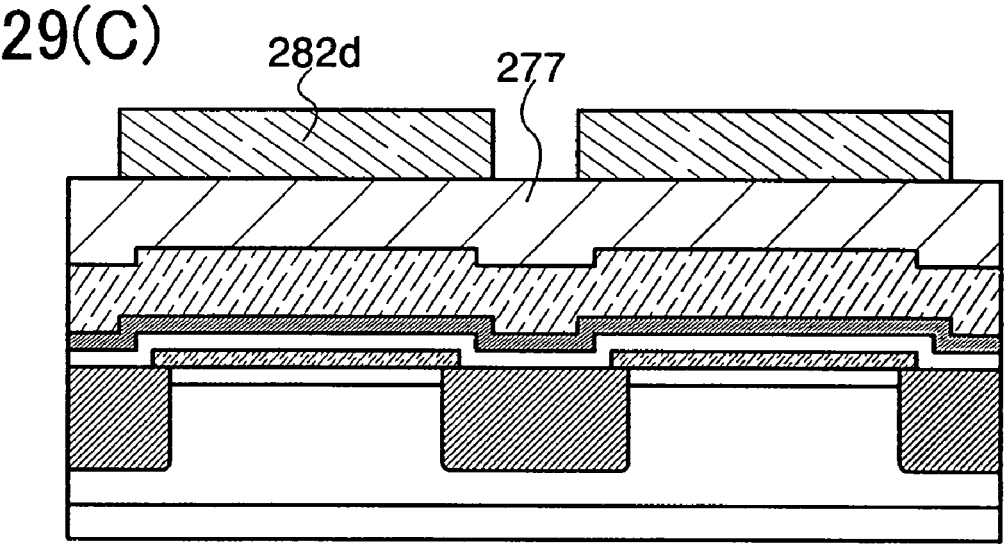
Figure 33B:
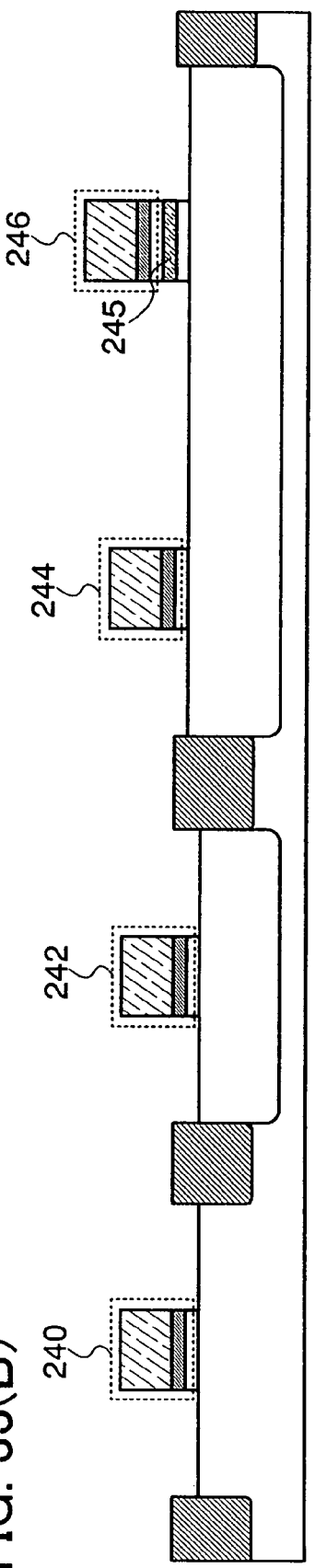

Next, by selectively removing the stacked conductive films 236 and 238 by etching, the conductive films 236 and 238 are left over parts of the regions 212, 213, and 214 in the substrate 200 to form conductive films 240, 242, 244, and 246 each functioning as a gate electrode (refer to FIGS. 33B and 29B). In addition, here, the surfaces of parts of the regions 212, 213, and 214 which do not overlap with the conductive films 240, 242, 244, and 246 are exposed in the substrate 200. It is to be noted that the conductive film 244 functioning as a gate electrode functions as a control gate in a nonvolatile memory element which will be completed later.

Specifically, in the region 212 in the substrate 200, part of the third insulating film 232 formed below the conductive film 240, which does not overlap with the conductive film 240 is selectively removed so that edges of the conductive film 240 and the third insulating film 232 substantially align with each other. In the region 214 in the substrate 200, part of the third insulating film 234 formed below the conductive film 242, which does not overlap with the conductive film 242 is selectively removed so that edges of the conductive film 242 and the third insulating film 234 substantially align with each other. In the region 214 in the substrate 200, part of the second insulating film 228 formed below the conductive film 244, which does not overlap with the conductive film 244 is selectively removed so that edges of the conductive film 244 and the second insulating film 228 substantially align with each other. Further, in the region 214 in the substrate 200, parts of the second insulating film 228, the floating gate electrode 226, and the first insulating film 224 formed below the conductive film 246, which do not overlap with the conductive film 246 are selectively removed so that edges of the conductive film 246, the second insulating film 228, the floating gate electrode 226, and the first insulating film 224 substantially align with one another.

In this case, the insulating films and the like at the non-overlapped portions may be removed at the same time as the formation of the conductive films 240, 242, 244, and 246, or may be removed after formation of the conductive films 240, 242, 244, and 246 by using the left resist mask or the conductive films 240, 242, 244, and 246 as masks.

Figure 33C:
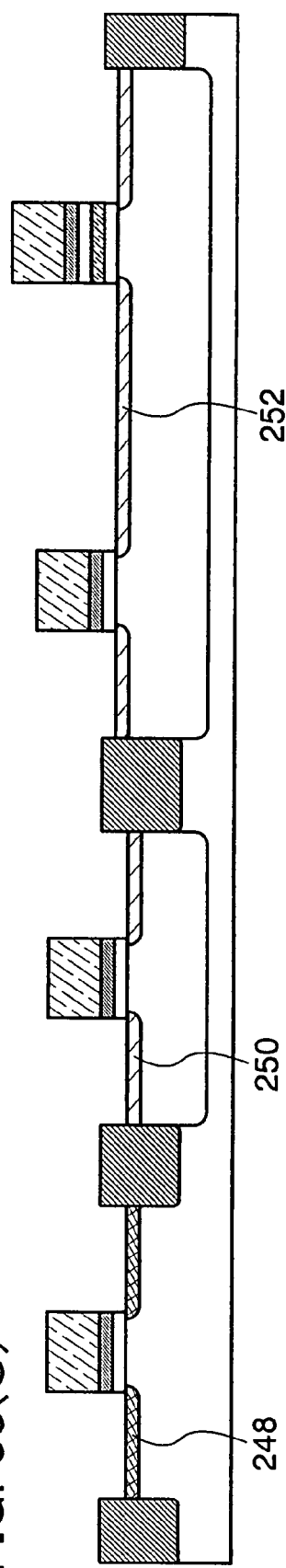

Next, an impurity element is selectively introduced to the regions 212, 213, and 214 in the substrate 200 (refer to FIG. 33C). Here, an impurity element having n-type conductivity is selectively introduced to the regions 213 and 214 at a low concentration by using the conductive films 242, 244, and 246 as masks, while an impurity element having p-type conductivity is selectively introduced to the region 212 at a low concentration by using the conductive film 240 as a mask. As the impurity element having n-type conductivity, phosphorus (P), arsenic (As), or the like can be used. As the impurity element imparting p-type conductivity, boron (B), aluminum (Al), gallium (Ga), or the like can be used.

Next, insulating films (also called sidewalls) 254 are formed in contact with side surfaces of the conductive films 240, 242, 244, and 246. Specifically, a film containing an inorganic material such as silicon, an oxide of silicon, or a nitride of silicon, or a film containing an organic material such as an organic resin is formed by a plasma CVD method, a sputtering method, or the like with a single layer structure or a stacked structure. Then, the insulating film is selectively etched by anisotropic etching mainly in the perpendicular direction, so as to be formed in contact with the side surfaces of the conductive films 240, 242, 244, and 246. It is to be noted that the insulating films 254 are used as masks for doping when an LDD (Lightly Doped Drain) region is formed. Further, here, the insulating films 254 are also formed to be in contact with side surfaces of the insulating films or the floating gate electrode formed below the conductive films 240, 242, 244, and 246.

Figure 27A:
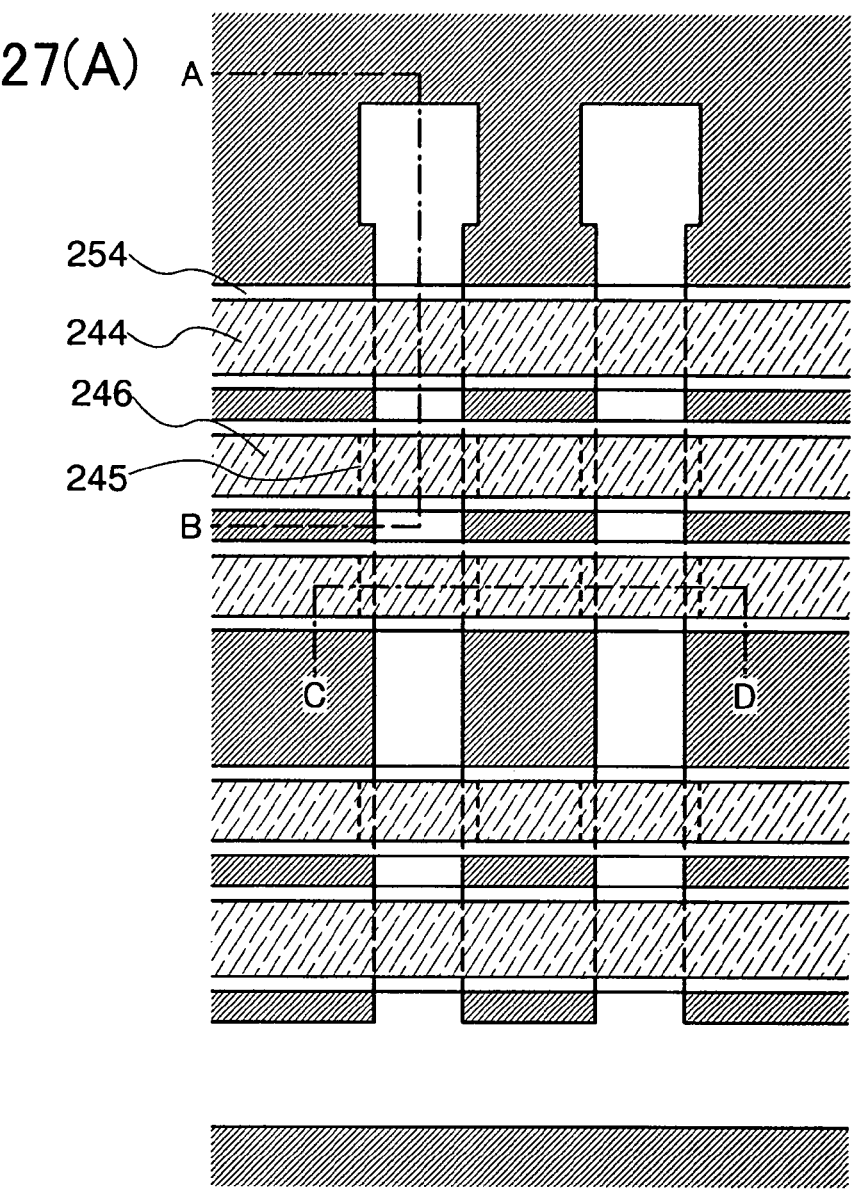
FIGS. 27A and 27B are explanatory views of a memory element in a nonvolatile memory card of the present invention.
Figure 27B:
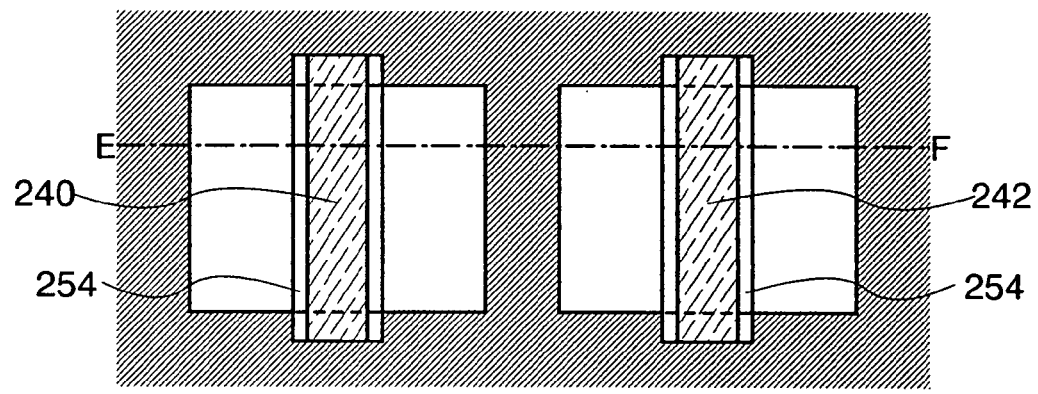
Figure 28A:
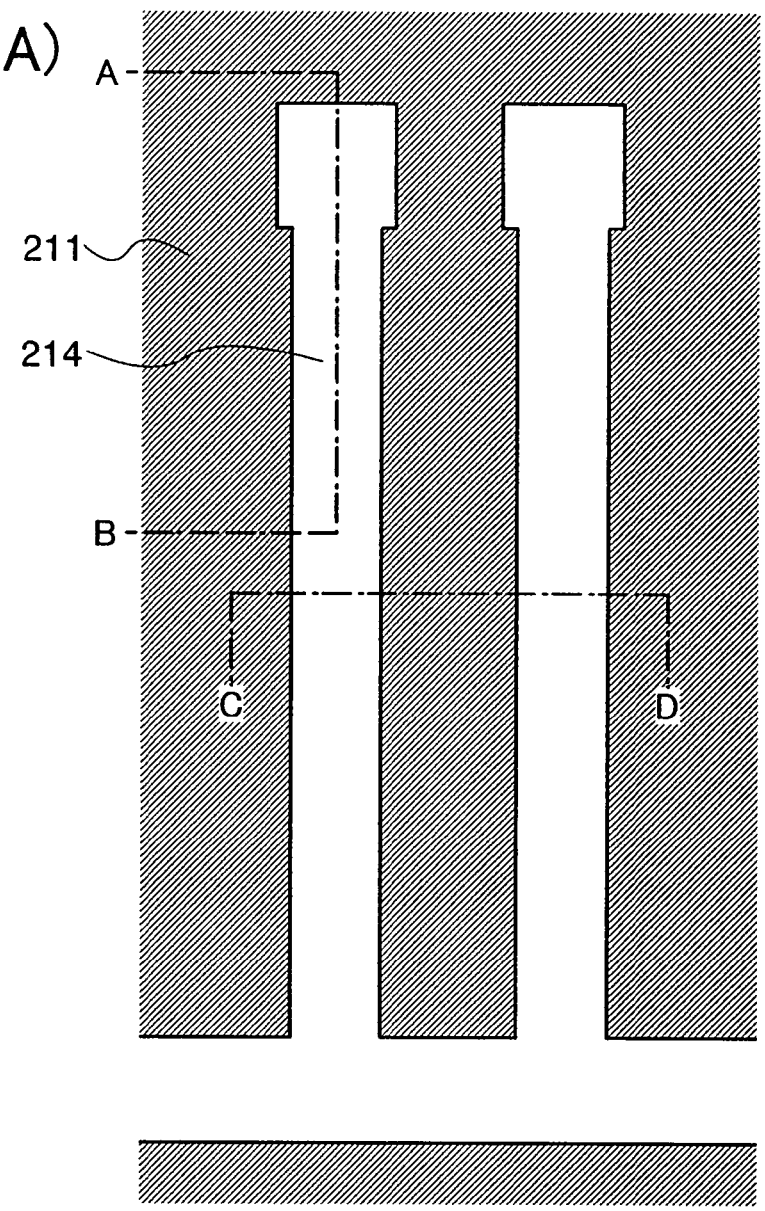
FIGS. 28A and 28B are explanatory views of a memory element in a nonvolatile memory card of the present invention.
Figure 28B:
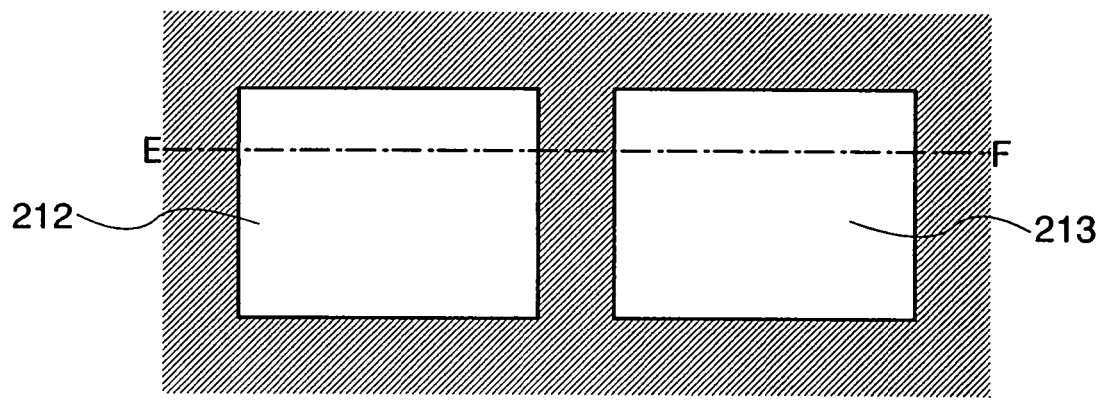
Figure 34A:
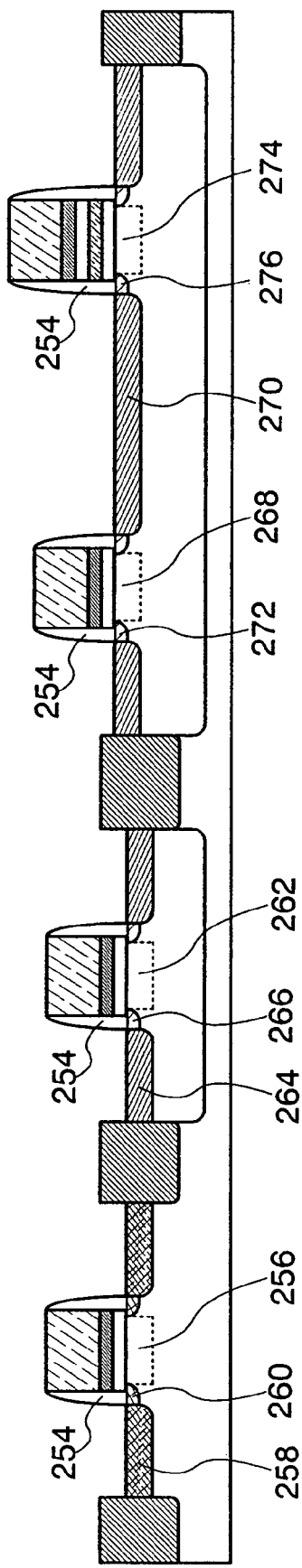
FIGS. 34A and 34B are explanatory views of a memory element in a nonvolatile memory card of the present invention.

Next, an impurity element is introduced to the regions 212, 213, and 214 in the substrate 200 by using the insulating films 254 and the conductive films 240, 242, 244, and 246 as masks, whereby impurity regions functioning as source regions and drain regions are formed (refer to FIGS. 34A, 27A and 27B). Here, an impurity element having n-type conductivity is introduced at a high concentration to the regions 213 and 214 in the substrate 200 by using the insulating films 254 and the conductive films 242, 244, and 246 as masks, while an impurity element having p-type conductivity is introduced at a high concentration to the region 212 by using the insulating films 254 and the conductive film 240 as masks.

As a result, in the region 212 in the substrate 200, impurity regions 258 forming source and drain regions, low-concentration impurity regions 260 forming LDD regions, and a channel formation region 256 are formed. In the region 213 in the substrate 200, impurity regions 264 forming source and drain regions, low-concentration impurity regions 266 forming LDD regions, and a channel formation region 262 are formed. In the region 214 in the substrate 200, impurity regions 270 forming source and drain regions, low-concentration impurity regions 272 and 276 forming LDD regions, and channel formation regions 268 and 274 are formed.

It is to be noted that in this embodiment mode, the introduction of the impurity element is performed while exposing parts of the regions 212, 213, and 214 which do not overlap with the conductive films 240, 242, 244, and 246. Therefore, the channel formation regions 256, 262, 268, and 274 formed in the regions 212, 213, and 214 in the substrate 200 can be formed in a self-aligned manner using the conductive films 240, 242, 244, and 246.

Figure 34B:
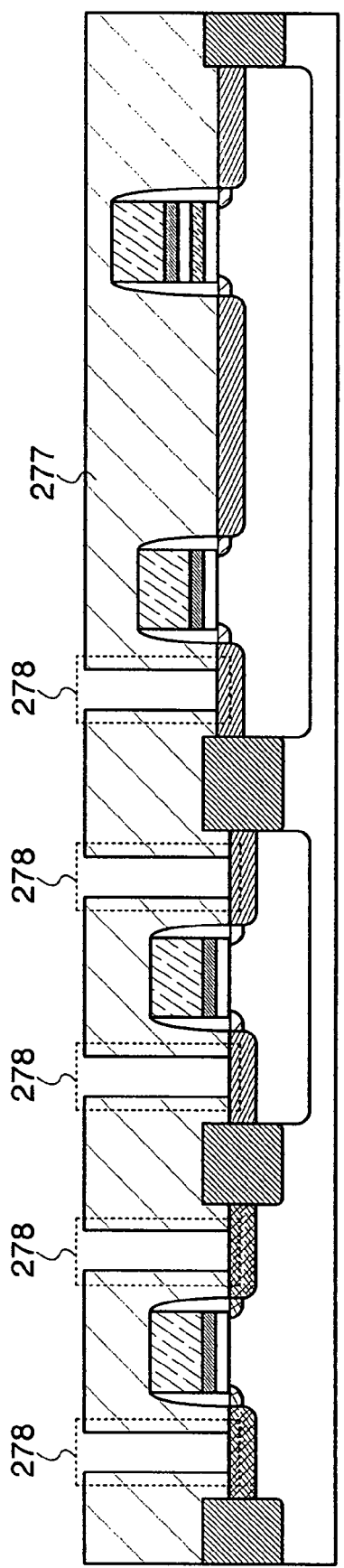
Figure 35:
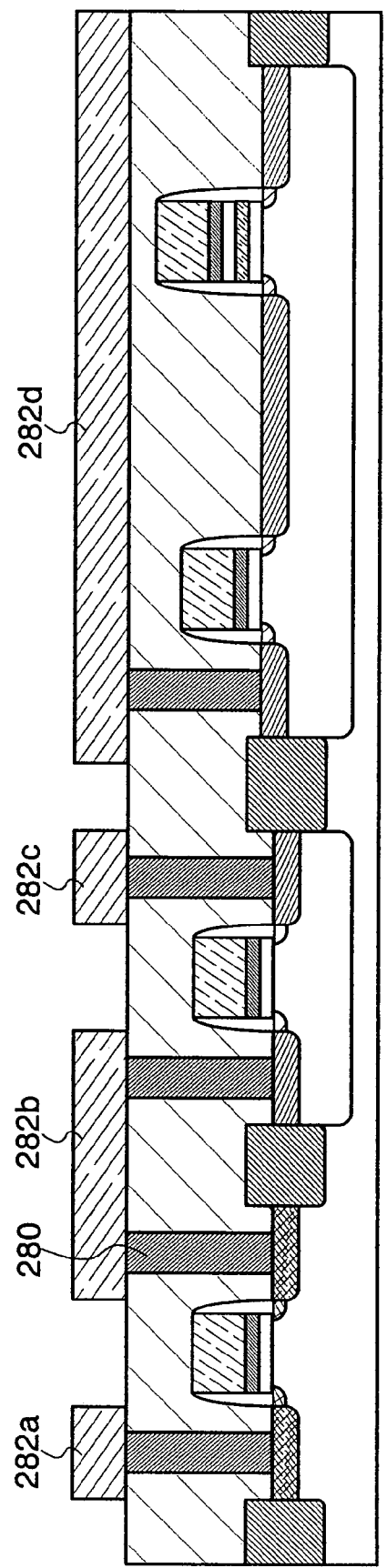
FIG. 35 is an explanatory view of a memory element in a nonvolatile memory card of the present invention.

Next, an insulating film 277 is formed so as to cover the insulating films, the conductive films, and the like provided over the regions 212, 213, and 214 in the substrate 200, and openings 278 are formed in the insulating film 277 (refer to FIG. 34B).

The insulating film 277 can be formed by a CVD method, a sputtering method, or the like using an insulating film containing oxygen or nitrogen such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin with a single layer structure or a stacked structure. It is to be noted that a siloxane material is a material including a Si—O—Si bond. Siloxane has a skeleton structure containing a bond of silicon (Si) and oxygen (O). As a substituent, an organic group containing at least hydrogen (e.g., an alkyl group or aromatic hydrocarbon) can be used. As a substituent, a fluoro group may also be used. Alternatively, as a substituent, an organic group containing at least hydrogen, and a fluoro group may be used.

Next, conductive films 280 are formed in the openings 278 by a CVD method, and conductive films 282a to 282d are selectively formed over the insulating film 277 so as to be electrically connected to the conductive films 280 (refer to FIGS. 35, 26A and 26B, and 29C).

Each of the conductive films 280, and 282a to 282d is formed by a CVD method, a sputtering method, or the like using an element such as aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or a compound material containing the element as its main component with a single layer structure or a stacked structure. The alloy material containing aluminum as its main component corresponds to, for example, an alloy material containing nickel, whose main component is aluminum, or an alloy material containing nickel and one or both of carbon and silicon, whose main component is aluminum. Each of the conductive films 280, and 282a to 282d preferably employs, for example, a stacked structure of a barrier film, an aluminum-silicon (Al—Si) film, and a barrier film, or a stacked structure of a barrier film, an aluminum-silicon (Al—Si) film, a titanium nitride (TiN) film, and a barrier film. It is to be noted that the barrier film corresponds to a thin film of titanium, a nitride of titanium, molybdenum, or a nitride of molybdenum. Aluminum or aluminum-silicon which is low in resistance value and is inexpensive is preferable as the material of the conductive films 280, and 282a to 282d. In addition, by provision of barrier layers as an upper layer and a lower layer, generation of hillock of aluminum or aluminum-silicon can be prevented. Further, by formation of a barrier film of titanium which is a highly-reducible element, a thin natural oxide film which may be formed on a crystalline semiconductor layer can be reduced so that preferable contact with the crystalline semiconductor layer can be obtained. Here, each of the conductive films 280 can be formed by selective growth of tungsten (W) using a CVD method.

Through the above-described steps, a nonvolatile memory card provided with a p-channel transistor formed in the region 212 in the substrate 200, an n-channel transistor formed in the region 213, and an n-channel transistor and a nonvolatile memory element formed in the region 214 can be obtained.

This embodiment mode can be freely combined with other embodiment modes in this specification.

This application is based on Japanese Patent Application serial no. 2006-174559 filed in Japan Patent Office on Jun. 23, 2006, the entire contents of which are hereby incorporated by reference.

EXPLANATION OF REFERENCE

10: substrate, 12: insulating film, 14: semiconductor layer, 16: insulating film, 18: impurity region, 20: floating gate electrode, 22: insulating film, 24: control gate electrode, 26: gate, 30: semiconductor layer, 32: semiconductor layer, 34: semiconductor layer, 36: semiconductor layer, 38: semiconductor layer, 40: semiconductor layer, 52: memory cell array, 54: peripheral circuit, 56: address buffer, 58: control circuit, 60: boosting circuit, 62: row decoder, 64: column decoder, 66: sense amplifier, 68: data buffer, 70: data input/output buffer, 80: antenna, 82: dielectric plate, 84: gas supplying portion, 86: exhaust port, 88: support, 90: temperature controlling portion, 92: microwave supplying portion, 94: plasma, 100: substrate, 102: insulating film, 104: semiconductor layer, 106: semiconductor. layer, 108: semiconductor layer, 110: semiconductor layer, 112: insulating film, 116: insulating film, 120: charge accumulation layer, 121: charge accumulation layer, 122: resist, 124: resist, 126: impurity region, 128: insulating film, 130: resist, 132: insulating film, 136: conductive film, 138: conductive film, 140: conductive film, 142: conductive film, 144: conductive film, 148: resist, 150: channel formation region, 152: impurity region, 154: channel formation region, 156: impurity region, 158: low-concentration impurity region, 160: channel formation region, 162: impurity region, 164: low-concentration impurity region, 166: resist, 168: channel formation region, 16a: silicon oxide layer, 16b: silicon oxynitride layer, 170: impurity region, 172: insulating film, 174: conductive film, 176: insulating film, 178: conductive film, 18a: source region, 18b: drain region, 200: substrate, 202: insulating film, 204: insulating film, 206: resist mask, 208: concave portion, 210: insulating film, 211: insulating film, 212: region, 213: region, 214: region, 215: p-well, 216: insulating film, 220: insulating film, 222: floating gate electrode, 223: resist mask, 224: insulating film, 226: floating gate electrode, 228: insulating film, 22a: silicon nitride layer, 22b: silicon oxide layer, 230: resist mask, 232: insulating film, 234: insulating film, 236: conductive film, 238: conductive film, 240: conductive film, 242: conductive film, 244: conductive film, 246: conductive film, 24a: metal nitride layer, 24b: metal layer, 254: insulating film, 256: channel formation region, 258: impurity region, 260: low-concentration impurity region, 262: channel formation region, 264: impurity region, 266: low-concentration impurity region, 268: channel formation region, 270: impurity region, 272: low-concentration impurity region, 277: insulating film, 278: opening, 280: conductive film, 500: personal data storage medium, 500: nonvolatile memory card, 501: communication control unit, 502: encoding unit, 503: data processing unit, 504: memory circuit, 510: terminal, 511: communication control unit, 512: control circuit, 513: display portion, 514: input unit, 520: server, 521: communication control unit, 522: decoding unit, 523: comparison reference unit, 524: data processing program, 525: identification data storage portion, 526: comparison reference unit, 527: deposit data storage portion, 701: nonvolatile memory card, 702: resonance circuit, 703: power source circuit, 704: clock generating circuit, 705: demodulating circuit, 706: data processing circuit, 707: memory circuit, 708: A/D converter circuit, 709: modulating circuit, 711: communication line, 712: terminal, 713: CPU, 714: server, 715: reader/writer, 716: RF circuit, 200a: semiconductor layer, 200b: semiconductor layer, 202a: NAND cell, 202b: NAND cell, 282a: conductive film

The invention claimed is:

1. A personal data management system comprising:
a personal data storage medium;
a terminal; and
a server,
wherein the personal data storage medium comprises:
a first communication control unit configured to transmit and receive data to/from the terminal, the first communication control unit including a demodulating circuit, a modulating circuit, a decoding circuit, and a data judging circuit;
an encoding unit configured to encode received data; and
a nonvolatile memory configured to store the encoded data,
wherein the terminal comprises:
a second communication control unit configured to transmit and receive data to/from the personal data storage medium and the server;
a display portion configured to display received data, and
an input unit, and
wherein the server comprises:
a third communication control unit configured to transmit and receive data to/from the terminal;
a decoding unit configured to decode encoded data;
an identification data storage portion; and
a comparison reference configured to compare the decoded data with data in the identification data storage portion.

2. The personal data management system according to claim 1,
wherein each of the first communication control unit provided in the personal data storage medium and the second communication control unit provided in the terminal comprises an antenna, and
wherein data is exchanged between the first communication control unit provided in the personal data storage medium and the second communication control unit provided in the terminal through wireless communication.

3. The personal data management system according to claim 1 or 2, wherein data is exchanged between the second communication control unit provided in the terminal and the third communication control unit provided in the server through wired communication.

4. The personal data management system according to any one of claim 1 or 2, wherein the personal data storage medium is configured to transmit encoded data to the terminal and to receive plain text from the terminal.

5. The personal data management system according to any one of claim 1 or 2, wherein data which is encoded and stored in the personal data management system is not stored in the server.

6. An electronic device including a nonvolatile memory card for identifying a data, the electronic device comprising:
a communication control unit configured to transmit and receive data to/from a reader/writer;
an encoding unit configured to encode received data;
a data processing unit configured to process the encoded data, the data processing unit including a demodulating circuit, a modulating circuit, a decoding circuit, and a data judging circuit; and
a nonvolatile memory configured to store and erase the encoded data,
wherein the communication control unit comprises an antenna.

* * * * *